United States Patent [19]
Pearce

[11] Patent Number: 5,994,450
[45] Date of Patent: *Nov. 30, 1999

[54] GELATINOUS ELASTOMER AND METHODS OF MAKING AND USING THE SAME AND ARTICLES MADE THEREFROM

[75] Inventor: Tony M. Pearce, Alpine, Utah

[73] Assignee: TekSource, LC, Draper, Utah

[*] Notice: This patent is subject to a terminal disclaimer.

[21] Appl. No.: 08/783,413

[22] Filed: Jan. 10, 1997

Related U.S. Application Data

[60] Provisional application No. 60/021,019, Jul. 1, 1996.
[51] Int. Cl.$^6$ .................................................. C08L 53/02
[52] U.S. Cl. .............................. 524/505; 525/89; 525/98; 525/99
[58] Field of Search .................................. 525/89, 95, 98, 525/92; 524/505

[56] References Cited

U.S. PATENT DOCUMENTS

| | | | |
|---|---|---|---|
| 4,833,193 | 5/1989 | Jieverdiug | 524/486 |
| 5,153,254 | 10/1992 | Chen | 524/505 |
| 5,334,646 | 8/1994 | Chen | 524/474 |
| 5,549,743 | 8/1996 | Pearce | 106/122 |
| 5,731,359 | 3/1998 | Moser et al. | 521/51 |

*Primary Examiner*—Mark L. Warzel
*Attorney, Agent, or Firm*—Daniel P. McCarthy; Brick G. Power

[57] ABSTRACT

The present invention relates to gelatinous elastomers, methods for making gelatinous elastomers, methods for using gelatinous elastomers, products made from gelatinous elastomers, and products which include gelatinous elastomers as a component or ingredient. More particular, the invention includes a gelatinous elastomer formed from a combination of a block copolymer of the general configuration A-B-A and a plasticizer. The preferred A-B-A copolymer of the invention is polystyrene-hydrogenated poly (isoprene+butadiene)-polystyrene and the preferred plasticizer is either mineral oil or a combination of mineral oil and resin. Various other components may be included in the preferred recipes according to the invention.

71 Claims, 17 Drawing Sheets

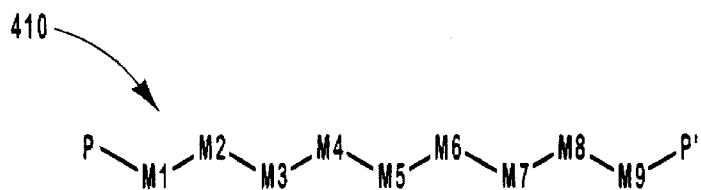
FIG. 4a
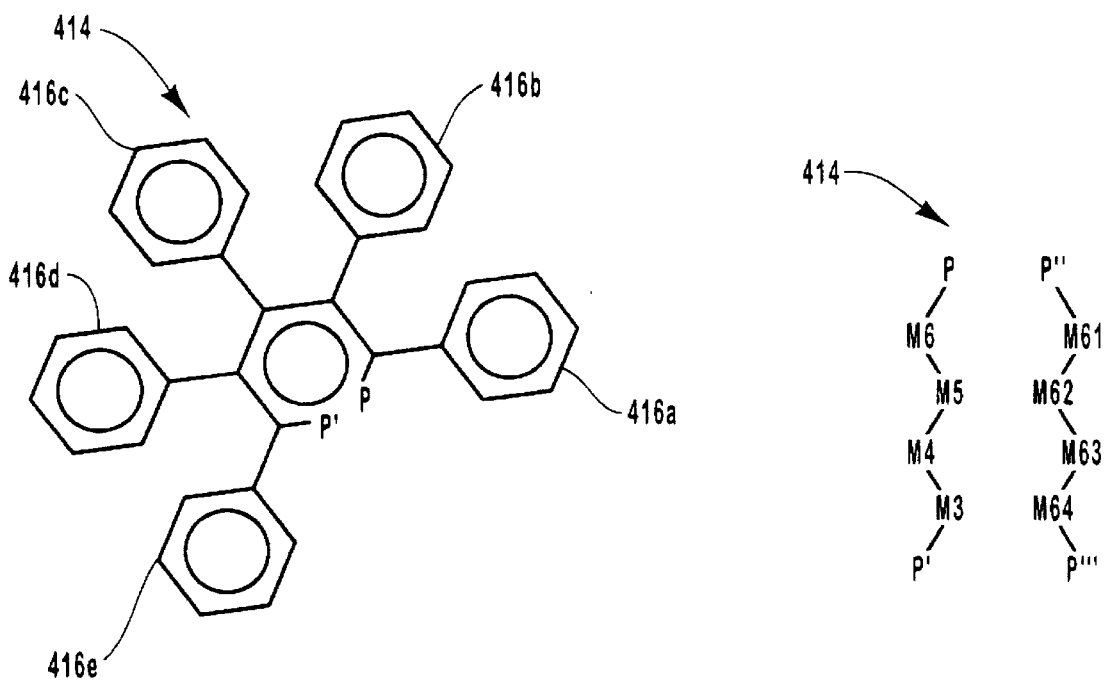
FIG. 4b
FIG. 4c
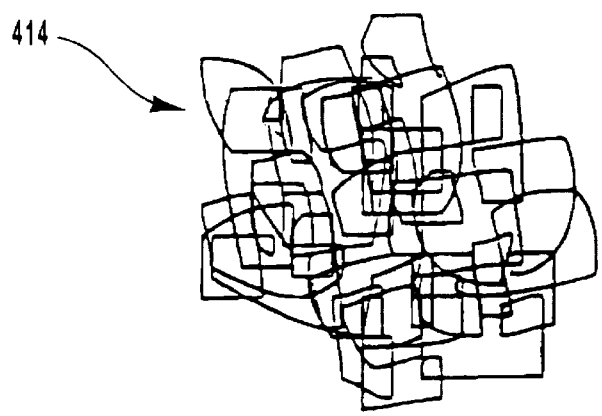
FIG. 4d

GELATINOUS ELASTOMER AND METHODS OF MAKING AND USING THE SAME AND ARTICLES MADE THEREFROM

This patent application claims the benefit of U.S. Provisional application Ser. No. 60/021,019, filed on Jul. 1, 1996, and priority is claimed thereto for all of the material disclosed either explicitly or inherently therein.

I. BACKGROUND OF THE INVENTION

A. Field of the Invention

The present invention relates to gelatinous elastomers, methods for making gelatinous elastomers, methods for using gelatinous elastomers, products made from gelatinous elastomers, and products which include gelatinous elastomers as a component or ingredient. More particularly, the invention includes a gelatinous elastomer formed from a combination of a block copolymer of the general configuration A-B-A and a plasticizer. The preferred A-B-A copolymer of the invention is an ultra high molecular weight polystyrene-hydrogenated poly(isoprene+butadiene)-polystyrene and the preferred plasticizer is either mineral oil or a combination of mineral oil and resin. Various other components may be included in the preferred recipes according to the invention.

B. Description of Related Art

For the benefit of the reader's comprehension of work that had been performed before the invention and the background against which the invention was made, an in-depth discussion of related and background art is provided below.

1. Early Oil-Extended Triblock Copolymer Compositions

U.S. Pat. No. 3,485,787, issued in the name of Walter R. Haefele et al., which is hereby incorporated by reference, discloses oil-extended triblock copolymers of the general configuration A-B-A, wherein A is an alkenyl aromatic hydrocarbon polymer block and B is a conjugated diene hydrocarbon polymer block. The '787 patent explains that alkenyl aromatic hydrocarbons are useful as the A blocks and that the B portion can be any four to ten carbon conjugated diene (col. 4, lines 4–7).

However, only polystyrene-polyisoprene-polystyrene, poly(α-methylstyrene)-polyisoprene-poly(α-methylstyrene) and polystyrene-polybutadiene-polystyrene are listed in the '787 patent as species of triblock copolymers suitable for use in that material (col. 3, lines 12–15). Although broad average molecular weight ranges are disclosed for each component (A having an average molecular weight of about 4,000 to 115,000 and B having an average molecular weight of about 20,000 to 450,000), test data is only listed for triblock copolymers wherein the A blocks each have an average molecular weight of about 15,000 to about 42,000 and the B blocks each have an average molecular weight of about 23,000 to about 75,000 (col. 5, line 74 and col.7, Table 3). Further, the '787 patent describes the amount of extending oil as 5 to 100 parts by weight based on 100 parts by weight block copolymer (i.e., about 2.5 weight percent to about 50 weight percent oil based on the combined weight of the oil and copolymer)(col. 2, lines 52–53 and col. 5, lines 21–23). While the tensile strength of those materials is high (typically greater than 1,000 psi)(col. 7, Table 3), their percent elongation is low (the highest stated value being 930%) (Id.). Further, Applicant believes that the materials of the '787 patent have a very high durometers when compared with the gelatinous elastomers of the present invention.

U.S. Pat. No. 3,676,387, issued in the name of James A. Lindlof, which is hereby incorporated by reference, discloses an oil-based elastomer which is five to thirty weight percent triblock copolymer of the general configuration A-B-A and seventy to ninety-five percent non-aromatic paraffinic oil (col. 2, lines 9–25). The patent defines A as a glassy or resinous non-elastomeric thermoplastic polymer block with a glass transition temperature above room temperature, having an average molecular weight of between about 2,000 and 100,000 and which is relatively incompatible with the elastomeric polymer block B (col. 1, lines 47–53). B is defined as an elastomeric polymer block of a conjugated diene, the average molecular weight being about 15,000 and about 1,000,000 and having a glass transition temperature considerably below that of the A blocks (col. 1, lines 53–57). The '387 patent also states that A:B weight ratios of 10:90 to 50:50 are useful (col. 1, lines 59–61). The oil weight percentage of the oil-extended elastomers of that patent, based on the combined weight of oil and elastomer, is in the range of 70% to 95% (col. 2, lines 9–25). The preferred materials of that patent have a low elasticity modulus, in the range of 1 to 10 psi for 200% elongation of a one square inch specimen (col. 1, lines 40–44). Applicant also believes that the preferred materials of the '387 patent have low tensile strength.

Although the '387 patent states that an average molecular weight range of 15,000 to 250,000 for the B mid-block is preferred and that the A blocks constitute from 10% to 50% of the total polymer weight (10:90 to 50:50 A:B weight ratios), the oil-extended elastomers were near the lower end of the disclosed weight ranges. One of the patent's examples describes an oil-extended elastomer which utilizes a styrene-butadiene-styrene block copolymer having an average molecular weight of only about 100,000, of which the average molecular weight of the B mid-block is about 70,000 (col. 3, lines 46–49). Thus, the styrene:butadiene weight ratio of that particular triblock copolymer is about 30:70.

Similar elastomeric materials are described in U.S. Pat. No. 3,827,999 issued in the name of Ronald K. Crossland, which is hereby incorporated by reference. That patent discloses block copolymers extended in 70 to 98 weight percent oil (col. 2, lines 8–9). The use of monoalkenylarene end blocks which are block polymerized with a conjugated diene is preferred (col. 2, lines 23–28). The average molecular weight range of the monoalkenylarene blocks used in Crossland's material is 5,000 to 75,000 (col. 2, lines 66–69). The average molecular weight range of the conjugated diene blocks used in that material is 25,000 to 250,000 (col. 2, lines 69–72).

However, the preferred block copolymers of that patent have a much lower average molecular weight: the monoalkenylarene blocks preferably having a molecular weight in the range of 8,000 to 65,000 and the conjugated diene blocks preferably having a molecular weight in the range of 35,000 to 110,000 (col. 2, lines 66–72). Moreover, the examples given in the patent utilized triblock copolymers of the general configuration A-B-A, wherein A represents a monoalkenylarene polymer and B represents a polymer composed of conjugated diene molecules, and having total molecular weights of only 57,000 (col. 4, line 3) and 70,000 (col. 4, line 2), with A:B ratios of about 33:67 and 29:71, respectively. The '999 patent states that the materials specifically preferred are polystyrene-hydrogenated isoprene-polystyrene and polystyrene-hydrogenated butadiene-polystyrene (col. 2, lines 55–59). Applicant believes that preference is due to the improved strength of materials which included triblock copolymers with hydrogenated midblocks over similar materials with non-hydrogenated midblocks, which were the subject of the '387 patent.

While Crossland states that his materials exhibit "no more than slight indications of bleeding as compared with the heavy bleeding which occurs with the compositions containing the non-hydrogenated block polymer" (col. 4, lines 43–46) and higher strength than similar materials with triblock copolymers having non-hydrogenated midblocks, they nonetheless exhibit very low tensile strength and poor elongation. Of the materials examined in the patent, the highest tensile strength (at break) noted was merely 80 psi (see tables at col. 3, lines 68–75 and col. 4, lines 57–64). The highest percentage elongation (at break) noted in the patent was only 850 (Id.). A further problem with Crossland's materials is the decrease in percent elongation with an increased amount of oil (Id.).

A styrene-ethylene butylene-styrene (SEBS) block copolymer, which has the general configuration A-B-A, is described in U.S. Pat. No. 4,176,240, issued in the name of Raffaele A. Sabia, which is hereby incorporated by reference. Sabia sought to meet a need for a more solid, handleable gel material (col. 2, lines 35–40). Sabia's material includes 5 to 10 weight percent SEBS, 87 to 93 weight percent naphthenic oil and 0 to 6 weight percent polyethylene, wherein all weight percentages are based upon the total weight of the material (Table I). Those materials are stated as having advantages for waterproofing (col. 2, lines 8–9), handling (col. 2, lines 35–40) and low temperature flexibility (See col. 2, lines 19–22, which identifies a need for such a property).

Sabia specifies that the SEBS useful in his material has a styrene to rubber ratio (A:B) of about 0.4 (i.e., 40:60)(col. 2, lines 33–44). In fact, the materials used in the examples had styrene to rubber ratios of 0.39 and 0.41 (i.e., 39:61 and 41:59, respectively)(Table I, Constituent A). The experimental results listed in that patent demonstrate that Sabia's materials possess low tensile strength and low percent elongation. None of the results show a tensile strength of even 5 psi (Table I). The greatest amount of elongation shown is 129% (Id.).

Sabia states that during experimentation, styrene-isoprene-styrene (SIS) was used as a substitute for SEBS (col. 5, lines 33–35). However, he noted that the high amount of tackiness of the SIS-containing material made it less handleable and therefore undesirable (Id.).

In U.S. Pat. No. 4,259,540, also issued in the name of Sabia and which is incorporated herein by reference, the list of useful components for making compositions similar to those of the '240 patent was broadened. For example, in addition to naphthenic oils, the '540 patent describes use of paraffinic oils and mixtures of naphthenic and paraffinic oils (col. 2, lines 29–31). Similarly, the styrene to rubber ratio (A:B) range of the SEBS was increased from about 0.4 to approximately 0.2 to 0.5 (i.e., 20:80 to 50:50) and is stated as preferably being about 0.4 (col. 2, lines 35–38). In addition, a fourth element, isopropyl phenyl-phenyl phosphate, was added to the material to inhibit oil synersis, which implies that oil synersis may have been a problem with the material of the Sabia '240 patent (Table 1, footnote).

Despite Sabia's increased ranges in the '540 patent, the examples of that patent show no increase in either tensile strength or elongation over those of the '240 patent (Table 1).

U.S. Pat. No. 4,351,913, issued in the name of Naren I. Patel, which is hereby incorporated by reference, discloses a cable-insulative material that possesses properties similar to those of the materials described in the Sabia '240 patent, along with improved dielectric, high temperature drip and density characteristics. The material of the '913 patent includes a triblock copolymer of the general configuration A-B-A, chosen from SEBS, 7IS and styrene-butadiene-styrene (SBS)(col. 4, lines 11–14), and paraffinic or naphthenic mineral oil (col. 4, line 15). In addition, glass or ceramic microspheres and/or an additive may be used to make that material (col. 4, lines 19–20).

The examples of the '913 patent disclose mixtures composed of I to 30 weight percent styrene block copolymer, 52 to 82 weight percent either naphthenic or paraffinic mineral oil, 1 to 31 weight percent inorganic (e.g., glass or ceramic) hollow microspheres and 1 to 13 weight percent additive, if desired-such as polyethylene or glycerol hydroxy sterate (Table 3, the various constituents are identified throughout the text and tables).

Patel's preferred copolymers have very specific styrene to rubber (A:B) ratios: he prefers use of an SEBS having an A:B ratio of 0.39 to 0.41 (col. 4, lines 30–31), SBS having an A:B ratio of approximately 0.39 (col. 4, lines 37–38) or SIS having an A:B ratio of approximately 0.16 (col. 4, lines 42–43). Although use of other block copolymers in that material are noted, Patel's preferred formulations all include SEBS.

The '913 patent does not discuss the strength and elongation properties of the materials disclosed therein (col. 16, lines 65–68, which references Table 3, constituents A and B are identified at col. 4, 34–36).

2. John Chen's Thermoplastic Elastomer Gelatinous Compositions

Having familiarized himself with various gels available in the art, the inventor considers the gel compositions of John Chen to be the best available in the prior art, although the Chen gels are seriously deficient in several important areas, and these deficiencies are addressed by the invention.

U.S. Pat. No. 4,369,284, issued in the name of John Y. Chen, which is hereby incorporated by reference, discloses an oil-extended elastomer composition that includes about 6 to about 25 weight percent SEBS and about 75 to about 94 weight percent oil (col. 2, lines 8–24). The SEBS component of Chen's material has a styrene to rubber (A:B) ratio within the range of between 31:69 and 40:60 (col. 2, lines 25–34). Chen's preferred A:B ratio is 33:67 (col. 2, lines 30–31). However, according to Shell Chemical Company, KRATON® G1651, which is used in Chen's examples, has an A:B ratio of 32:68.

Chen's material is prepared by blending together the components including other additives as desired at about 23° C. to about 100° C., forming a paste-like mixture, and further heating said mixture uniformly to about 150° C. to 200° C. until a homogeneous molten blend is obtained (col. 3, lines 25–31). A heated vessel with a stirrer is all that is required to carry out Chen's melt blending process (Id.), although Chen's process takes many hours and much labor to complete.

The '284 patent discloses a 20 weight percent SEBS, 80 weight percent 200 weight paraffinic oil material which has a low breaking (i.e., tensile) strength of only $4 \times 10^6$ dyne/$cm^2$ (58 psi) and a low percent elongation of only 1,700% (Table I, col. 4, line 56 to col. 5, line 13). Further problems with Chen's material include relatively high amounts of oil bleed and tack (despite Chen's claim that the material was "substantially without oil bleedout" (col. 3, line 18)), each of which are unacceptable in various applications.

U.S. Pat. No. 4,618,213, issued in the name of John Y. Chen, which is hereby incorporated by reference, describes a material similar to that disclosed in Chen's previous patent applications and in the '284 patent. The material and the process for making the material are substantially the same as the material and process disclosed in the '284 patent. In the '213 patent, Chen again changed the average molecular weight range for plasticizing oils useful in the material, this time by stating that plasticizing oils having molecular weights of less than about 200 and greater than about 700 would be useful in his material (See col. 3, lines 29–31). The '213 patent also included a number of additional examples that did not appear in the '284 patent, including examples which listed the rigidity ranges of various materials having SEBS of different A:B weight ratios.

For each of the materials tested, depending upon the amount of oil used, rigidity ranged from about 20 to about 700 gram Bloom (Examples XI–XIV, col. 8, lines 15–45). However, Chen did not disclose any of the other physical properties of those materials. Therefore, Applicant believes that the tensile strength and percent elongation of those materials do not exceed the corresponding properties of the Chen material which contains 20 weight percent 33:67 SEBS and 80 weight percent of 200 weight paraffinic mineral oil (Table I, col. 6, lines 18–38). Chen does not state this specifically, however.

U.S. Pat. No. 5,262,468, issued in the name of John Y. Chen, which is hereby incorporated by reference, provides about the same basic disclosure of Chen's material as the '284 and '213 patents. However, in apparent realization that the molecular weight of the triblock copolymers of his composition provided beneficial physical properties such as tensile strength and percent elongation, Chen downplayed the importance of the SEBS A:B ratio, and broadened the A:B ratio range useful in his materials to about 20:80 or less to about 40:60 or higher (col. 3, lines 27–30). He stated that triblock copolymers having A:B ratios below 31:69 may be used, but they are less preferred due to their decrease in the desirable properties of the final composition (col. 4, lines 5–9).

Chen then noted the importance that, in combination with the A:B ratio range, the triblock copolymers used in his invention have a Brookfield solution viscosity of at least about 1,800 centipoises (cps)(col. 4, 36–42)(KRATON® G-1651 has a solution viscosity, 20% solids in 80% toluene, at 25–30° C. of about 2,000 cps). Solution viscosity is related to the molecular weight of the copolymers. In addition, he included a long list of potential additives and more examples. However, no mention was made of the utility of many of the potential additives. Chen then listed several apparatus that could be made with his material.

One very interesting point about the '468 patent is the elongation at break value that is missing from Table I. Each of Chen's issued patents include a Table I, and the Table I of each patent is almost identical. However, Table I of every Chen patent which issued subsequent to U.S. Pat. No. 4,618,213 omits the elongation at break value.

Despite the missing elongation value, the '468 patent did not disclose a material with physical characteristics superior to those of the materials of Chen's '284 and '213 patents. Similarly, U.S. Pat. No. 5,508,334, which is hereby incorporated by reference, and which also issued in the name of John Y. Chen, disclosed a material having very similar composition and physical properties to those of the '284, '213 and '468 patents. The material of the '334 patent did, however, include the addition of a "minor amount" of various polymers to the material (col. 4, line 66 to col. 5, line 12). In the '334 patent, Chen's preferred gel is a mixture of (i) 100 parts by weight of a high viscosity poly(styrene-ethylene-butylene-styrene) triblock copolymer, (ii) from about 300 to about 1600 parts by weight of a plasticizing oil; and (iii) a minor amount of one or more homopolymers or copolymers (col. 2, lines 24–36). Applicant found the specification of the '334 patent confusing because it failed to identify the purpose of adding the homopolymers or copolymers to the material. SEBS useful in the material of the '334 patent has a Brookfield viscosity of not less than about 1,800 cps, and preferably about 2,000 cps or higher. Typically, the Brookfield viscosity values can range from about 1,800 cps to about 16,000 cps. Less typically, the Brookfield viscosity values can range from about 1,800 cps to about 30,000 cps or higher (col. 2, lines 37–45). However, KRATON® G-1651, Chen's preferred SEBS copolymer, has a Brookfield viscosity, 20% solids in 80% toluene, of only about 2,000 cps ('334, Table I, footnote 4). The '334 patent states that the styrene end block to ethylene and butylene center block ratios should be in the range of 20:80 or less to 40:60 or higher (col. 3, lines 11–14).

In addition, several patents which disclose articles made out of Chen's elastomeric materials have issued in the name of John Y. Chen. U.S. Pat. No. 4,618,213, which is hereby incorporated by reference, primarily discloses Chen's gelatinous material, but also states that objects such as lenses, rods, prisms and hemispheres can be made from his gel.

In U.S. Pat. No. 5,153,254, issued in the name of John Y. Chen, which is hereby incorporated by reference, Chen claims a reusable lint remover made from his gelatinous material. The patent does not contain a detailed description of such a device or of how it would be made.

U.S. Pat. Nos. 5,239,273 and 5,475,890, which are each hereby incorporated by reference, also issued in the name of John Y. Chen, each disclose reusable swabs made from Chen's gelatinous material. However, the A:B ratio range of the SEBS triblock copolymer used in that material—20:80 to 40:60—('890, col. 4, lines 6–9) is much broader than the SEBS A:B ratio range of the materials disclosed in the following Chen patents: '284 and '213.

U.S. Pat. No. 5,334,646, issued in the name of John Y. Chen, which is hereby incorporated by reference, claims an article of manufacture made from essentially the same material as that disclosed in Chen's '468 patent. Chen's list of articles of manufacture includes such things as a vibration damper, a vibration isolator, a wrapper, a hand exerciser, a dental floss, a crutch cushion, a cervical pillow, a bed wedge pillow, a leg rest cushion, a neck cushion, a mattress, a bed pad, an elbow pad, a dermal pad, a wheelchair cushion, a helmet liner, a hot or cold compress pad, an exercise weight belt, a swab, a traction pad, an orthopedic shoe sole, or a splint, a sling, or a brace cushion for the hand, wrist, finger, forearm, knee, leg, clavicle, shoulder, foot, ankle, neck, back or rib (col. 6, line 37 to col. 7, line 41). In addition, the '646 patent mentions that the material may be cast onto open cell substrates (col. 7, lines 38–59).

U.S. Pat. No. 5,336,708, issued in the name of John Y. Chen, which is hereby incorporated by reference, discloses a layered composite which includes layers of Chen's previously described materials physically interlocked with layers of other materials. The composite may contain more than one layer of Chen's materials, each layer having the same or different rigidities (col. 3, lines 11–13). The remaining layers are selected from the group consisting of foam, plastic, fabric, metal, concrete, wood, glass, ceramics, synthetic resin, synthetic fibers or refractory materials (col. 3, lines 40–45).

In the above-identified patents, Chen discloses various gel compositions which relate to poly(styrene-ethylene-butylene-styrene) (such as Shell's KRATON® G 1651), a plasticizing oil, and appropriate additives. Applicant, whose employer is a licensee of Chen's patents, found in working with Chen's gel that it had insufficient tensile strength, excessive oil bleed, and higher cost per unit volume. As described below, Applicant has created a gel, method for making the gel, and method for making articles from the gel that eliminates many of the problems found with the Chen gel.

Some of Chen's patents heavily emphasize the ratio of end block (A) to mid block (B) weights. Generally these ratios fall in the range of 19:81 to 52:49 (See, e.g., the '334 patent). Applicant believes that Mr. Chen attributed the more desirable performance of his gel, in comparison with the prior art, to the end block to mid block ratios. As explained below, Applicant's invention achieves substantially better performance than Chen's gel. However, Applicant believes that the material of the present invention performs better due to the chemical and physical characteristics of the particular A-B-A elastomer rather than because of the end block to mid block ratios of the A-B-A block copolymer.

As explained above, Chen prepared his gel compositions by blending together the components and additives at about 23° to about 100° C., forming a paste like mixture and further heating the mixture to about 105° C. to 200° C. until a homogeneous molten blend is obtained. Thereafter a desired article can be molded (See '334, col. 5, lines 25–45 for a description of Chen's gel manufacturing process). When Applicant's employer licensed Chen's patents, Chen instructed Applicant's employer on Chen's preferred gel composition and how to make it. The process was a complicated, multi-step process that took Applicant a long time to complete. Applicant believed there to be disadvantages in such a process because it was highly consumptive of energy and labor, required great amounts of time, and caused degradation of some of the gel components, so Applicant developed the quicker, simpler and cheaper processes explained below.

3. Post-Chen Oil-Extended Triblock Copolymer Compositions

Another relevant piece of prior art is Technical Bulletin number SC:1102–89, entitled "KRATON Thermoplastic Rubbers in oil gels," published by the Shell Chemical Company ("Shell Publication") which is hereby incorporated by reference. In the Shell Publication, mixing of Shell Chemical's triblock copolymers, which are marketed under the trade name KRATON®, with oil under heat and shear is disclosed, as well as either increasing the rubber content of the blend or increasing the proportion of rubber segment in the molecule to increase oil retention.

U.S. Pat. Nos. 4,432,607 and 4,492,428, both issued in the name of Alvin C. Levy, both of which are hereby incorporated by reference, disclose oil-extended triblock copolymers (i.e., gels). Those patents describe materials made from styrene block copolymers and a plasticizing agent. The '607 and '428 patents disclose materials which include styrene-ethylene butylene-styrene (SEBS)('607, col. 3, lines 40–41; '428, col. 3, lines 52–53). Specifically, according to the '607 and '428 patents, Levy used KRATON® G1560 and KRATON® G1652, both manufactured by Shell Chemical Company of Houston, Tex., as the rubber component of his material ('607, col. 5, line 51; '428, col. 6, line 12). Both patents also state that Shell Chemical's KRATON® G1651 could be used as the rubber ('607, col. 5, lines 63–66; '428, col. 6, lines 24–27). The copolymers useful in those materials have a styrene to rubber (A:B) ratio of 0.2 to 0.5, and preferably of about 0.4 ('607, col. 2, lines 50–52; '428, col. 2, lines 65–67).

The plasticizer used in the materials of the '607 and '428 patents includes either naphthenic or paraffinic mineral oils or mixtures thereof ('607, col. 2, lines 45–47; '428, col. 2, lines 58–60). Optionally, the plasticizer may contain wax ('607, col. 2, line 60; '428, col. 3, line 8). The '607 and '428 patents state that, in the case of a single-layer or outer-layer coating, microcrystalline wax is preferred as a plasticizer ('607, col. 2, lines 60–62; '428, col. 3, lines 8–10).

In addition, according to the '607 and '428 patents, Levy seems to prefer materials with adhesive characteristics (See '607, col. 7, lines 44–47; '428, col. 8, lines 6–9). For this reason, Levy used resins which associate with the styrene end-blocks of the block copolymer, such as coumarone-indene copolymer or vinyl toluene—α methyl styrene copolymer, to provide adhesive characteristics to his material ('607, col. 2, lines 55–59; '428, col. 3, lines 3–6).

Both of these patents teach away from the use of high molecular weight rubbers, citing difficulty in blending with other components as the primary problem ('607, col. 5, lines 63–66; '428, col. 6, lines 24–27). Thus, it seems that the materials disclosed therein may have low tensile strength and inadequate elongation. Further, the high-adhesive properties (i.e., tackiness) of the preferred materials of the '607 and '428 patents are not desirable in many gelatinous elastomer (gel) applications.

U.S. Pat. No. 4,497,538, issued in the name of Naren I. Patel, which is hereby incorporated by reference, discloses a composition which includes SEBS block copolymers, petrolatum and polyethylene. According to the examples in the patent, SEBS makes up from 0.5 to 15 percent of the material (Table 1, col. 2, line 60 to col. 3 line 65). SEBS having a styrene to rubber (A:B) ratio of 0.39 to 0.41 is useful for purposes of that patent (col. 2, lines 4–6). Specifically, Patel prefers Shell Chemical's KRATON® G1650 and G1652 (col. 2, lines 7–10).

According to the examples, the compound of the '538 patent includes 80 to 93.5% petrolatum (Table 1). Petrolatum containing no more than about 15% oil, as determined by ASTM D 721, is preferred (col. 2, lines 12–14). Polyethylene makes up from about 1 to 15% of the material (Table 1). Polyethylenes that are considered useful in that material have a molecular weight in the 1,000 to 10,000 range and a specific gravity of greater than 0.90 (col. 2, lines 28–30).

Patel does not disclose physical properties such as strength or elongation, leading Applicant to suspect that the materials of the '538 patent have both little strength and little elongation. A further problem with the materials of the '538 patent are their low melting temperatures, in the range of 72° C. to 117° C. (Table 1).

The material disclosed in U.S. Pat. No. 4,509,821, issued in the name of Richard J. Stenger, which is hereby incorporated by reference, has a lower viscosity and a higher drip temperature (i.e., the temperature at which a material flows on its own, determined by placing a 20 gram sample in a three inch diameter dish which is positioned vertically within a forced air oven for two hours—drip temperature is often higher than melting point) than many of the prior art materials (col. 2, lines 61–63).

That material includes a plasticizing oil, SEBS and a linear polyethylene wax. The plasticizing oil, which makes up from 85 to 91% of the compound (Figure), is either naphthenic oil, paraffinic oil or a mixture thereof (col. 1, lines 59–64). The SEBS, which makes up from 5 to 10% of the material (Figure), has a styrene to rubber (A:B) ratio of from approximately 0.2 to 0.5, preferably of about 0.4 (col. 1, lines 64–67). Polyethylene wax having an average molecular weight in the range of about 1,000 to 1,500 (col. 1, line 67 to col. 2, line 1) makes up the remaining 2 to 8% of the material (Figure).

Applicant believes the materials of the '821 patent to be weak and have a low percent elongation. Further, the drip temperatures of those materials are relatively low and undesirable (See col. 2, line 55).

U.S. Pat. No. 4,709,982, issued in the name of Robert W. Corne et al., which is hereby incorporated by reference, discloses a gelled oil filling compound which includes a block copolymer having a molecular weight in the 200,000 to 2,000,000 range (col. 2, lines 34–35) and a hydrocarbon oil having an aromatic content of 12% or less (col. 2, lines 25–29). Corne's preferred block copolymer is Shell Chemical's KRATON® G1651, an SEBS copolymer (col. 3, lines 29–31). That material includes from about 1 to 10% SEBS (col. 2, lines 36–37), depending upon the oil characteristics (col. 3, lines 36–40). However, use of the material of the '982 patent seems to be limited to "gelled oil filling compound[s]" (claim 1).

Nevertheless, due to Corne's preferred use of KRATON® G1651 in that material, an SEBS triblock copolymer, Applicant believes the Corne compound to have low tensile strength and low percent elongation, just as Chen's material does. Applicant also believes, based upon the preferred copolymer of the '982 patent, that those materials possess undesirably high oil bleed and tack.

U.S. Pat. No. 4,716,183, issued in the name of Jose P. Gamarra et al., which is hereby incorporated by reference, discloses oil-extended styrene-diene block copolymers which include a cross-linked multifunctional coupling agent. In particular, the patent's examples all discuss the use of Shell Chemical's KRATON® G1650, KRATON® G1651, or a mixture thereof. The copolymers make up from about 2 to about 30 weight percent of the material, based upon the total weight of the material (col. 2, lines 3–4). The preferred embodiment contains from about 12 to about 22 weight percent block copolymer (col. 3, lines 10–11), and includes a combination of a KRATON® G1650-like material and a KRATON® G1651-like material in the range of about 40:60 to 60:40, based on the total copolymer weight (col. 2, lines 43–62). Cross-linking was performed for improved shape retention at higher temperatures (col. 2, lines 23–32). Gamarra et al. claim that cross-linking did not diminish the other physical properties of the material, such as tensile strength and percent elongation. No testing data that would tend to reveal those types of properties was provided for cross-linked materials.

Nevertheless, the non-cross-linked materials disclosed in the '183 patent, the strength of which was not diminished by cross linking, exhibit fairly low tensile strength and low elongation (Table, col. 4, line 57 to col. 5, line 20). Of the published results, the material having the greatest tensile strength and elongation had a 20 weight percent KRATON® G1651 copolymer component. The tensile strength of that material was only 142 psi, the elongation was only 1810%.

U.S. Pat. No. 4,798,853, issued in the name of Dale L. Handlin, Jr., which is incorporated herein by reference, describes a gel filling composition for cables which includes two to fifteen weight percent SEBS and 85 to 98 weight percent naphthenic or paraffinic oil or solvent having an aromatic content of up to 25 weight percent of the oil/solvent weight, the weight percentages of SEBS and oil being based upon the total composition weight (col. 2, lines 51–61). Most of Handlin's examples utilize Shell Chemical's KRATON® G1652. Oils/solvents having an aromatic content of about 15% are also preferred (col. 2, lines 60–61).

Applicant believes the materials of the '853 patent to have poor (i.e., low) tensile strength and elongation. Further, many of the materials described in the '853 patent have low gellation and dissolution temperatures, which vary depending upon the SEBS and the oil/solvent. According to the patent's examples, the gellation and dissolution temperatures of materials containing KRATON® G1652 ranged from about 15° C. to about 60° C. In contrast, a material containing the higher molecular weight KRATON® G1651 gelled at a temperature greater than 100° C.

Pressure sensitive adhesives are the subject of U.S. Pat. No. 4,833,193, issued in the name of Sieverding. The adhesive materials of that patent contain from about 2 to about 40 weight percent triblock copolymer, alone or in combination with a diblock copolymer (col. 12, lines 8–14), at least 20 weight percent of a low molecular weight resin (col. 12, lines 15–18) and up to about 80 weight percent mineral oil having a viscosity of about 200 to about 1,200 (col. 12, lines 19–21).

Sieverding's preferred triblock copolymers are SEBS copolymers having essentially the same characteristics as KRATON® G1651 (col. 12, lines 38–40). Sieverding's most preferred high molecular weight SEBS has a styrene to rubber (A:B) ratio of about 0.48 to about 0.52 (i.e., about 48:52 to about 52:48)(col. 12, lines 40–45).

The '193 patent does not disclose the tensile strength of the materials described therein. Despite the possible increase in tensile strength, Applicant believes that the tensile strength of the materials of the '193 patent are low since SEBS is used in those materials.

U.S. Pat. Nos. 4,942,270 and 5,149,736, both issued in the name of Jose P. Gamarra, both of which are incorporated herein by reference, disclose gel compositions for use in cable sealing apparatus which are "nonmeltable" (i.e., begin to degrade, decompose or break down in some manner before they reach a temperature at which the composition will melt and become pourable). The compositions of those patents each include an SEBS triblock copolymer and oil. One of Gamarra's preferred SEBSs has a high molecular weight, particularly in the 250,000 to 280,000 range ('270, col. 4, line 64 to col. 5, line 1; '736, col. 4, lines 39–41), and a styrene to rubber ratio (A:B) of 33:67 ('270, col. 4, lines 46–48; '736, col. 4, lines 13–20). The SEBS sold by Shell Chemical as KRATON® G1651 was used for the patent's examples. While SEBS amounts of between about 2 and 30 weight percent of the total composition are disclosed, the preferred range is stated as 5 to 25 weight percent ('270, col. 4, lines 13–16; '736, col. 3, lines 51–56).

Oils which are useful in the compositions have molecular weights in the range of about 400 to about 2,500, and preferably in the range of 450 to 1,500 ('270, col. 5, lines 24–29; '736, col. 4, lines 64 to col. 5, line 1). Oil makes up from 70 to 98 weight percent of the composition, preferably from 75 to 95 weight percent ('270, col. 4, line 16; '736, col. 3, lines 50–51, 56). Gamarra prefers that the SEBS and oil are melt blended under high shear ('270, col. 2, lines 53–59, 65–66; '736, col. 2, lines 50–52, 63–64).

Gamarra notes that ultimate elongation of the compositions are from about 200% to about 1,200%. However, the preferred elongation range is about 400 to 1,100% ('270, col. 4, lines 22–26; '736, col. 3, lines 63–66). Such low elongation capability makes these materials undesirable for use in many applications. Further, although the patents do not list values for tensile strength, in light of the relevant SEBS-related prior art, Applicant believes that the materials of the '270 and '736 patents have low tensile strength.

U.S. Pat. No. 5,331,036, issued in the name of Jung W. Kang et al., which is hereby incorporated by reference, describes elastomer compositions which include copolymer compositions of 1,3-conjugated dienes and aromatic vinyl compounds having a weight average molecular weight of greater than about 1,000,000 and oil. Copolymers suitable for use in that material include, among others, midblocks (B) of 1,3-butadiene, 2,3-dimethyl-1,3 butadiene and 1,3 hexadiene (col. 4, lines 1–20). Kang prefers using styrene-butadiene-styrene block copolymers (col. 4, lines 58–60). The oil makes up from about 23 to about 75 weight percent of the composition, preferably greater than about 44 weight percent (col. 2, lines 47–50).

Physical characteristics such as tensile strength, elongation and Young's tensile modulus, durometer and rigidity are not provided by the '036 patent. Nor, to Applicant's knowledge, are the materials disclosed therein commercially available, even since Applicant interview the assignee of the '036 patent regarding those materials. Nevertheless, because of the extremely high molecular weight of the copolymers used in those materials, which is believed to result in entanglement of the rubber midblock, Applicant believes them to have low tensile strength and elasticity and high tensile modulus, high durometer and high rigidity measurements.

A gelatinous elastomeric material is needed which has improved elongation and tensile strength over the prior art, with comparable softness (i.e., durometer). A material is needed which has reduced oil bleed over prior art materials or no oil bleed, and reduced tack. Additionally, an elastomeric material which deforms easily under load and has a high level of shape memory is needed, exemplified by a rebound rate of about one second or less when a one inch long piece of the material is stretched to two inches an released.

II. SUMMARY OF THE INVENTION

The soft gelatinous elastomer of the present invention addresses all of the foregoing needs and provides other advantageous characteristics. The percent elongation and tensile strength of the material are significantly improved over the prior art. The material also has reduced or no oil bleed and reduced tack. In addition, the material of the invention deforms easily under light loading, and reforms almost instantaneously. The material also reforms to substantially its original size and shape. The material is substantially less expensive than the best prior art (John Y. Chen's material), and can be manufactured more quickly and easily that prior art.

The elastomeric material of the present invention is a composite which includes an elastomer component, which includes at least one elastomeric polymer, and a plasticizer component. Applicant prefers using triblock copolymers having the general configuration A-B-A as at least one of the elastomeric polymers. The elastomer component makes up from less than about three weight percent to about forty weight percent of the material. Preferably, for typical applications, the elastomer component comprises about seven weight percent to about thirty weight percent of the material.

The plasticizer component may contain one type of plasticizer or a mixture of plasticizer types. Plasticizer mixtures useful in the present invention include oils and polybutenes. A plasticizer of the invention may also be a resin. The materials of the invention preferably include about 60 to about 97 weight percent plasticizer component, based upon the total weight of the material not including any fillers. Preferably, the materials of the invention include about 70 to about 93 weight percent plasticizer.

The material of the present invention exhibits greater elongation than prior art materials. Depending upon several factors, including the chemical structure of the elastomeric polymer types, the oil to elastomer weight ratio of the material, the type of plasticizer used in the material, and other additives, as well as other factors, the material of the present invention consistently demonstrates elongation in the 1,900 to 2,100 percent range and up to about 2,400 percent in some formulations.

Similarly, the elastomeric material of the invention exhibits increased tensile strength over existing materials. Again, several factors, including but not limited to the chemical structure of the elastomeric polymer types, the oil to elastomer weight ratio of the material, the type of plasticizer, and additives, are responsible for the improved strength of the material.

The material of the invention also has reduced or no oil bleed. Once again, factors such as the chemical structure of the elastomeric polymer types, the oil to elastomer weight ratio of the material, the type of plasticizer (e.g., a plasticizer with a substantial resin content), and additives, play a role in reducing or eliminating the oil synersis of the material.

The tackiness of the material has also been decreased in comparison to prior art triblock copolymer gel materials. Factors similar to those identified above are responsible for limiting the tack of the material.

The elastomeric material of the present invention deforms readily under load. The use of a fluid plasticizer in combination with A-B-A triblock copolymers creates a material which deforms easily under load. Thus, the material of the invention equalizes load bearing pressure against a cushioned object. The firmness or stiffness and rebound rate of the material of this invention are tailorable, in part, due to the physical characteristics of different plasticizers (i.e., factors such as molecular weight, specific gravity and viscosity (for oils) or $T_g$ (for resins)).

Following deformation, the materials of the present invention rebound to substantially their original size and shape. The use of A-B-A triblock copolymers in the material of the invention provide a great deal of elasticity and memory to the material of the invention.

The preferred material of the present invention is highly elastic and has a very high rate of rebound. In fact, the preferred material of the invention rebounds to its original shape in about one second or less when a one inch long piece of the material is stretched to about two inches and released. Preferably the elastomeric material has an almost instantaneous rebound rate.

Upon reading the appended specification, claims and drawings, these and other objects, features and advantages of the present invention will become apparent to persons of ordinary skill in the art.

III. BRIEF DESCRIPTION OF THE DRAWINGS

FIG. 4a illustrates a midblock(B) of the triblock copolymer of FIG. 2a.

FIG. 4b illustrates an endblock(A) of the triblock copolymer of FIG. 2a.

FIG. 4c illustrates the weak bonding between the monomer units of one or more midblocks(B) of the triblock copolymer of FIG. 2a.

FIG. 4d illustrates an endblock(A) of the triblock copolymer of FIG. 2a, showing the endblock in a relaxed state.

IV. DESCRIPTION OF THE PREFERRED EMBODIMENTS

Applicant believes that the reader might benefit from a general background discussion of the chemistry underlying the invention prior to reading about the preferred embodiments of the invention. That general background discussion is provided below.

A. Chemistry of Plasticizer-Extended Elastomers

A basic discussion of the chemical principles underlying the characteristics and performance of plasticizer-extended elastomers is provided below to orient the reader for the later discussion of the particular chemical aspects of the invention.

The materials of the present invention are a composition primarily of triblock copolymers and plasticizers, both of which are commonly referred to as hydrocarbons. Hydrocarbons are elements which are made up mainly of Carbon (C) and Hydrogen (H) atoms. Examples of hydrocarbons include gasoline, oil, plastic and other petroleum derivatives.

Figure 1A:
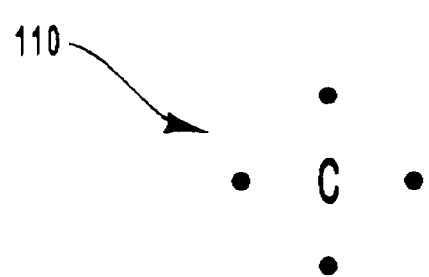
FIG. 1a illustrates a carbon atom and its covalent bonding sites.
Figure 1B:
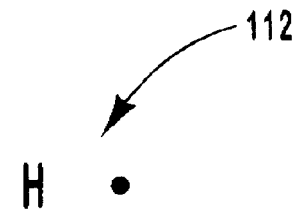
FIG. 1b illustrates a hydrogen atom and its covalent bonding site.
Figure 1C:
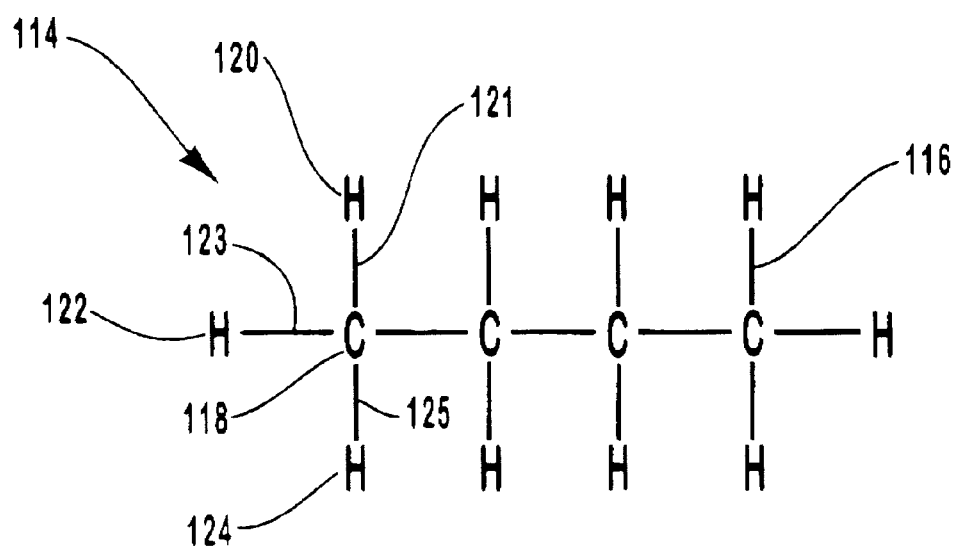
FIG. 1c illustrates a four carbon hydro-carbon molecule known as butane.

Referring to FIG. 1a, it can be seen that a carbon atom 110 typically has four covalent bonding sites "●". FIG. 1b shows a hydrogen atom 112, which has only one covalent bonding site ●. With reference to FIG. 1c, which represents a four-carbon molecule called butane, a "covalent" bond, represented at 116 as "—", is basically a very strong attraction between adjacent atoms. More specifically, a covalent bond is the linkage of two atoms by the sharing of two electrons, one contributed by each of the atoms. For example, the first carbon atom 118 of a butane molecule 114 shares an electron with each of three hydrogen atoms 120, 122 and 124, represented as covalent bonds 121, 123 and 125, respectively, accounting for three of carbon atom 118's available electrons. The final electron is shared with the second carbon atom 126, forming covalent bond 127. When atoms are covalently bound to one another, the atom-to-atom covalent bond combination makes up a molecule such as butane 114. An understanding of hydrocarbons, the atoms that make hydrocarbons and the bonds that connect those atoms is important because it provides a basis for understanding the structure and interaction of each of the components of the present invention.

Figure 2A:
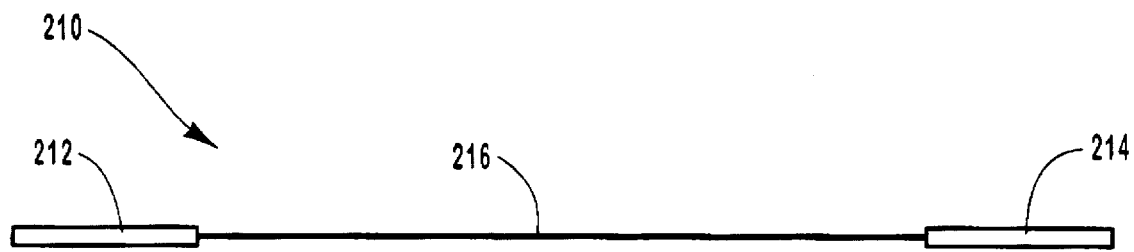
FIG. 2a illustrates a triblock copolymer useful in the present invention.
Figure 2B:
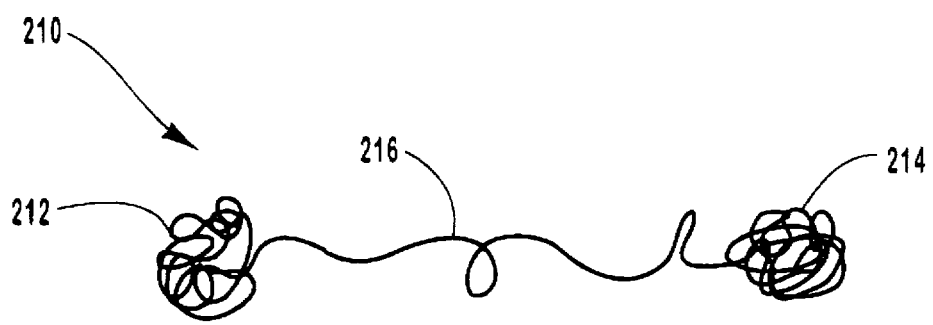
FIG. 2b shows the triblock copolymer of FIG. 2a in a relaxed state.

As mentioned above, the present invention utilizes triblock copolymers. With reference to FIGS. 2a and 2b, a triblock copolymer is shown. Triblock copolymers 210 are so named because they each have three blocks—two endblocks 212 and 214 and a midblock 216. If it were possible to grasp the ends of a triblock copolymer molecule and stretch them apart, each triblock copolymer would have a string-like appearance (as in FIG. 2a), with an endblock being located at each end and the midblock between the two endblocks.

Figure 3A:
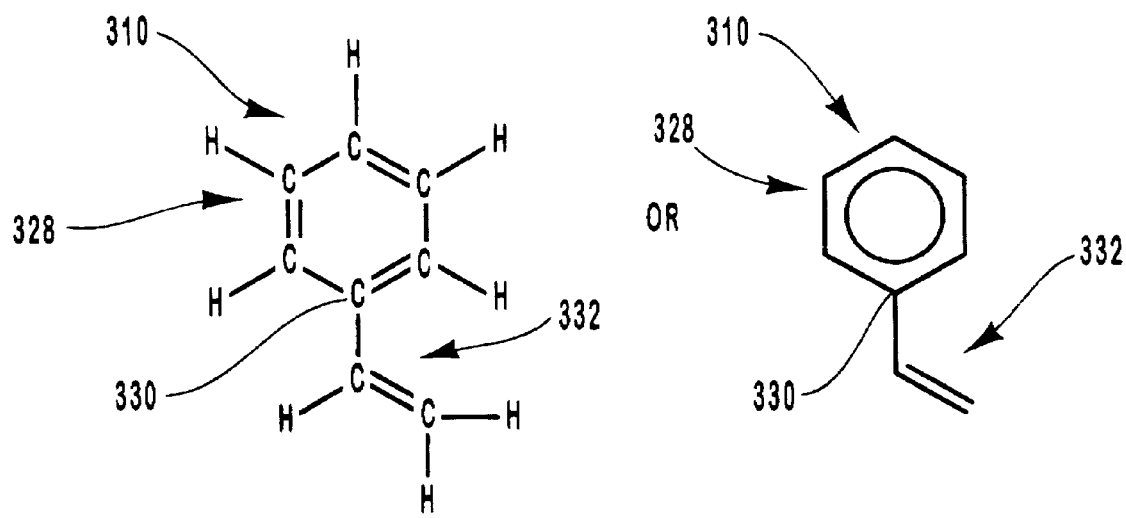
FIG. 3a illustrates the chemical structure of a stryene molecule.
Figure 3B:
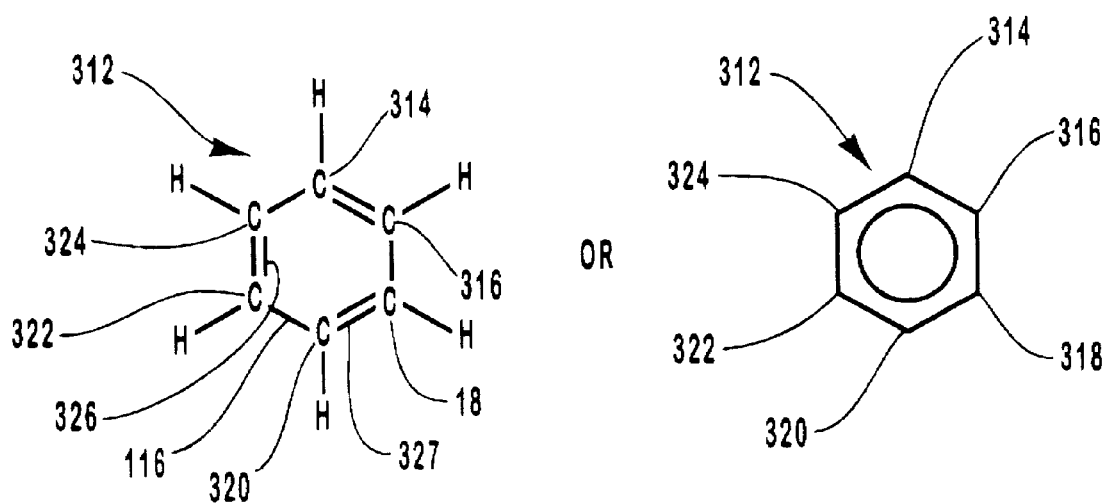
FIG. 3b illustrates the chemical structure of a benzene molecule.
Figure 3C:
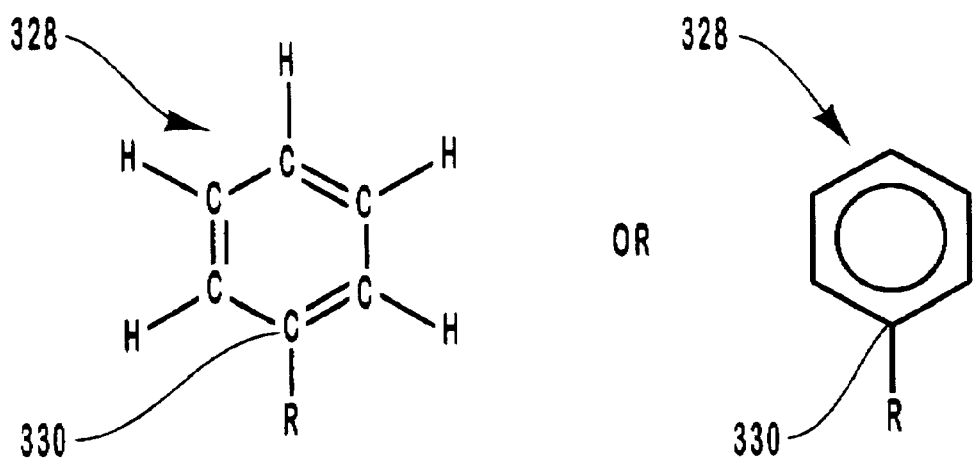
FIG. 3c illustrates the chemical structure of an aryl group.

FIG. 3a depicts the preferred endblocks of the copolymer used in the present invention, which are known as monoalkenylarene polymers 310. Breaking the term "monoalkenylarene" into its component parts is helpful in understanding the structure and function of the endblocks. "Aryl" refers to what is known as an aromatic ring bonded to another hydrocarbon group. Referring now to FIG. 3b, benzene 312, one type of aromatic ring, is made up of six carbon molecules 314, 316, 318, 320, 322 and 324 bound together in a ring-like formation. Due to the ring structure, each of the carbon atoms is bound to two adjacent carbon atoms. This is possible because each carbon atom has four bonding sites. In addition, each carbon atom C of a benzene molecule is bound to only one hydrogen atom H. The remaining bonding site on each carbon atom C is used up in a double covalent bond 326, 327, which is referred to as a double bond. Because each carbon atom has only four bonding sites, double bonding in an aromatic ring occurs between a first carbon and only one of the two adjacent carbons. Thus, single bonds 116 and double bonds 326 alternate around the benzene molecule 312. With reference to FIG. 3c, in an aryl group 328, one of the carbons 330 is not bound to a hydrogen atom, which frees up a bonding site R for the aryl group to bond to an atom or group other than a hydrogen atom.

Figure 3D:
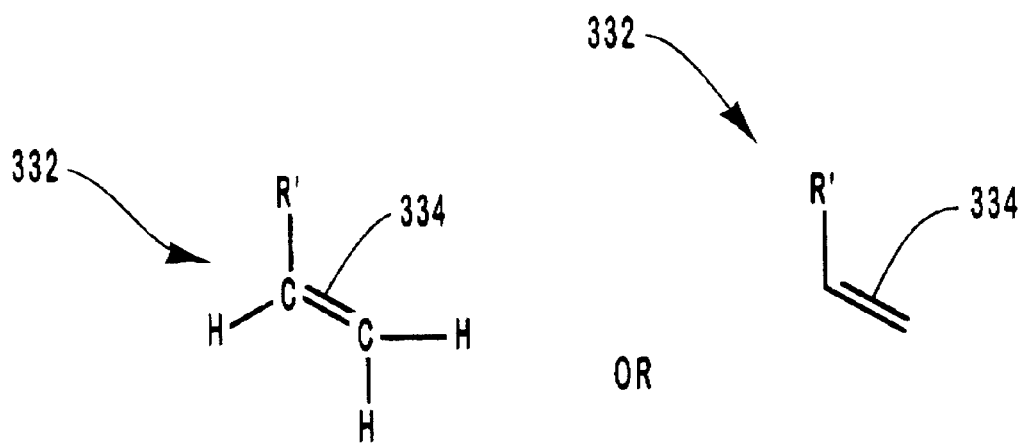
FIG. 3d illustrates the chemical structure of an -enyl group.
Figure 3E:
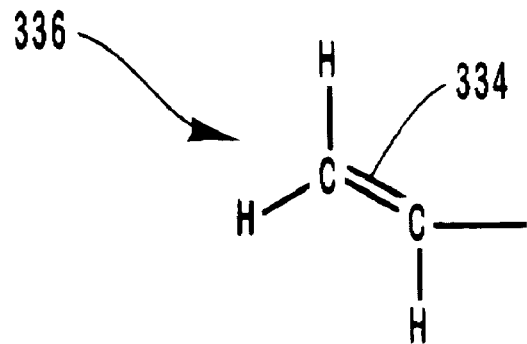
FIG. 3e illustrates the chemical structure of an ethenyl group.
Figure 3F:
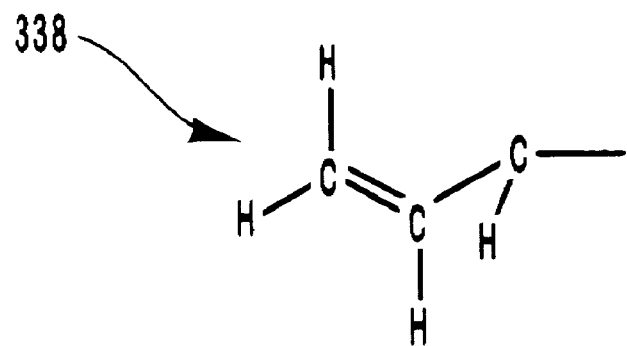
FIG. 3f illustrates the chemical structure of a propenyl group.

Turning now to FIG. 3d, "alkenyl" 332 refers to a hydrocarbon group made up of only carbon and hydrogen atoms, wherein at least one of the carbon-to-carbon bonds is a double bond 334 and the hydrocarbon group is connected to another group of atoms R', where R' represents the remainder of the hydrocarbon molecule and can include a single hydrogen atom. Specifically, the "en" signifies that a double bond is present between at least one pair of carbons. The "yl" means that the hydrocarbon is attached to another group of atoms. For example, FIG. 3e shows a two carbon group having a double bond between the carbons, which is called ethenyl 336. Similarly, FIG. 3f illustrates a three carbon group having a double bond between two of the carbons, which is called propenyl 338. Referring again to FIG. 3a, in a monoalkenylarene such as styrene, a carbon 340 of an alkenyl group 332 is bonded to the aryl group 328 at carbon atom 330, which has a free bonding site. In reference to FIG. 3c, aryl group 328 is part of a monoalkenylarene molecule when R is an alkenyl group. The "mono" of monoalkenylarene explains that only one alkenyl group is bonded to the aryl group.

The monoalkenylarene end blocks of a triblock copolymer are polymerized. Polymerization is the process whereby monomers are connected in a chain-like fashion to form a polymer. FIG. 4a depicts a polymer 410, which is basically a large chain-like molecule formed from many repeating smaller molecules, called monomers, M1, M2, M3, etc., that are bonded together. P and P' represent the ends of the polymer, which are also made up of monomers. In the present invention, illustrated by FIG. 4b, a monoalkenylarene end block polymer 414 is a chain of monoalkenylarene molecules 416a, 416b, 416c, etc. The chain of FIG. 4b is spiral, or helical, in shape due to the bonding angles between styrene molecules. P represents an extension of the endblock polymer helix in one direction, while P' represents an extension of the endblock polymer helix in the opposite direction.

As FIG. 4c shows, monoalkenylarene molecules are attracted to one another by a force that is weaker than covalent bonding. The primary weak attraction between monoalkenylarene molecules is known as hydrophobic attraction. An example of hydrophobic attraction is the attraction of oil droplets to each other when dispersed in water. Therefore, in its natural, relaxed state at room temperature, a monoalkenylarene polymer resembles a mass of entangled string 414, as depicted in FIG. 4d. The attraction of monoalkenylarene molecules to one another creates a tendency for the endblocks to remain in an entangled state. Similarly, different monoalkenylarene polymers are attracted to each other. The importance of this phenomenon will become apparent later in this discussion.

Figure 5A:
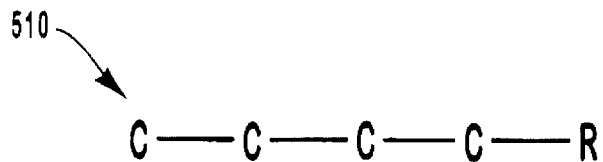
FIG. 5a illustrates the chemical structure of hydrocarbon molecules known as alkanes.
Figure 5B:
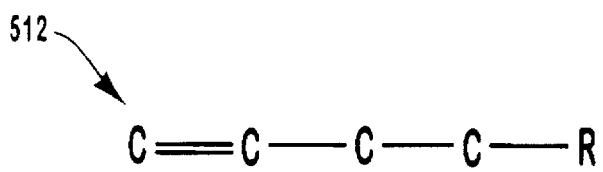
FIG. 5b illustrates the chemical structure of hydrocarbon molecules known as alkenes.
Figure 5C:
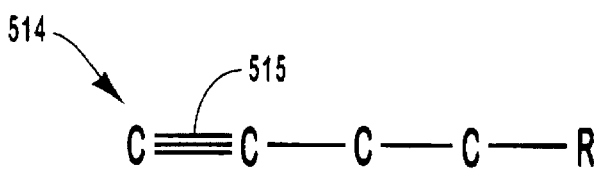
FIG. 5c illustrates the chemical structure of hydrocarbon molecules known as alkynes.

Like the end blocks of a triblock copolymer, the midblock is also a polymer. In the invention, the preferred triblock copolymer midblock is an aliphatic hydrocarbon. Traditionally, "aliphatic" meant that a hydrocarbon was "fat like" in its chemical behavior. Referring to FIGS. 5a through 5c, which do not show the hydrogen atoms for simplicity, an "aliphatic compound" is now defined as a hydrocarbon compound which reacts like an alkane 510 (a hydrocarbon molecule having only single bonds between the carbon atoms), an alkene 512 (a hydrocarbon molecule wherein at least one of the carbon-to-carbon bonds is a double bond), 514 an alkyne (a hydrocarbon molecule having a triple covalent bond 515 between at least one pair of carbon atoms), or a derivative of one of the above.

Figure 5D:
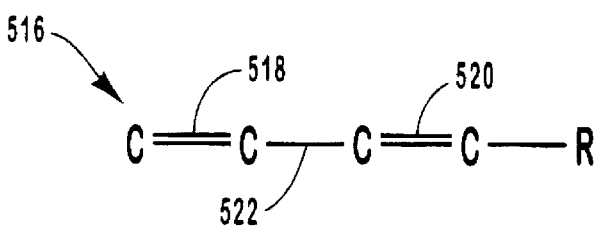
FIG. 5d illustrates the chemical structure of a hydrocarbon molecule known as a conjugated diene.
Figure 5E:
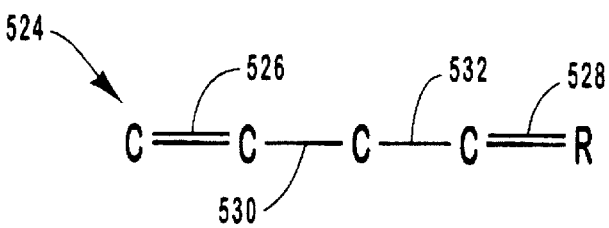
FIG. 5e illustrates the chemical structure of a hydrocarbon molecule known as an isolated diene.

Referring now to FIG. 5d, which omits the bound hydrogen atoms for simplicity, aliphatic hydrocarbons known as conjugated dienes 516 are depicted. These are the preferred midblock monomers used in the triblock copolymers of the present invention. A "diene" is a hydrocarbon molecule having two ("di") double bonds ("ene"). "Conjugated" means that the double bonds 518 and 520 are separated by only one single carbon-to-carbon bond 522. In comparison, FIG. 5e shows a hydrocarbon molecule having two double carbon-to-carbon bonds that are separated by two or more single bonds, 530, 532, etc., which is referred to as an "isolated diene" 524. When double bonds are conjugated, they interact with each other, providing greater stability to a hydrocarbon molecule than would the two double bonds of an isolated diene.

FIGS. 6a through 6d illustrate examples of various monomers useful in the midblock of the present invention, including molecules (monomers) such as ethylene-butylene (EB) 612, ethylene-propylene (EP) 614, butadiene (B) 616 (either hydrogenated or non-hydrogenated) and isoprene (I) 618 (either hydrogenated or non-hydrogenated). The different structures of these molecules provide them with different physical characteristics, such as differing strengths of covalent bonds between adjacent monomers. The various structures of monomer molecules also provides for different types of interaction between distant monomers on the same chain (e.g., when the midblock chain folds back on itself, distant monomers may be attracted to one another by a force weaker than covalent bonding, such as hydrophobic interaction, hydrophilic interaction, polar forces or Vander Waals forces).

Figure 6A:
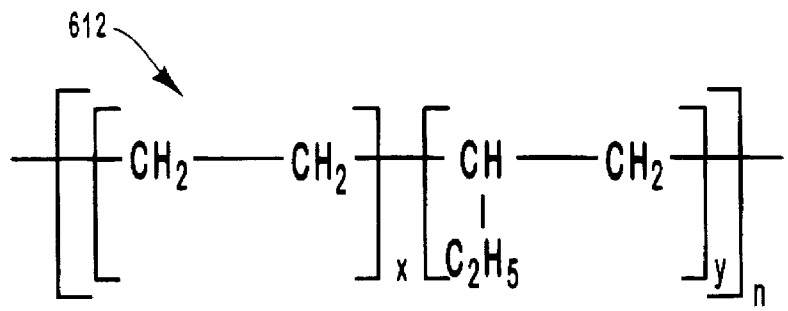
FIG. 6a illustrates the chemical structure of a poly (ethylene/butylene) molecule.
Figure 6B:
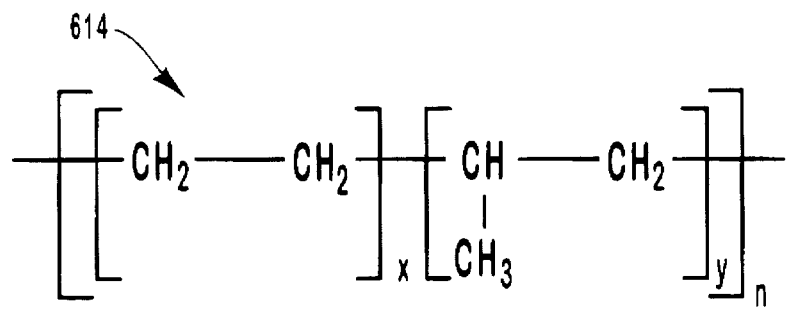
FIG. 6b illustrates the chemical structure of a poly (ethylene/propylene) molecule.
Figure 6C:
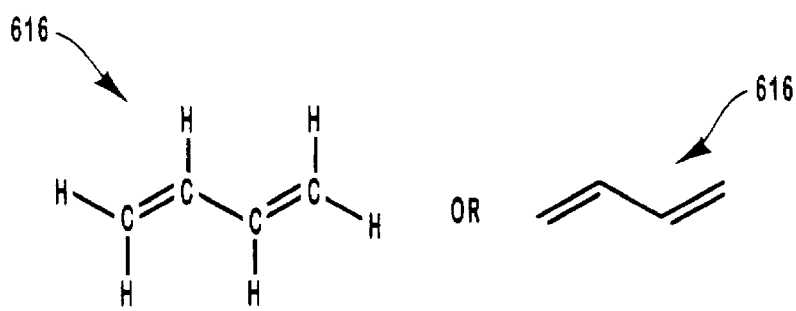
FIG. 6c illustrates the chemical structure of a 1,3-butadiene molecule.
Figure 6D:
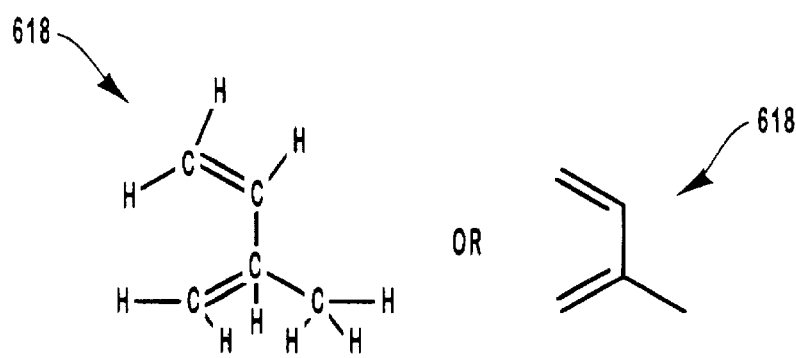
FIG. 6d illustrates the chemical structure of an isoprene molecule.

Referring to FIGS. 6a and 6b, x, y and n each represent an integral number of each bracketed unit: "x" is the number of repeating ethylene ($-CH_2-CH_2-$) units, "y" is the number of repeating butylene (in FIG. 6a) or propylene (in FIG. 6b) units, and "n" is the number of repeating poly (ethylene/butylene) units. Numerous configurations are possible.

Figure 7A:
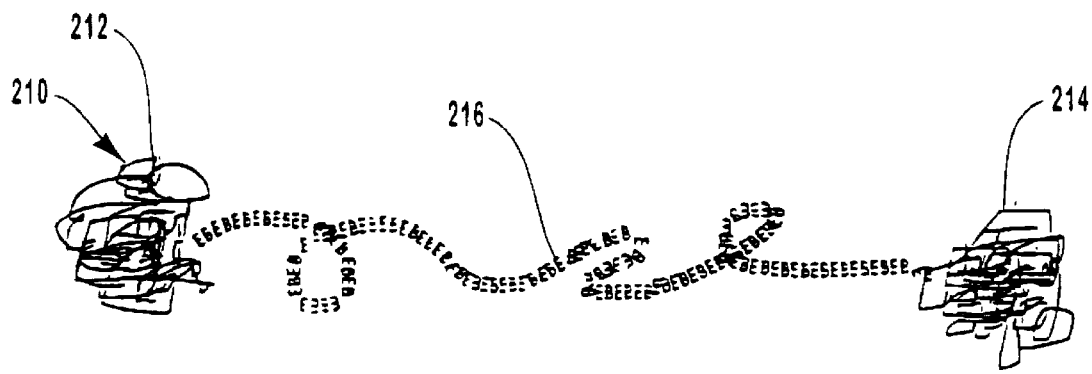
FIG. 7a illustrates polystyrene-poly(ethylene/butylene)-polystyrene.
Figure 7B:
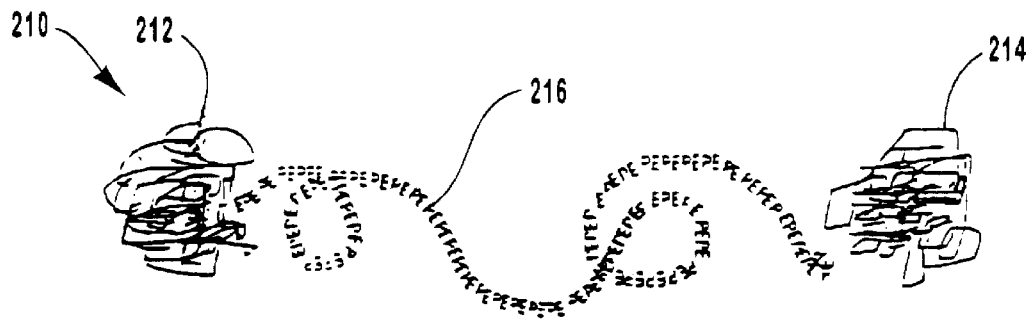
FIG. 7b illustrates polystyrene-poly(ethylene/propylene)-polystyrene.
Figure 7C:
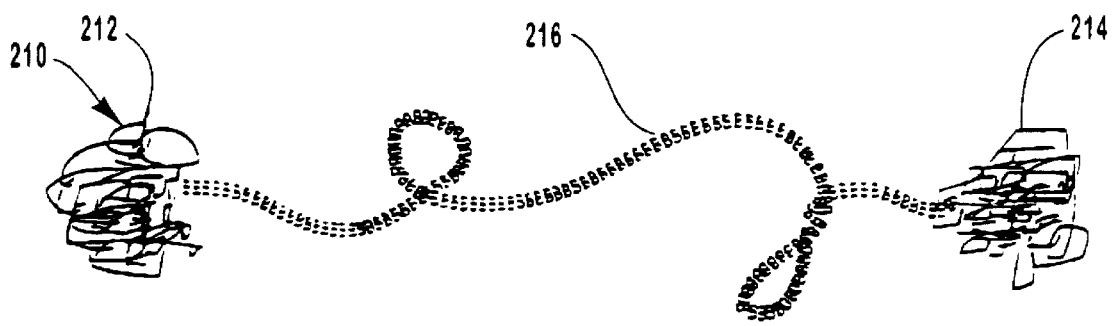
FIG. 7c illustrates polystyrene-polybutadiene-polystyrene.
Figure 7D:
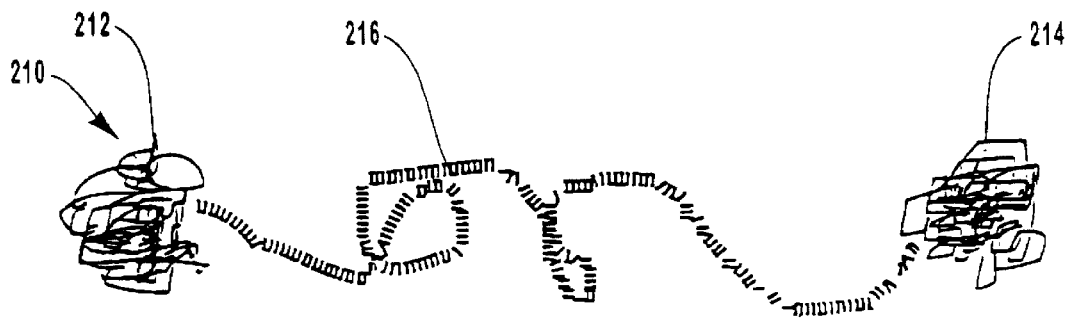
FIG. 7d illustrates polystyrene-polyisoprene-polystyrene.
Figure 7E:
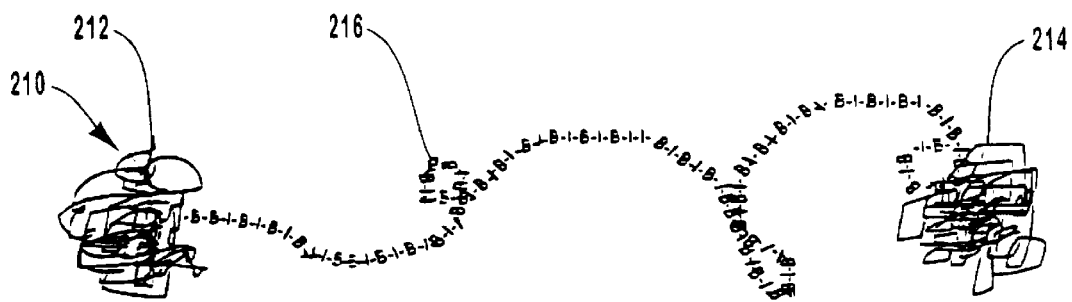
FIG. 7e illustrates polystyrene-poly(butadiene+isoprene)-polystyrene.
Figure 7F:
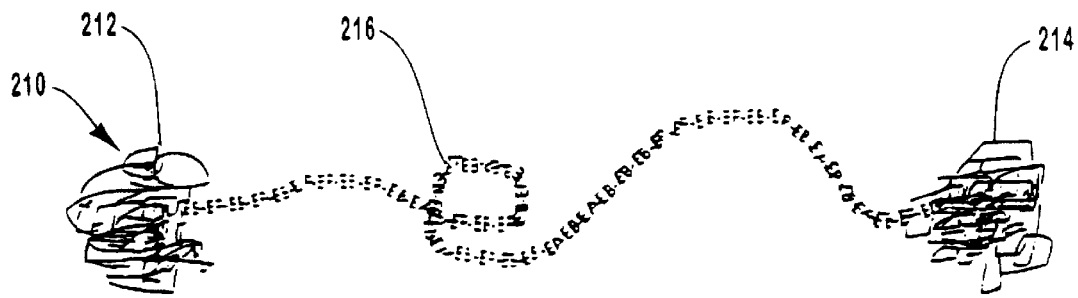
FIG. 7f illustrates polystyrene-poly(ethylene/butylene+ethylene/propylene)-polystyrene.

As shown in FIGS. 7a through 7d, the midblock may contain (i) only one type of monomer, EB, EP, B or I or, as FIGS. 7e and 7f illustrate, (ii) a combination of monomer types EB and EP or B and I, providing for wide variability in the physical characteristics of different midblocks made from different types or combination of types of monomers. The interaction of physical characteristics of each molecule (monomer and block) determines the physical characteristics of the tangible, visible material. In other words, the type or types of monomer molecules which make up the midblock polymer play a role in determining various characteristics of the material of which the midblock is a part.

Attributes such as strength, elongation, elasticity or visco-elasticity, softness, tackiness and plasticizer retention are, in part, determined by the type or types of midblock monomers. For example, referring again to FIG. 7a, the midblock polymer 216 of a triblock copolymer-containing material may be made up primarly or solely of ethylene-butylene monomers EB, which contribute to that material's physical character. With reference to FIG. 7e, in comparison to the material having a midblock made up solely of EB, a similar triblock-containing material, wherein the midblock polymer 216 of the triblocks are made up of a combination of butadiene B and isoprene I monomers, may have greatly increased strength and elongation, similar elasticity or visco-elasticity and softness, and reduced tackiness and reduced plasticizer bleed.

The monomer units of the midblock have an affinity for each other. However, the hydrophobic attraction of the midblock monomers for each other is much weaker than the non-covalent attraction of the end block monomers for one another.

Figure 8A:
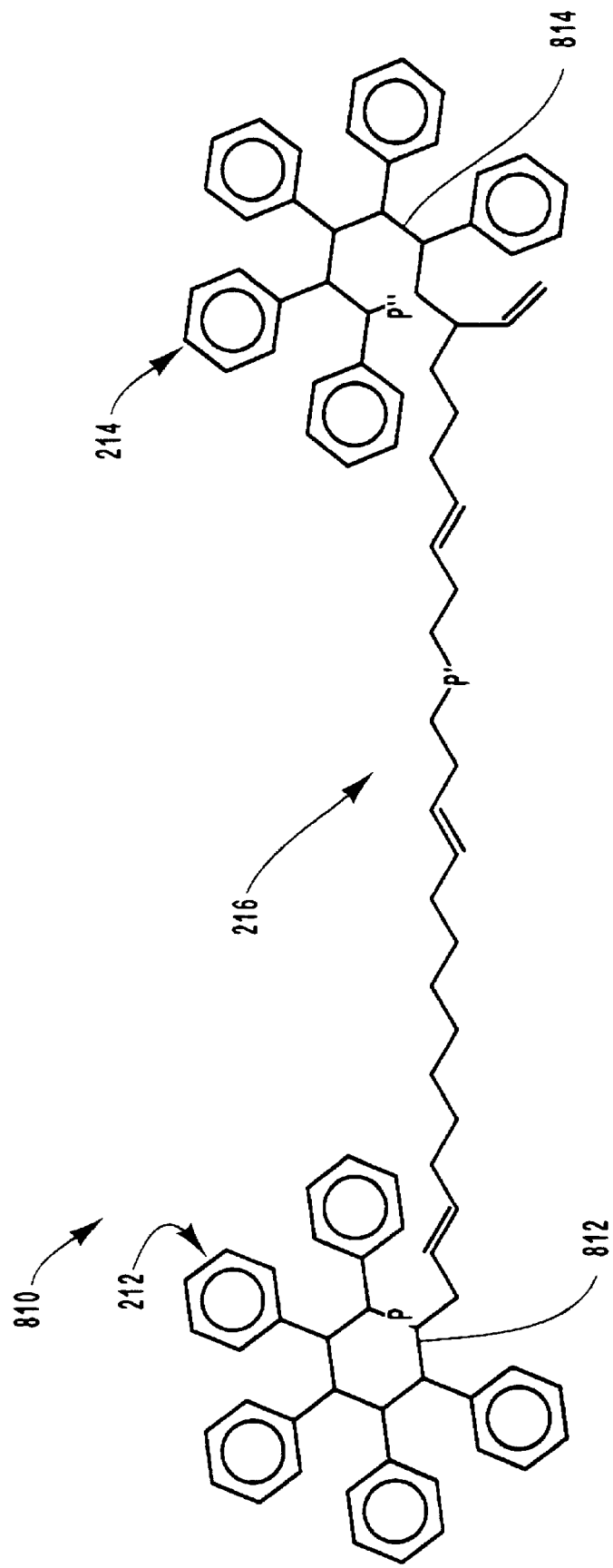
FIG. 8a illustrates the chemical structure of polystyrene-poly(ethylene/butylene+ethylene/propylene)-polystyrene.
Figure 8B:
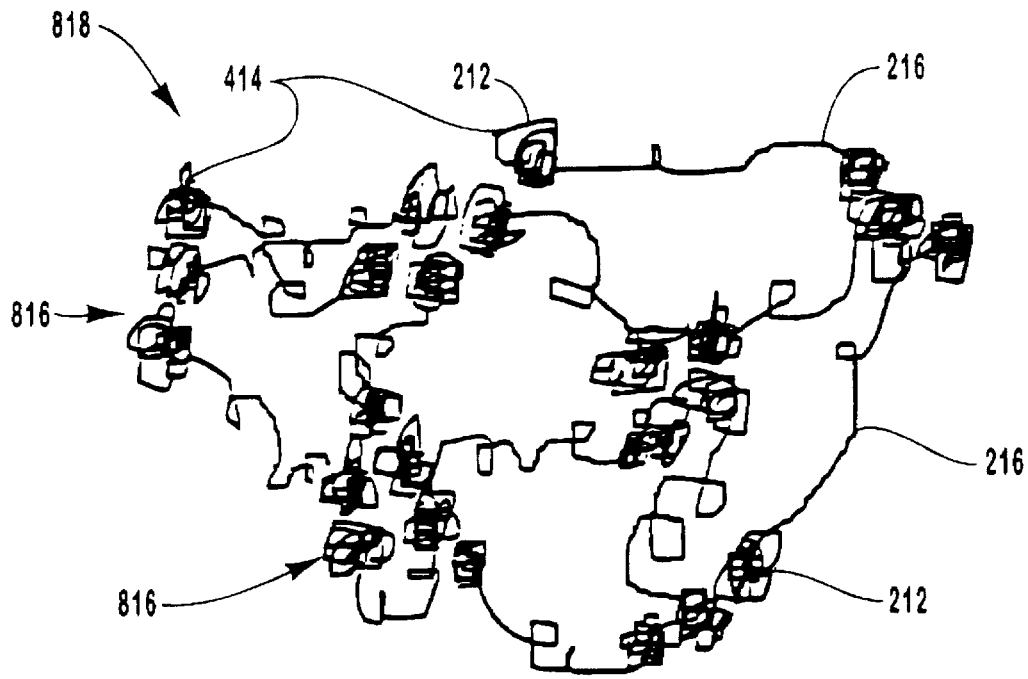
FIG. 8b illustrates a group of the triblock copolymers of FIG. 2a, showing weak attraction of the endblocks to each other.

Referring now to FIG. 8a, which shows a polystyrene-poly(butadiene+isoprene)-polystyrene triblock copolymer, in a complete triblock copolymer 810, each end 812 and 814 of midblock chain 216 is covalently bound to an end block 212 and 214. P and P" represent the remainder of the endblock polymers 212 and 214 respectively. P' represents the central portion of midblock polymer 216. Many billions of triblock copolymers combine to form a tangible material. The triblock copolymers are held together by the high affinity (i.e., hydrophobic attraction) that monoalkenylarene molecules have for one another. In other words, as FIG. 8b illustrates, the endblocks of each triblock copolymer molecule, each of which resemble an entangled mass of string 414, are attracted to the endblocks of another triblock copolymer. When several endblocks are attracted to each other, they form an accretion of endblocks, called a domain or a glassy center 816. Agglomeration of the endblocks occurs in a random fashion, which results in a three-dimensional network 818 of triblocks, the midblock 216 of each connecting endblocks 212 and 214 located at two different domains 816a and 816b. In addition to holding the material together, the domains of triblock copolymers also provide it with strength and rigidity.

Figure 9A:
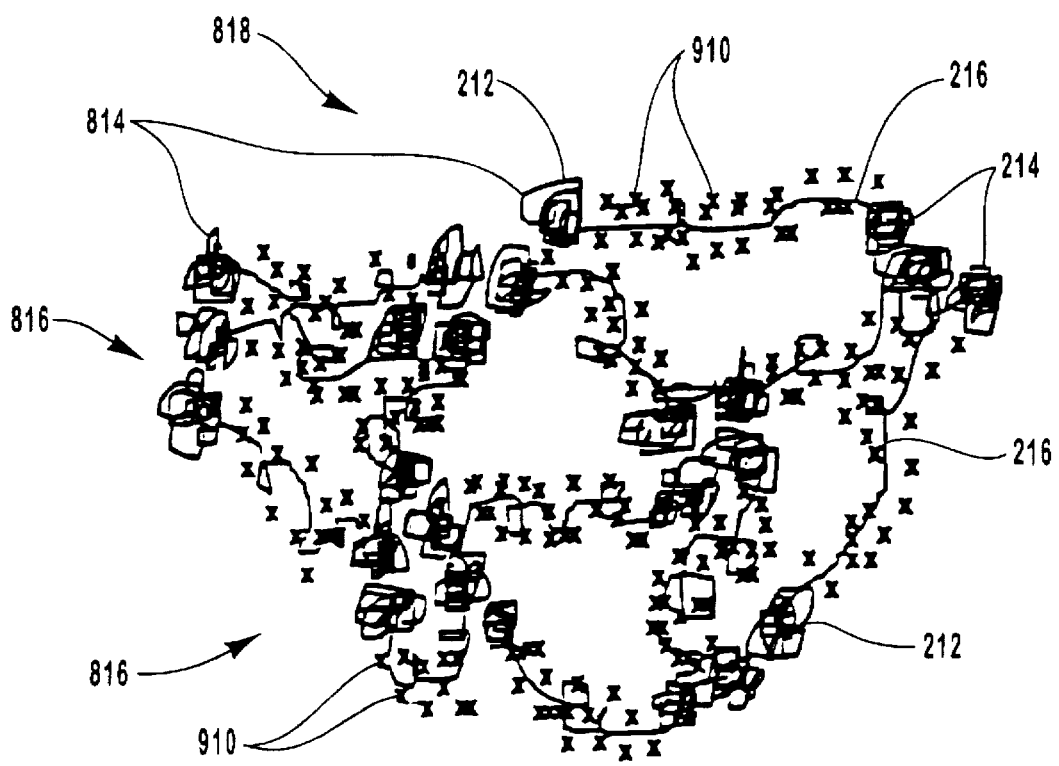
FIG. 9a illustrates plasticizer association with the group of triblock copolymers of FIG. 8b according to a preferred embodiment of the present invention.

Plasticizers are generally incorporated into a material to increase the workability, pliability and flexibility of that material. Incorporation of plasticizers into a material is known as plasticization. Chemically, plasticizers are hydrocarbon molecules which associate with the material into which they are incorporated, as represented in FIG. 9a. In the present invention, plasticizer molecules 910 associate with the triblock copolymer 210, and increase its workability, softness, elongation and elasticity or visco-elasticity. Depending upon the type of plasticizer used, the plasticizer molecules associate with either the endblocks, the midblock, or both. For reasons that will soon become apparent, Applicant prefers plasticizers 910 which associate primarily with midblock polymer 216 of triblock copolymer 818, rather than with the end blocks.

Chemists have proposed four general theories to explain the effects that plasticizers have on certain materials. These theories are known as the lubricity theory, the gel theory, the mechanistic theory and the free volume theory.

Figure 9B:
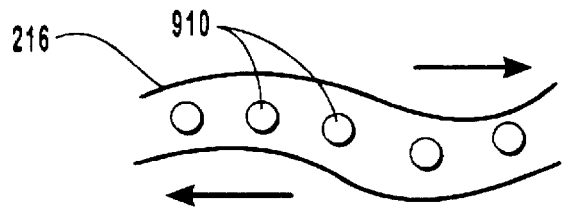
FIG. 9b illustrates the lubricity theory of plasticization, showing two midblocks (B) moving away from each other.
Figure 9C:
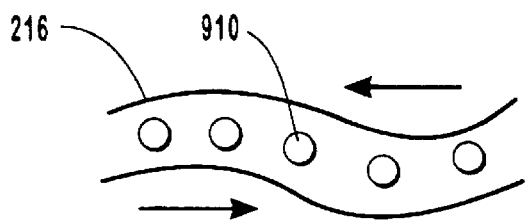
FIG. 9c illustrates the lubricity theory of plasticization, showing two midblocks (B) moving toward each other.
Figure 9D:
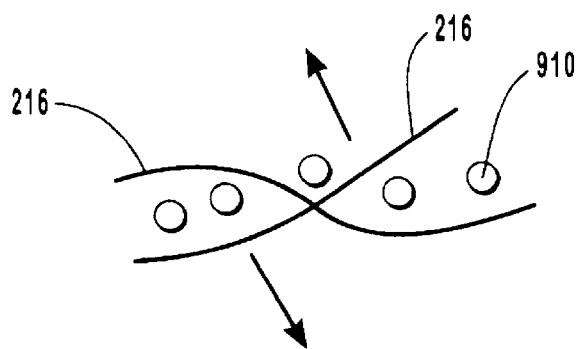
FIG. 9d illustrates the lubricity theory of plasticization, showing two midblocks (B) moving across each other.

The lubricity theory, illustrated in FIGS. 9b through 9d, assumes that the rigidity of a material (i.e., its resistance to deformation) is caused by intermolecular friction. Under this theory, plasticizer 910 lubricates the large molecules, facilitating movement of those molecules over each other. See generally, Jacqueline I. Kroschwitz, ed., CONCISE ENCYCLOPEDIA OF POLYMER SCIENCE AND ENGINEERING 734–44, Plasticizers (1990), which is hereby incorporated by reference. In the case of triblock copolymers, lubrication of the endblocks should be avoided since the endblock domains are responsible for holding the triblock copolymers together and provide the material with strength (e.g., tensile strength during elongation). Thus, a plasticizer which associates with the midblocks is preferred. According to the lubricity theory, when manipulative force is exerted on the material, plasticizer 910 facilitates movement of midblocks 216 past each other. Id. at 734–35. The arrows in the Figures represent the motion of midblocks 216 with respect to each other. FIG. 9b represents adjacent midblocks being pulled away from each other. FIG. 9c represents two midblocks being forced side-to-side. FIG. 9d represents adjacent midblocks being pulled across one another.

Figure 9E:
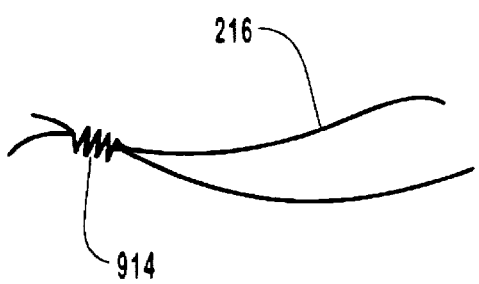
FIG. 9e illustrates the gel theory of plasticization, showing a weak attraction between two midblocks (B) when plasticizer is not present.
Figure 9F:
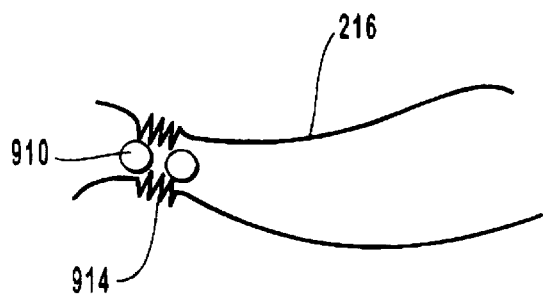
FIG. 9f illustrates the gel theory of plasticization, showing a plasticizer molecule breaking the weak attraction of FIG. 9e.

FIGS. 9e and 9f depict a second plasticization theory, the gel theory, which reasons that the resistance of amorphous polymers to deformation results from an internal, three-dimensional honeycomb structure or gel. Loose attachments between adjacent polymer chains, which occur at intervals along the chains, called attachment points, form the gel. Closer attachment between adjacent chains creates a stiffer and more brittle material. Plasticizers 910 break, or solvate, the points of attachment 914 between polymer chains, loosening the structure of the material. Thus, plasticizers produce about the same effect on a material as if there were fewer attachment points between polymer chains, making the material softer or less brittle. See Id. at 735. Since one of the purposes of the present invention is to provide a material with improved tensile strength, which is provided by agglomeration of the endblocks, according to the gel theory plasticizer 910 should associate with midblocks 216 rather than with the endblocks. Further, a plasticizer which associates with the midblock polymers decreases the attachment of adjacent midblocks, which likely decreases the rigidity while increasing the pliability, elongation and elasticity or visco-elasticity of the material. Similar to the lubricity theory, under the gel theory, reduction of attachment points between adjacent midblocks facilitates movement of the midblocks past one another as force is applied to the material.

Figure 9G:
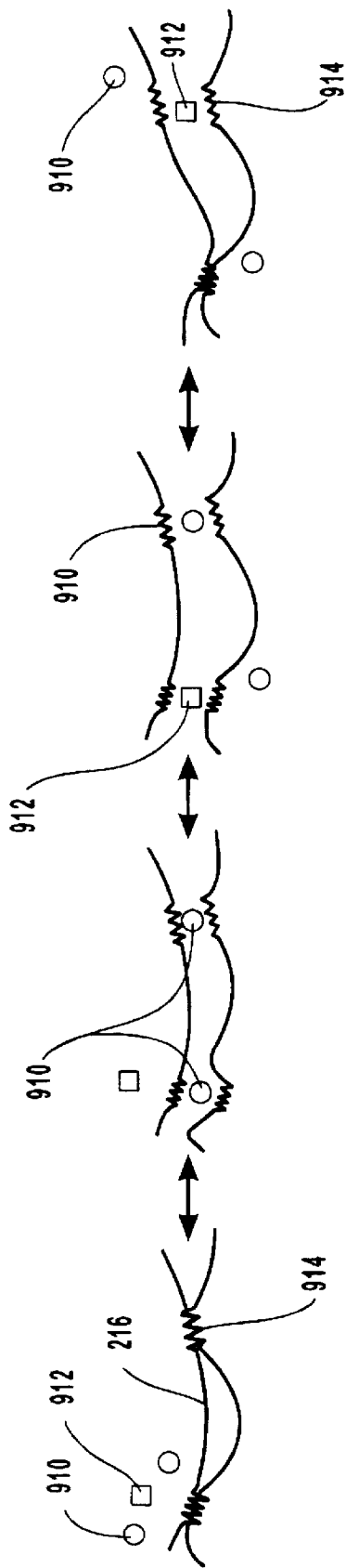
FIG. 9g illustrates the mechanistic theory of plasticization, showing an equilibrium of plasticizer breaking the weak attraction of midblocks (B) for each other.

Referring now to FIG. 9g, the mechanistic theory of plasticization assumes that different types of plasticizers 910, 912, etc. are attracted to polymer chains by forces of different magnitudes. In addition, the mechanistic theory supposes that, rather than attach permanently, a plasticizer attaches to a given attachment point only to be later dislodged and replaced by another. This continuous exchange of plasticizers 910, 912, etc., demonstrated by the Figure as different stages connected by arrows which represent an equilibrium between each stage, is known as a dynamic equilibrium between solvation and desolvation of attachment points between adjacent polymer chains. The number or fraction of attachment points affected by a plasticizer depends upon various conditions, such as plasticizer concentration, temperature, and pressure. See Id. Accordingly, as applied to the material of this invention, a large amount of plasticizer would be necessary to affect the majority of midblock attachment points and thus provide the desired amounts of rigidity, softness, pliability, elongation and elasticity or visco-elasticity.

Figure 9H:
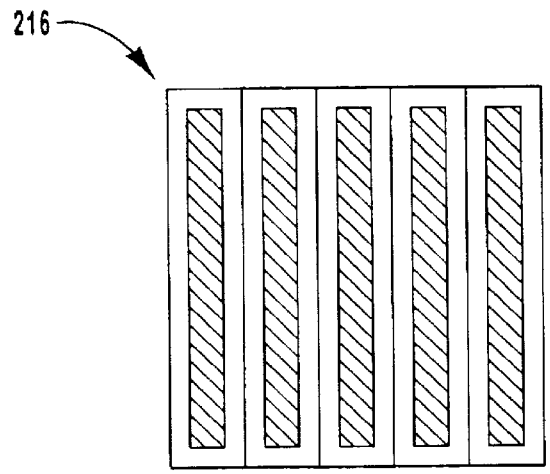
FIG. 9h illustrates the free volume theory of plasticization, showing the free space associated with a midblock (B).
Figure 9I:
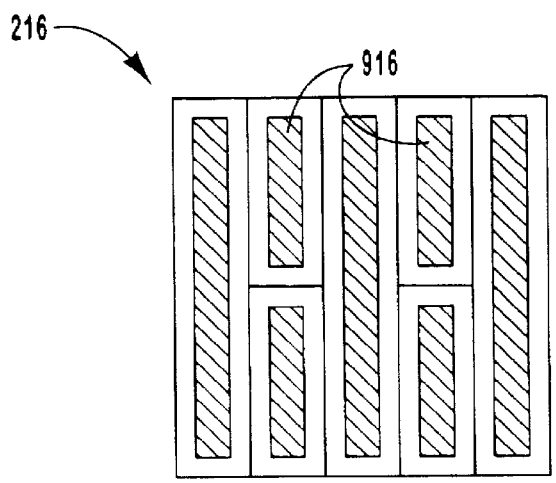
FIG. 9i illustrates the theory of FIG. 9h, showing that as smaller molecules are added, the free space in a given area increases.
Figure 9J:
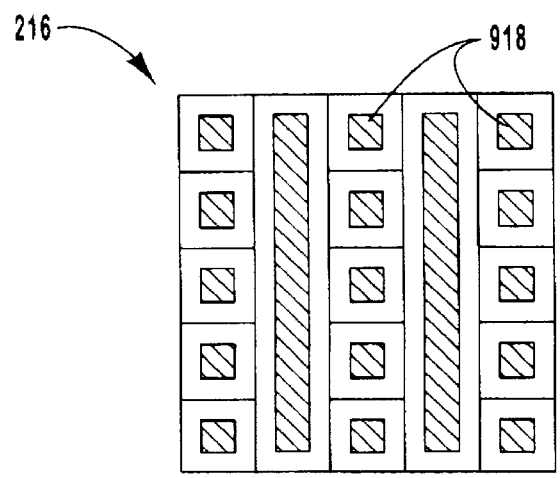
FIG. 9j illustrates the theory of FIG. 9h, showing that even smaller plasticizers provide an even greater amount of free space.

With reference to FIGS. 9h through 9j, the fourth plasticization theory, known as the free volume theory, assumes that there is nothing but free space between molecules. As molecular motion increases (e.g., due to heat), the free space between molecules increases. Thus, a disproportionate amount of that free volume is associated with the ends of the polymer chains. As FIGS. 9h through 9j demonstrate, free volume is increased by using polymers with shorter chain lengths. For example, the black rectangles of FIG. 9h represent a material made up of long midblock polymers 216. The white areas around each black rectangle represent a constant width of free space around the molecule. In FIG. 9i, a molecule 916, which is smaller than midblock 216, is added to the material, creating more free space. In FIG. 9j, an even smaller molecule 918 has been added to the material. The increase in free space within the material is evident from the increased area of white space. The crux of the free volume theory is that the increase in free space or volume allows the molecules to more easily move past one another. In other words, the use of a small (or low molecular weight) plasticizer increases the ability of the midblock polymer chains to move past each other. While the Figures provide a fair representation of the free volume theory, in reality, the increase in free space would be much greater since molecules are three-dimensional structures.

Similarly, the use of polymers with flexible side chains create additional free volume around the molecule, which produces a similar plasticization-like effect, called internal plasticization. Applicant believes that incorporation of monomers into the midblock, which create flexible side chains thereon, including but not limited to isoprene (either hydrogenated or non-hydrogenated) and ethylene propylene monomers, creates internal plasticization. In comparision, the addition of an even smaller plasticizer molecule, described above, increases the free space at a given location; this is external plasticization. The size and shape of plasticizing molecule and the nature of its atoms and groups of atoms (i.e., nonpolar, polar, hydrogen bonding or not, and dense or light) determines its plasticizing ability on a specific polymer. See Id.

With this general background in mind, Applicant will explain the formulation, chemical structure and performance of the present invention.

B. Definitions

For the reader's convenience, Applicant has defined several terms which are used throughout the description of the present invention. Additionally, other terms have been defined throughout the specification.

1. Elastic

"Elastic," as defined herein, refers to a characteristic of materials which return substantially to their original shape following deformation and the subsequent cessation of deforming force.

2. Rebound Rate

"Rebound Rate," as defined herein, is the amount of time it takes a one inch long piece of material to rebound to within about five percent of its original shape and size following the release of stress which elongates the material to a length of two inches. Preferably, the elastomeric material of the present invention has a rebound rate of about one second or less.

"Instantaneous Rebound," as defined herein, refers to a characteristic of a one inch long piece of an elastic material which returns substantially to its original size and shape in times of about one second or less following the release of stress which elongates the material to a length of two inches.

3. Resins

The term "resin" is defined herein as a solid or semisolid fusible, organic substance that is usually transparent or translucent, is soluble in organic solvent but not in water and is an electrical nonconductor, and includes tackifiers.

"Resinous" as used herein refers to resins and resin-like materials.

"Resinous plasticizers" as used herein refers to plasticizers which include a majority, by weight, of a resin.

"Tackifier" as used herein refers to resins that add tack to the resulting mixture. The primary function of a tackifier is to add tack. The secondary functions of tackifiers include modification of both melt viscosity and melt temperature.

Tackifiers are normally low molecular weight and high $T_g$ materials, and are sometimes characterized as highly condensed acrylic structures. The most commonly used tackifiers are rosin derivatives, terpene resins, and synthetic or naturally derived petroleum resins. A tackifier's effectiveness is largely determined by its compatibility with the rubber component and by its ability to improve the tackiness of a material.

"Low molecular weight," as defined herein with reference to resins, means resins having a weight average molecular weight of less than about 50,000.

Resins and tackifiers are used in some preferred embodiments of the present invention.

4. Molecular Weight

"Number Average Molecular Weight" ($M_n$), as determined by gel permeation chromatography, provides information about the lower moleular weight parts of a hydrocarbon molecule.

"Weight Average Molecular Weight" ( as determined by gel permeation chromatography, indicates the average molecular weight of a hydrocarbon molecule. This is the value that is commonly used in reference to the molecular weight of a hydrocarbon molecule.

"Z-Average Molecular Weight" ($M_z$), as determined by gel permeation chromatography is used as an indication of the high-molecular-weight portion of a hydrocarbon molecule. When the hydrocarbon molecule is a resin, the Z-average molecular weight indicates the compatibility and adhesive properties of that resin.

Molecular weight values may also be determined by any of several other methods, such as the Flory viscosity method, the Staudinger viscosity method, and light scattering in combination with high performance liquid chromatography.

5. Cloud Point Tests

The following values, which are determined by cloud point tests, are useful in determining the compatibility of a resin with different types of materials.

"MMAP," as defined herein, is a measurement of aromatic solubility and determines the aliphatic/aromatic character of a resin. The MMAP value is obtained by dissolving a resin in a high temperature mixture of one part methylcyclohexane and two parts aniline, and cooling the solution while mixing to determine the temperature at which the mixture starts becoming cloudy, which is commonly referred to as the cloud point. The lower the MMAP value, the greater the aromaticity and lower the aliphaticity of the resin.

"DACP," as defined herein, is a value which determines the polarity of a resin due to the highly polar nature of the solvent system. In order to determine the DACP value of resin, the resin must first be dissolved in a heated 1:1 mixture of xylene and 4-hydroxy-4-methyl-2-pentanone. The solution is then cooled with mixing. The temperature at which the solution begins becoming opaque is the cloud point, which is the DACP value.

Since specific adhesion is related to the polarity of a resin, the DACP value can be used as a specific adhesion indicator. Lower DACP values indicate greater specific adhesion.

"OMSCP," as defined herein, is a value which is related to the molecular weight and molecular weight distribution of a resin. OMSCP can determine the compatibility characteristics of a resin/polymer system. The higher the OMS cloud point, the greater the molecular weight and the molecular weight distribution of a resin. In particular, high OMSCP values can indicate the presence of high molecular weight materials (of Z-average molecular weight).

The term "OMSCP" is derived from the method for determining OMSCP values. A resin is first dissolved in a high temperature mixture of odorless mineral spirits (OMS). The solution is then cooled with mixing. The temperature at which the mixture starts becoming cloudy is referred to as the cloud point (CP), or OMSCP value.

C. Gel Formulations

1. Materials

The compositions of the present invention are low durometer (as defined in the summary above) elastomeric compounds which include an elastomeric polymer component and a plasticizer component.

Tri-block polymers of the general configuration A-B-A, wherein the A represents a crystalline polymer such as a monoalkenylarene polymer and the B is an elastomeric polymer, are known and have been used by many as an additive to other materials to decrease the rigidity of those materials.

Many practitioners in the art add other materials when oil extending A-B-A tri-block copolymers. For example, the addition of polypropylene is believed by many in the art to significantly increase the strength and rigidity of oil extended elastomers. Similarly, many in the art add A-B diblock copolymers to oil-extended triblock copolymers to reduce oil bleed.

The elastomer component of the preferred material of the invention includes a triblock polymer of the general configuration A-B-A, wherein the A represents a crystalline polymer such as a monoalkenylarene polymer, including but not limited to polystyrene and functionalized polystyrene, and the B is an elastomeric polymer such as poly(ethylene/butylene), hydrogenated poly(isoprene), hydrogenated poly (butadiene), hydrogenated poly(isoprene+butadiene), poly(ethylene/propylene) or hydrogenated poly(ethylene/butylene+ethylene/propylene), or others. The A components of the material link to each other to provide strength, while the B components provide elasticity. Polymers of greater molecular weight are achieved by combining many of the A components in the A portions of each A-B-A structure and combining many of the B components in the B portion of the A-B-A structure, along with the networking of the A-B-A molecules into large polymer networks.

A preferred elastomer for making the material of the invention is a very high to ultra high molecular weight elastomer and oil compound having an extremely high Brookfield Viscosity (hereinafter referred to as "solution viscosity"). Solution viscosity is generally indicative of molecular weight. "Solution viscosity" is defined as the viscosity of a solid when dissolved in toluene at 25–30° C., measured in centipoises (cps). "Very high molecular weight" is defined herein in reference to elastomers having a solution viscosity, 20 weight percent solids in 80 weight percent toluene, the weight percentages being based upon the total weight of the solution, from greater than about 20,000 cps to about 50,000 cps. An "ultra high molecular weight elastomer" is defined herein as an elastomer having a solution viscosity, 20 weight percent solids in 80 weight percent toluene, of greater than about 50,000 cps. Ultra high molecular weight elastomers have a solution viscosity, 10 weight percent solids in 90 weight percent toluene, the weight percentages being based upon the total weight of the solution, of about 800 to about 30,000 cps and greater. The solution viscosities, in 80 weight percent toluene, of the A-B-A elastomer components useful in the present invention are substantially greater than 30,000 cps. The solution viscosities, in 90 weight percent toluene, of the A-B-A elastomers useful in the present invention are in the range of about 2,000 cps to about 20,000 cps. Thus, the preferred elastomer component of the present invention has a very high to ultra high molecular weight.

Surprisingly, in light of the existing art, oil extension of elastomers having high and ultra high solution viscosities resulted in much stronger compounds having a very low durometer. "Very low durometer" refers to durometer measurements in the range of about Gram Bloom 20 to about Shore A 15.

At first, it seemed as though the tensile strength of a plasticizer-extended copolymer and the molecular weight of the copolymer were somewhat proportionately related. In fact, when plasticized, many high and ultra high molecular weight block copolymers exhibit improved tensile strength over materials which contain lower molecular weight copolymers. However, during the process of developing the material of the invention, Applicant discovered that, after surpassing a certain optimum molecular weight range, some elastomers exhibit lower tensile strength than similar materials with optimum molecular weight copolymers. Thus, merely increasing the molecule weight of the elastomer will not always result in increased tensile strength.

Kuraray Co. Ltd. of Tokyo, Japan has stated that the solution viscosity of SEPTON 4055, the most preferred A-B-A triblock copolymer for use in the material of the invention, 10% solids in 90% toluene at 25° C., is about 5,800 cps. Kuraray also said that the solution viscosity of SEPTON 4055, 5% solids in 95% toluene at 25° C., is about 90 cps. Although Kuraray has not provided a solution viscosity, 20% solids in 80% toluene at 25° C., an extrapolation of the two data points given shows that such a solution viscosity would be about 400,000 cps. Applicant reads the prior art as consistently teaching away from such high solution viscosities.

Applicant confirmed Kuraray's data by having an independent laboratory, SGS U.S. Testing Company Inc. of Fairfield, N.J., test the solution viscosity of SEPTON 4055. When SGS attempted to dissolve 20% solids in 80% toluene at 25° C., the resulting material did not resemble a solution, and the solution viscosity according to that test was so high that it was not measurable, if the material in 80% solvent was indeed a solution at all and not an elastomeric solid. Therefore, SGS determined the solution viscosity of SEPTON 4055 using 10% solids in 90% toluene at 25° C., which resulted in a 3,040 cps solution.

The elastomeric B portion of the preferred A-B-A polymers has an exceptional affinity for most plasticizing agents, including but not limited to several types of oils. When the network of A-B-A molecules is denatured, plasticizers which have an affinity for the B block can readily associate with the B blocks. Upon renaturation of the network of A-B-A molecules, the plasticizer remains highly associated with the B portions, resulting in a very low durometer, very strong elastomer having little or no oil bleed even at very high oil:elastomer ratios. The reason for this performance may be any of the theories explained above (i.e., lubricity theory, gel theory, mechanistic theory, and free volume theory).

The elastomer used in the invention is preferably an ultra high molecular weight polystyrene-hydrogenated poly (isoprene+butadiene)-polystyrene, such as those sold under the brand names SEPTON 4045, SEPTON 4055 and SEPTON 4077 by Kuraray, an ultra high molecular weight polystyrene-hydrogenated polyisoprene-polystyrene such as the elastomers made by Kuraray and sold as SEPTON 2005 and SEPTON 2006, or an ultra high molecular weight polystyrene-hydrogenated polybutadiene-polystyrene, such as that sold as SEPTON 8006 by Kuraray. High to very high molecular weight polystyrene-hydrogenated poly(isoprene+ butadiene)-polystyrene elastomers, such as that sold under the trade name SEPTON 4033 by Kuraray, are also useful in some embodiments of the present invention because they are easier to process than the preferred ultra high molecular weight elastomers due to their effect on the melt viscosity of the material.

Following hydrogenation of the midblocks of each of SEPTON 4033, SEPTON 4045, SEPTON 4055, and SEPTON 4077, less than about 10 percent of the double bonds remain. Thus, substantially all of the double bonds are removed from the midblock by hydrogenation.

Applicant's most preferred elastomer for use in the present invention is SEPTON 4055 or another material that has similar chemical and physical characteristics. SEPTON 4055 has the optimum molecular weight (approximately 300,000, as determined by Applicant's gel permeation chromatography testing). SEPTON 4077 has a somewhat higher molecular weight, and SEPTON 4045 has a somewhat lower molecular weight than SEPTON 4055. Materials which include either SEPTON 4045 or SEPTON 4077 as the principle elastomer typically have lower tensile strength than similar materials made with SEPTON 4055.

Other materials with chemical and physical characteristics similar to those of SEPTON 4055 include other A-B-A triblock copolymers which have a hydrogenated midblock polymer that is made up of at least about 30% isoprene monomers and at least about 30% butadiene monomers, the percentages being based on the total number of monomers that make up the midblock polymer. Similarly, other A-B-A triblock copolymers which have a hydrogenated midblock polymer that is made up of at least about 30% ethylene/ propylene monomers and at least about 30% ethylene/ butylene monomers, the percentages being based on the total number of monomers that make up the midblock polymer, are materials with chemical and physical characteristics similar to those of SEPTON 4055.

Mixtures of elastomers are also useful as the elastomer component of some of the formulations of the present invention. In elastomer mixtures, each elastomer contributes different properties to the material. For example, high strength elastomers are desired to improve the tensile strength and durability of a material. However, some high strength elastomers are very difficult to process with some plasticizers. Thus, in such a case, elastomers which improve the processability of the materials are desirable.

In particular, the process of extending SEPTON 4055 with paraffinic white mineral oil is improved via a lower melt viscosity by using a small amount of more flowable elastomer such as SEPTON 8006, SEPTON 2005, SEPTON 2006, or SEPTON 4033, to name only a few, without significantly changing the physical characteristics of the material.

In a second example of the usefulness of elastomer mixtures in the materials of the invention, many elastomers are not good compatibilizers. Thus, the use of small amount of elastomers which improve the uniformity with which a material mixes are desired. KRATON® G1701, manufactured by Shell Chemical Company of Houston, Tex., is one such elastomer that is useful in the present invention.

Many other elastomers, including but not limited to triblock copolymers and diblock copolymers are also useful in the present invention. Applicant believes that elastomers having a significantly higher molecular weight than the ultra-high molecular weight elastomers useful in the present invention increase the softness of a plasticizer extended material, but decrease its strength. Thus, high to ultra high molecular weight elastomers, as defined above, are desired for use in the material of the present invention due to their strength when combined with a plasticizer.

2. Additives a. Detackifiers

The elastomeric materials of the present invention may include a detackifier. Tack is not a desirable feature in many potential uses for the materials of the invention. For example, a ball made from a preferred material of the invention should not be tacky, but may accumulate dirt on its exterior. However, some of the elastomeric copolymers and plasticizers useful in the present invention impart tack to the materials of the invention. For example, a bandage made from a material of the invention may be tacky on one side to facilitate adhesion to human skin.

Soaps, detergents and other surfactants have detackifying abilities and are useful in the present invention. "Surfactants," as defined herein, refers to soluble surface active agents which contain groups that have opposite polarity and solubilizing tendencies. Surfactants form a monolayer at interfaces between hydrophobic and hydrophilic phases; when not located at a phase interface, surfactants form micelles. Surfactants have detergency, foaming, wetting, emulsifying and dispersing properties. Sharp, D. W. A., DICTIONARY OF CHEMISTRY, 381–82 (Penguin, 1990). For example, coco diethanolamide, a common ingredient in shampoos, is useful in the present invention as a detackifying agent. Coco diethanolamide resists evaporation, is stable, relatively non-toxic, non-flammable and does not support microbial growth. Many different soap or detergent compositions could be used as well.

Other known detackifiers include glycerin, epoxidized soybean oil, dimethicone, tributyl phosphate, block copolymer polyether, diethylene glycol mono oleate, and silicone to name only a few. Glycerine is available from a wide variety of sources. Witco Corp. of Greenwich, Conn. sells epoxidized soybean oil as DRAPEX 6.8. Dimethicone is available from a variety of vendors, including GE Specialty Chemicals of Parkersburg, W. Va. under the trade name GE SF 96-350. C.P. Hall Co. of Chicago, Ill. markets block copolymer polyether as PLURONIC L-61. C. P. Hall Co. also manufactures and markets diethylene glycol mono oleate under the name Diglycol Oleate—Hallco CPH-I-SE. Other emulsifiers and dispersants are also useful in the material of the present invention.

Nevertheless, tacky materials are desirable in some uses of the materials of the present invention. However, contact with such tacky materials may be undesirable. Thus, in some applications where tacky materials are preferred, a barrier is needed to cover the tack and isolate it from unwanted contact. Examples of tack barriers which are useful for covering the materials of the present invention include stretchable fabrics such as that manufactured and sold by DuPont Corporation of Wilmington, Del. and sold under the trade name LYCRA; stretchable fabrics coated with a thin layer of water and/or oil resistant material including but not limited to polyurethane, latex, neoprene and poly (vinylchloride); plastic films; non-tacky elastomeric layers (i.e., elastomers which are less tacky than the elastomeric material of the invention); and adhesion of particulate matter or fibers (such as microspheres, lint, short threads, talc, or others), including but not limited to discontinuous fibers to the outer surface of the tacky material. Other materials may be used as a barrier or detackifier as well.

When placed in a tight-weave, stretchable fabric, the materials of the invention do not escape, even when subjected to a great deal of pressure, such as being repeatedly driven over by an automobile. Further, the most preferred embodiments exhibit no migration of plasticizers, even when placed against materials which readily exhibit a high degree of capillary action, such as paper, at room temperature.

b. Antioxidants

A preferred compound of the present invention also includes additives such as an antioxidant. Antioxidants such as those sold under the trade names IRGANOX 1010 and IRGAFOS 168 by Ciba-Geigy Corp. of Tarrytown, N.Y. are useful by themselves or in combination with other antioxidants in the preferred materials of the present invention.

Antioxidants protect the preferred materials of the present invention against thermal degradation during processing which requires or generates heat. In addition, antioxidants provide long term protection from free radicals. A preferred antioxidant inhibits thermo-oxidative degradation of the compound or material to which it is added, providing long term resistance to polymer degradation. Preferably, an antioxidant added to the preferred materials of the present invention is useful in food packaging applications, subject to the provisions of 21 C.F.R. § 178.2010 and other laws.

Heat, light (in the form of high energy radiation), mechanical stress, catalyst residues, and reaction of a material with impurities all cause oxidation of the material. In the process of oxidation, highly reactive molecules known as free radicals are formed and react in the presence of oxygen to form peroxy free radicals, which further react with organic material (hydrocarbon molecules) to form hydroperoxides.

The two major classes of antioxidants are the primary antioxidants and the secondary antioxidants. Peroxy free radicals are more likely to react with primary antioxidants than with most other hydrocarbons. In the absence of a primary antioxidant, a peroxy free radical would break a hydrocarbon chain. Thus, primary antioxidants deactivate a peroxy free radical before it has a chance to attack and oxidize an organic material.

Most primary antioxidants are known as sterically hindered phenols. One example of sterically hindered phenol is the $C_{73}H_{108}O_{12}$ marketed by Ciba-Geigy as IRGANOX 1010, which has the chemical name 3,5-bis(1,1-dimethylethyl)-4-hydroxybenzenepropanoic acid,2,2-bis [[3-[3,5-bis(dimethylethyl)-4-hydroxyphenyl]-1-oxopropoxy]methyl]1,3-propanediyl ester. The FDA refers to IRGANOX 1010 as tetrakis[methylene(3,5-di-tert-butyl-4-hydroxyhydrocinnimate)]methane. Other hindered phenols are also useful as primary antioxidants in the present invention.

Similarly, secondary antioxidants react more rapidly with hydroperoxides than most other hydro-carbon molecules. Secondary antioxidants have been referred to as hydroperoxide decomposers. Thus, secondary antioxidants protect organic materials from oxidative degradation by hydroperoxides.

Commonly used secondary antioxidants include the chemical classes of phosphites/phosphonites and thioesters, many of which are useful in the materials of the present invention. The hydroperoxide decomposer used by Applicant is a $C_{42}H_{63}O_3P$ phosphite known as Tris(2,4-di-tert-butylphenyl)phosphite and marketed by Ciba-Geigy as IRGAFOS 168.

It is known in the art that primary and secondary antioxidants form synergistic combinations to ward off attacks from both peroxy free radicals and hydroperoxides.

Other antioxidants, including but not limited to multifunctional antioxidants, are also useful in the present invention. Multifunctional antioxidants have the reactivity of both a primary and a secondary antioxidant. IRGANOX 1520 D, manufactured by Ciba-Geigy Corp. of Tarrytown, N.Y. is one example of a multifunctional antioxidant.

Preferably, the materials of the present invention include up to about three weight percent antioxidant, based on the weight of the elastomer component, when only one type of antioxidant is used. When a combination of antioxidants is used, each may comprise up to about three weight percent, based on the weight of the elastomer component. In the presently most preferred embodiment of the present invention, the materials include 2.5 weight percent primary antioxidant and 2.5 weight percent secondary antioxidant, both percentages based on the weight of the elastomer component of the material. Additional antioxidants may be added for severe processing conditions involving excessive heat or long duration at a high temperature.

Applicant has unexpectedly found that the use of excess antioxidants reduces or eliminates tack on the exterior surface of the material of the invention. Excess antioxidants tend to migrate to the exterior surface of the material following compounding of the material. Such migration occurs over substantial periods of time, from hours to days or even longer. The migration of antioxidants to the exterior surface of the material is facilitated by lubricants that are not compatible with the A-B-A triblock copolymers useful in the material of the invention, such as linseed oil, castor oil, or others.

C. Flame retardants

Flame retardants may also be added to the materials of the present invention. Flame retardants useful in the invention include but are not limited to diatomaceous earth flame retardants sold as GREAT LAKES DE 83R and GREAT LAKES DE 79 by Great Lakes Filter, Division of Acme Mills Co. of Detroit, Mich. Most flame retardants that are useful in elastomeric materials are also useful in the materials of the present invention. In particular, applicant prefers the use of food grade flame retardants which do not significantly diminish the physical properties of the materials of the invention. Applicant has succeeded using flame retardants, such as SAFOAM FP-45, manufactured by Reedy International Corporation of Keyport, N.J. and others, to make a material of the invention that is self-extinguishing.

d. Colorants

Colorants may also be used in the materials of the present invention. Any colorant which is compatible with elastomeric materials may be used in the materials of this invention. In particular, Applicant prefers to use aluminum lake colorants such as those manufactured by Warner Jenkinson Corp. of St. Louis, Mo.; pigments manufactured by Day Glo Color Corp. of Cleveland, Ohio; Lamp Black, such as that sold by Spectrum Chemical Manufacturing Corp. of Gardena, Calif.; and Titanium Dioxide (white). By using these colorants, Applicant has made materials that are intense shades of pink, red, orange, yellow, green, blue, violet, brown, flesh, white and black.

e. Other additives

Other additives may also be added to the material of the invention. Additives such as foaming facilitators, tack modifiers, plasticizer bleed modifiers, flame retardants, melt viscosity modifiers, melt temperature modifiers, tensile strength modifiers, and shrinkage inhibitors are useful in specific embodiments of the material of the invention.

Melt temperature modifiers useful in the present invention include diblock copolymers of the general configuration A-B and triblock copolymers of the general configuration A-B-A wherein the end block A polymers include functionalized styrene monomers, cross-linking agents, hydrocarbon resins and others.

Tack modifiers which tend to reduce tack and are useful in the materials of the present invention include surfactants, dispersants, emulsifiers, and others. Tack modifiers which tend to increase the tack of the material and which are useful in the materials of the present invention include hydrocarbon resins, polyisobutylene, butyl rubber and others.

Foam facilitators that are useful in the material of the invention include polyisobutylene, butyl rubber, surfactants, emulsifiers, dispersants and others.

Plasticizer bleed modifiers which tend to reduce plasticizer exudation from the material of the invention and which are useful therein include hydrocarbon resins, elastomeric diblock copolymers, polyisobutylene, butyl rubber, transpolyoctenylene rubber (tor rubber), and others.

Flame retardants useful in the invention include halogenated flame retardants, non-halogenated flame retardants, and volatile, non-oxygen gas forming chemicals.

Melt viscosity modifiers that tend to reduce the melt viscosity of the pre-compounded component mixture of the invention include hydrocarbon resins, transpolyoctenylene rubber, castor oil, linseed oil, non-ultra high molecular weight thermoplastic rubbers, surfactants, dispersants, emulsifiers, and others.

Melt viscosity modifiers that tend to increase the melt viscosity of the pre-compounded component mixture of the invention include hydrocarbon resins, butyl rubber, polyisobutylene, additional triblock copolymers having the general configuration A-B-A and a molecular weight greater than that of each of the principle elastomer components of the material, particulate fillers, microspheres, butadiene rubber, ethylene/propylene rubber, ethylene/butylene rubber, and others.

Tensile strength modifiers which tend to increase the tensile strength of the material of the present invention include mid block B associating hydrocarbon resins, non-end block A solvating hydrocarbon resins, particulate reinforcers, and others.

Shrinkage inhibitors, which tend to reduce shrinkage of the material following compounding, that are useful in the present invention include hydrocarbon resins, particulate fillers, microspheres, transpolyoctenylene rubber, and others.

3. Microspheres

Microspheres may also be added to the materials of this invention. The material of the invention may contain up to about 90% microspheres, by volume. In one preferred microspheres-containing embodiment of the material of the invention, microspheres make up at least about 30% of the total volume of the material. A second preferred microsphere-containing material of the invention includes at least about 50% microspheres, by volume.

Different types of microspheres contribute various properties to the visco-elastic materials of the invention. For example, hollow acrylic microspheres, such as those marketed under the brand name MICROPEARL generally in the 20 to 200 micron size range by Matsumoto Yushi-Seiyaku Co., Ltd. of Osaka, Japan, lower the specific gravity of the material. In another embodiment of the invention, the microspheres may be unexpanded DU(091-80), which expand during processing of the material of the invention, or pre-expanded DE (091-80) acrylic microspheres from Expancel Inc. of Duluth, Ga.

In embodiments of the material of the invention which include hollow acrylic microspheres, preferably the microspheres have substantially instantaneous rebound when subjected to a compression force which compresses the microspheres to a thickness of up to about 50% of their original diameter.

Hollow microspheres also decrease the specific gravity of the material of the invention by creating gas pockets therein. In many cushioning applications, very low specific gravities are preferred. The specific gravity of the materials of the present invention may range from about 0.06 to about 1.30, depending upon the amount and specific gravity of fillers and additives, including microspheres and foaming agents. In many uses of the material of the invention, a specific gravity of less than about 0.50 is preferred. When a material of the invention includes preferred microspheres, the microspheres must be dispersed, on average, at a distance of about one-and-a-half times the average microsphere diameter from one another in order to achieve a specific gravity of less than about 0.50. A specific gravity of less than about 0.30 is preferred for some uses of the material of the invention. Specific gravities of less than about 0.65, less than about 0.45, and less than about 0.25 are preferred for yet other uses of the material of the invention.

MICROPEARL and EXPANCEL acrylic microspheres are preferred because of their highly flexible nature, which aids in not restricting deformation of the gelatinous elastomer. Glass, ceramic, and other types of microspheres may also be used in the gelatinous material of the invention, but are less preferred.

4. Plasticizers a. Oils

As explained above, plasticizers allow the midblocks of a network of triblock copolymer molecules to move past one another. Thus, Applicant believes that plasticizers, when trapped within the three dimensional web of triblock copolymer molecules, facilitate the disentanglement and elongation of the elastomeric midblocks as a load is placed on the network. Similarly, Applicant believes that plasticizers facilitate recontraction of the elastomeric midblocks following release of the load.

Preferably, the plasticizer component of the material of the present invention is solely or includes a significant amount of a commercially available oil or mixture of oils. The plasticizer component may include other plasticizing agents, such as liquid oligomers and others, as well. Both naturally derived and synthetic oils are useful in the material of the present invention. Preferably, the oils have a viscosity of about 70 SUS to about 500 SUS at about 100° F. Most preferred for use in the material of the invention are paraffinic white mineral oils having a viscosity in the range of about 90 SUS to about 200 SUS at about 100° F.

Preferably, when used in the material of the invention, a plasticizer increases the percent elongation at break of the elastomer component by at least about a factor of two. For example, when an elastomer having a percent elongation at break of about 1,000 is compounded with a preferred plasticizer, the compound material preferably has a percent elongation at break of at least about 2,000.

Preferably, when used in the material of the invention, a plasticizer decreases the Gram Bloom rigidity of the elastomer component by at least about a factor of two. For example, when an elastomer having a Gram Bloom rigidity of about 1,200 is compounded with a preferred plasticizer, the compound material preferably has a Gram Bloom rigidity of about 600 or less.

The preferred plasticizer component of the present invention includes paraffinic white mineral oils, such as those having the brand name DUOPRIME, by Lyondell Lubricants of Houston, Tex., and the oils sold under the brand name TUFFLO by Witco Corporation of Petrolia, Pa. A preferred embodiment of the plasticizer component of the invention includes paraffinic white mineral oil such as that sold under the trade name LP-150 by Witco. Applicant has discovered that LP-150 and other oils with similar physical properties result in a material which has less oil bleed than comparable materials that have been plasticized with different types of oil.

Paraffinic white mineral oils having an average viscosity of about 90 SUS, such as DUOPRIME 90, are preferred for other embodiments of the plasticizer component of the material of the present invention. Applicant has found that DUPRIME 90 and oils with similar physical properties can be used to impart the greatest strength to the material of the invention.

Other oils are also useful as plasticizers in compounding the material of the present invention. Examples of representative commercially available oils include processing oils such as paraffinic and naphthenic petroleum oils, highly refined aromatic-free or low aromaticity paraffinic and naphthenic food and technical grade white petroleum mineral oils, and synthetic liquid oligomers of polybutene, polypropene, polyterpene, etc., and others. The synthetic series process oils are oligomers which are permanently fluid liquid non-olefins, isoparaffins or paraffins. Many such oils are known and commercially available. Examples of representative commercially available oils include Amoco® polybutenes, hydrogenated polybutenes and polybutenes with epoxide functionality at one end of the polybutene polymer. Examples of such Amoco polybutenes include: L-14 (320 $M_n$), L-50 (420 $M_n$), L-100 (460 $M_n$), H-15 (560 $M_n$), H-25 (610 $M_n$), H-35 (660 $M_n$), H-50 (750 $M_n$), H-100 (920 $M_n$), H-300 (1290 $M_n$), L-14E (27-37 cst @ 100° F. Viscosity), L-300E (635–690 cst @ 210° F. Viscosity), Actipol E6 (365 $M_n$), E16 (973 $M_n$), E23 (1433 $M_n$) and the like. Examples of various commercially available oils include: Bayol, Bemol, American, Blandol, Drakeol, Ervol, Gloria, Kaydol, Litetek, Marcol, Parol, Peneteck, Primol, Protol, Sontex, and the like.

b. Plasticizer Mixtures

The addition of other plasticizers to the materials of the present invention is useful for tailoring the physical characteristics of the material of the present invention. For example, characteristics such as oil bleed, tack, tensile strength, and the rate at which a material recovers from deformation may be modified with plasticizers other than oil.

For example, a plasticizer mixture which includes at least about 37.5 weight percent of a paraffinic white mineral oil having physical characteristics similar to those of LP-150 (a viscosity of about 150 SUS at about 100° F., a viscosity of about 30 centistokes (cSt) at about 40° C., and maximum pour point of about −35° F.) and up to about 62.5 weight percent of a resin having physical characteristics similar to those of REGALREZ® 1018 (such as a softening point of about 20° C.; an onset glass transition temperature ($T_g$) of about −20° C.; a MMAP value of about 70° C.; a DACP value of about 15° C.; an OMSCP value of less than about −40° C.; and a weight average molecular weight ($M_w$) of about 400), all weight percentages being based upon the total weight of the plasticizer mixture, could be used in a material according to the invention. When compared to a material plasticized with the same amount of an oil such as LP-150, the material which includes the plasticizer mixture has decreased oil bleed, increased tack, and similarly instantaneous rebound.

Applicant believes that, when resin is included with oil in a plasticizer mixture according to the material of the present invention, the material exhibits significantly reduced oil bleed. For example, a material which includes about one part elastomer component (such as SEPTON 4055), three parts plasticizing oil (such as LP-150), and about five parts plasticizing resin (such as REGALREZ® 1018) exhibits infinitesimal oil bleed at room temperature, if any, even when placed against materials with high capillary action, such as paper. Prior art gelatinous elastomers bleed noticably under these circumstances.

Resins useful in the plasticizer component of the material of the present invention are preferably hydrocarbon-derived and rosin-derived resins having a ring and ball softening point of up to about 150° C., more preferably from about 0° C. to about 25° C., and a weight average molecular weight of at least about 300.

Applicant prefers the use of resins or resin mixtures which are highly viscous flowable liquids at room temperature (about 23° C.). Plasticizers which are fluid at room temperature impart softness to the materials of the present invention. Although room temperature flowable resins are preferred, resins which are not flowable liquids at room temperature are also useful in the materials of this invention.

The resins most preferred for use in the present invention have a ring and ball softening point of about 18° C.; melt viscosities of about 10 poises (Ps) at about 61° C., about 100 ps at about 42° C. and about 1,000 ps at about 32° C.; an onset glass transition temperature ($T_g$) of about −20° C.; a MMAP value of 68° C.; a DACP value of 15° C.; an OMSCP value of less than −40° C.; a number average molecular weight ($M_n$) of about 385; a weight average molecular weight ($M_w$) of about 421; and a Z-average molecular weight ($M_z$) of about 463. One such resin is marketed as REGALREZ® 1018 by Hercules Incorporated of Wilmington, Del.

Room temperature flowable resins that are derived from poly-β-pinene and have softenening points similar to that of REGALREZ® 1018 are also useful in the plasticizer component of the present invention. One such resin, sold as PICCOLYTE® S25 by Hercules Incorporated of Wilmington, Del., has a softening point of about 25° C.; melt viscosities of about 10 ps at about 80° C., about 100 ps at about 56° C. and about 1,000 ps at about 41° C.; a MMAP value of about 88° C.; a DACP value of about 45° C.; an OMSCP value of less than about −50° C.; a $M_z$ of about 4,800; a $M_w$ of about 1,950; and a $M_n$ of about 650. Other PICCOLYTE® resins may also be used in the invention.

Another room temperature flowable resin which is useful as a plasticizer in the present invention is marketed as ADTAC® LV by Hercules Incorporated of Wilmington, Del. That resin has a ring and ball softening point of about 5° C.; melt viscosities of about 10 ps at about 62° C., about 100 ps at about 36° C. and about 1,000 ps at about 20° C.; a MMAP value of about 93° C.; a DACP value of about 44° C.; an OMSCP value of less than about −40° C.; a $M_z$ of about 2,600; a $M_w$ of about 1,380; and a $M_n$ of about 800.

Resins such as the liquid aliphatic C-5 petroleum hydrocarbon resin sold as WINGTACK® 10 by the Goodyear Tire & Rubber Company of Akron, Ohio and other WINGTACK® resins are also useful in the present invention. WINGTACK® 10 has a ring and ball softening point of about 10° C.; a Brookfield Viscosity of about 30,000 cps at about 25° C.; melt viscosities of about 10 ps at about 53° C. and about 100 ps at about 34° C.; an onset $T_g$ of about −37.7° C.; a $M_n$ of about 660; a $M_w$ of about 800; a 1:1 polyethylene-to-resin ratio cloud point of about 89° C.; a 1:1 microcrystalline wax-to-resin ratio cloud point of about 77° C.; and a 1:1 paraffin wax-to-resin ratio cloud point of about 64° C.

Resins that are not readily flowable at room temperature (i.e., are solid, semi-solid, or have an extremely high viscosity) or that are solid at room temperature are also useful in the materials of the present invention. One such solid resin is an aliphatic C-5 petroleum hydrocarbon resin having a ring and ball softening point of about 98° C.; melt viscosities of about 100 ps at about 156° C. and about 1000 ps at about 109° C.; an onset $T_g$ of about 46.1° C.; a $M_n$ of about 1,130; a $M_w$ of about 1,800; a 1:1 polyethylene-to-resin ratio cloud point of about 90° C.; a 1:1 microcrystalline wax-to-resin ratio cloud point of about 77° C.; and a 1 :1 paraffin wax-to-resin ratio cloud point of about 64° C. Such a resin is available as WINGTACK® 95 and is manufactured by Goodyear Chemical Co. of Akron, Ohio.

Polyisobutylene polymers are an example of room temperature not readily flowable resins useful in the materials of the present invention. One such resin, sold as VISTANEX® LM-MS by Exxon Chemical Company of Houston, Tex., has a Tg of −60° C., a Brookfield Viscosity of about 25,000 to about 35,000 at about 350° F., a Flory molecular weight in the range of about 42,600 to about 46,100, and a Staudinger molecular weight in the range of about 10,400 to about 10,900. The Flory and Staudinger methods for determining molecular weight are based on the intrinsic viscosity of a material dissolved in diisobutylene at 20° C.

Glycerol esters of polymerized rosin are also useful as plasticizers in the present invention. One such ester, manufactured and sold by Hercules Incorporated of Wilmington, Del. as HERCULES® Ester Gum 10D Synthetic Resin, has a softening point of about 116° C.

Many other resins are also suitable for use in the present invention. In general, resins are preferred which are compatible with the B block of the elastomer used in the material, and non-compatible with the A blocks.

Tackifiers are desired in some embodiments of the material of the invention to impart the material with additional adhesive characteristics. In such embodiments of the material, the plasticizer may include about 20 weight percent or more, about 40 weight percent or more, about 60 weight percent or more, or up to about 100 weight percent of a tackifier or tackifier mixture.

The plasticizer:elastomer ratio, by weight, of the preferred material of the present invention ranges from as low as about 1.5:1 to higher than about 25:1. In applications where oil bleed is acceptable, the ratio may as high as about 100:1 or more. Preferably, the oil:elastomer ratio is in the range of about 2.5:1 to about 12:1. Especially preferred are oil:elastomer ratios in the range of about 2.5:1 to about 8:1. A preferred ratio, such as 5: 1, provides the desired amounts of rigidity, elasticity and strength for many typical applications. Another preferred oil to elastomer ratio of the preferred materials of the present invention is 2.5: 1, which possesses an unexpectedly high amount of strength and elongation in light of the teaching in the art.

D. Compounding Methods

As used herein, the term "liquification" refers to the placement of the elastomer component and the plasticizer component of the preferred materials of this invention in a liquid state, such as a molten state or a dissolved state.

1. Melt Blending

A preferred method for manufacturing the preferred materials of the present invention includes mixing the plasticizer, block copolymer elastomer and any additives and/or microspheres, heating the mixture to melting while agitating the mixture, and cooling the compound. This process is referred to as "melt blending."

Excessive heat is known to cause the degradation of the elastomeric B portion of A-B-A and A-B block copolymers. Similarly, maintaining block copolymers at increased temperatures over prolonged periods of time often results in the degradation of the elastomeric B portion of A-B-A and A-B block copolymers. As the B molecules of an A-B-A triblock copolymer break, the triblock is separated into two diblock copolymers having the general configuration A-B. While it is believed by some in the art that the presence of A-B diblock copolymers in oil-containing plasticizer-extended A-B-A triblock copolymers reduces plasticizer bleed-out, high amounts of A-B copolymers significantly reduce the strength of the material of the present invention. Thus, Applicant believes that it is important to minimize the compounding temperatures and the amount of time to which the material is exposed to heat.

The plasticizers, any additives and/or microspheres, and the A-B-A copolymers are premixed. Preferably, hydrophobic additives are dissolved into the plasticizer prior to adding the plasticizer to the elastomer component. Hydrophilic additives and particulate additives are preferably emulsified or mixed into the plasticizer of a preferred material of the present invention prior to adding the elastomer component. The mixture is then quickly heated to melting. Preferably, the temperature of the mixture does not exceed the volatilization temperature of any component. For most of the materials of the invention, Applicant prefers temperatures in the range of about 260° F. to about 290° F. A melting time of about ten minutes or less is preferred. A melting time of about five minutes or less is more preferred. Even more preferred are melting times of about ninety seconds or less.

Stirring, agitation, or, most preferably, high shearing forces are preferred to create a homogeneous mixture. The mixture is then cast, extruded, injection molded, etc.

Next, the mixture is cooled. When injection molding equipment and cast molds are used, the mixture may be cooled by running coolant through the mold, by the thermal mass of the mold itself, by room temperature, by a combination of the above methods, or other methods. Extruded mixtures are cooled by air or by passing the extruded mixture through coolant. Cooling times of about five minutes or less are preferred. A cooling time of less than one minute is most preferred.

Use of high shear facilitates short heating times. "High shear", for purposes of this disclosure, is defined in terms of the length over diameter (L/D) ratio of a properly designed injection molding single screw or extruder single screw. L/D ratios of about 20:1 and higher create high shear. Twin screws, Banbury mixers and the like also create high shear. High shearing with heat mixes compounds at lower temperatures and faster rates than the use of heat alone or heat with relatively low-shear mixing. Thus, high shear forces expedite compounding of the mixture over a relatively short period of time by more readily forcing the molecules into close association with the B component of the A-B-A copolymer. Use of high shear also facilitates the decrease of equipment temperatures. Melt blending techniques which employ little or no shear require an external heat source. Thus, in order to avoid heat loss, the periphery of many types of melt blending equipment must be heated to a temperature higher than the melt temperature in order to transfer heat and melt a component mixture. In comparison, high shearing equipment can generate high material temperatures directly from the shear forces, substantially reducing or eliminating the need for external heating.

The inventor prefers the use of equipment that produces high shear, such as twin screw compounding extrusion machinery, to melt blend the material of the present invention. Twin screw extruders such as the ZE25 TIEBAR AIR COOLED TWIN SCREW EXTRUDER, with a 35:1 L/D ratio, manufactured by Berstorff Corporation of Charlotte, N.C., are useful for compounding the material of the present invention. Twin screw compounding extrusion machinery is desired for compounding the preferred materials of the present invention since it generates a very high level of shear and because compounding and molding, casting, extrusion, or foaming are performed in one continuous process. Alternatively, the elastomeric gel of the invention may be compounded first, then later formed into a finished product by injection molding, extrusion, or some other method.

It was mentioned above that microspheres may be added to the gel of the invention to reduce its specific gravity, to increase its stiffness or durometer, and to increase its rebound rate. Glass microspheres usually will not survive high shear. However, Applicant has unexpectedly discovered that acrylic microspheres remain intact when subjected to the heat and shear of injection molding machines and extruders if the time at high temperature is kept to about five minutes or less. Thus, acrylic microspheres are preferred over glass microspheres.

Other equipment, such as batch mixers are also useful for melt blending the preferred materials of the present invention.

2. Solvent Blending

A second preferred method for making the preferred elastomeric compounds of the present invention comprises dissolving the elastomeric component in a solvent, adding plasticizer and any additives and/or microspheres, and removing the solvent from the mixture.

Aromatic hydrocarbon solvents such as toluene may be used for mixing the preferred compounds of the present invention. Sufficient solvent is added to the elastomer component to dissolve the network of block copolymer molecules. Preferably, the amount of solvent is limited to an amount sufficient for dissolving the network of block copolymer molecules. The elastomer then dissolves in the solvent. Mixing is preferred since it speeds up the solvation process. Similarly, slightly elevating the mixture temperature is preferred since it speeds up the solvation process. Next, plasticizer and additives are mixed into the solvated elastomer. Hydrophobic additives are preferably dissolved in the plasticizer prior to adding the plasticizer to the elastomer component and the solvent. Hydrophilic additives and particulate additives are preferably emulsified or mixed into the plasticizer prior to adding the elastomer component and solvent. The mixture is then cast into a desired shape (accounting for later shrinkage due to solvent loss) and the solvent is evaporated from the mixture.

Other methods of compounding the preferred materials, including but not limited to other processes for compounding and extending elastomeric materials, are also within the scope of the present invention.

3. Foaming

The materials of the present invention may be foamed. "Foaming", as defined herein, refers to processes which form gas bubbles or gas pockets in the material of the invention. A foamed material, according to the invention, includes gas bubbles dispersed throughout the material. Both open cell and closed cell foaming are useful in the material of the invention. Foaming decreases the specific gravity of the materials of the invention. In many cushioning applications, very low specific gravities are preferred. For example, bicyclists place a premium on equipment, such as seats, that is light. Foaming may be used to create a light weight gel suitable for use in a premium bicycle seat. The specific gravity of the materials of the present invention may range, after foaming, from about 0.06 to about 1.30.

A preferred foamed embodiment of the material according to the invention includes at least about 10% gas bubbles or gas pockets, by volume of the material. More preferably, when the material is foamed, gas bubbles or gas pockets make up at least about 20% of the volume of the material. Other foamed embodiments of the material according to the invention contain at least about 40% gas bubbles or gas pockets, by volume, and at least about 70% gas bubbles or pockets, by volume.

Various methods for foaming the materials of the present invention include, but are not limited to whipping or injecting air bubbles into the material while it is in a molten state, adding compressed gas or air to the material while it is in the molten state and under pressure, adding water to the material while it is in the molten state, use of sodium bicarbonate, and use of chemical blowing agents such as those marketed under the brand name Safoam® by Reedy At International Corporation of Keyport, N.J.

When blowing agents such as sodium bicarbonate and chemical blowing agents are used in the material of the invention, the material temperature is preferably adjusted just prior to addition of the blowing agent so that the material temperature is just above the blowing temperature of the blowing agent. Following addition of the blowing agent to the material, the material is allowed to cool so that it will retain the gas bubbles or gas pocket formed by the release of gas from the blowing agent. Preferably, the material is quickly cooled to a temperature below its glass transition temperature (Tg). The material will retain more gas bubbles and the gas bubbles will be more consistently dispersed throughout the material the quicker the material temperature cools to a temperature below the Tg.

When a material according to the invention is injection molded, in accordance with one preferred compounding method of the material of the invention, foaming is preferred just after the material has been injected into a mold. Thus, as the material passes through the injection molding machine nozzle, its temperature is preferably just higher than the blowing temperature of the blowing agent. Preferably, the material is then cooled to a temperature below its Tg.

Addition of polyisobutylene resin improves the ability of the materials of this invention to foam and retain cells during the foaming process. One such resin, known as VIS-TANEX® LM-MS, is manufactured by Exxon Chemical Company of Houston, Tex. Similarly, surfactants, dispersants and emulsifiers such as Laureth-23, available from Lonza of Fair Lawn, N.J. under the trade name ETHOS-PERSE LA-23, and others may be used to facilitate foaming of the material of the invention. In formulations which include oil, certain foaming oils such as Hydraulic and Transmission Oil, such as that made by Spectrum Corp. of Selmer, Tenn., may also be used in the material to facilitate foaming of the materials.

4. Lattice Structures

Lattice structures may be made using the materials of the present invention. Lattice structures according to the invention include multiple overlaid streams of the material of the invention in a lattice-like fashion. Preferably, the streams of material have a thickness of less than about one-tenth of an inch.

Formation of the material of the invention into lattice structures decreases the specific gravity of the material due to the free space created within the lattice structure. Preferably, lattice structures reduce the specific gravity of the material by at least about 50%.

One method of forming lattice structures includes heating the material to a molten state and spraying streams of the material to form a desired lattice structure. Preferably, a hot melt adhesive spray gun is used to spray streams of the material of the invention to form a lattice structure.

5. Premixing of Microspheres

In formulations within the scope of this invention which include microspheres, premixing the microspheres with the plasticizer prior to adding the plasticizer to the A-B-A copolymer may result in a more uniform mixture (i.e., a better final product) and makes the microsphere-containing materials of the present invention easier to process. For example, the materials may be premixed by hand.

E. Physical Properties

When the preferred A-B-A triblock copolymer, plasticizer and additives are mixed, the resultant material is very strong, yet very elastic and easily stretched, having a Young's elasticity modulus of only up to about $1 \times 10^6$ dyne/cm$^2$. The preferred material of this invention also has low tack and little or no oil bleed, both of which are believed to be related to the molecular weight of the uniquely preferred elastomers as well as the molecular structure of the molecular structure of the elastomer and its interaction with the plasticizing component. Finally, the material of the present invention is capable of elongation up to about 2400% and more.

EXAMPLES

The following examples include various mixtures of SEPTON 4055 (available from Kuraray) ultra high molecular weight polystyrene-hydrogenated poly(isoprene+ butadiene)-polystyrene triblock copolymer extended in a plasticizing oil. In addition, the materials of the examples include very minor amounts of IRGANOX® 1010 (about 0.03%), IRGAFOS® 168 (about 0.03%), and colorant (about 0.04%).

The material of each example was compounded in an ISF 120VL injection molding machine, manufactured by Toshiba Machine Co. of Tokyo, Japan, with a 20:1 (L/D) high mixing single screw manufactured by Atlantic Feed Screw, Inc. of Cayce, S.C. The temperature in the injection molding machine was increased stepwise from the point of insertion to the injection nozzle. At the point of insertion, the temperature was about 270° F. Temperatures along the screw were about 275° F. and about 280° F., with the temperature increasing as the material approached the injection nozzle. The temperature at the injection nozzle was about 290° F. This gradual increase in temperature builds up pressure during feeding of the material through the injection molding machine, providing a more homogeneous mixture of the components of the material.

Each of the example materials were then injected into an aluminum plaque mold and allowed to cure at room temperature for about 24 hours to about 48 hours. Various tests were then performed on the materials, including percent elongation, tensile strength at break, and percent oil bleed.

Percent elongation and tensile strength testing were performed in accordance with American Society for Testing and Materials (ASTM) Standard Test Method D412, using a Model QC-II-30XS-B Electronic Tensile Tester manufactured by Thwing Albert Instrument Co. of Philadelphia, Pa. Each of samples were O-shaped rings with an outer diameter of about 0.500 inch, an inner diameter of about 0.375 inch, a gauge diameter of about 0.438 inch, and a mean circumference of about 1.374 inches. Five samples of each material were tested for elongation and tensile strength.

Percent oil bleed was measured by obtaining the combined weight of three disk-shaped samples of the material, each sample having diameter of about 3 cm and a thickness of about 6.5 mm. Two pieces of 12.5 cm diameter qualitative filter paper having a medium filter speed and an ash content of about 0.15%, such as that sold under the trade name DOUBLE RINGS 102, and manufactured by Xinhua Paper Mill, were then weighed individually.

The three sample disks were then placed on one of the pieces of filter paper (which has high capillary action), and the other piece of filter paper was placed on top of the samples. The material and paper were then placed in a plastic bag and pressure-sandwiched between two flat steel plates, each weighing within about 0.5% of about 2285 g. Next, the material samples, paper and steel plates were placed in a freezer at about −4° C. for about 4 hours.

Oil bleed testing was conducted at a low temperature because rubber molecules are known to constrict at low temperatures. Thus, in theory, when a plasticized material is subjected to cooler temperatures, the attraction of plasticizer to Vander Waals binding sites on the rubber molecules decrease. Therefore, it has been theorized that plasticizer-extended materials tend to bleed more at lower temperatures. However, oil tends to flow more slowly at low temperatures, suggesting that this theory may not be accurate. Nevertheless, this theory has been widely accepted. The extreme condition of the pressure and the freezer was needed for quantitative evaluation since the preferred materials of the present invention have the advantage over the prior art of not bleeding at all at room temperature without pressure, even when placed next to high capillary action paper. Although John Y. Chen did not report oil bleed in his patent applications, Applicant's experience is that Chen's materials have higher oil bleed than the material of the invention.

Upon removal from the freezer, each piece of the filter paper and the samples were immediately weighed again. Percent oil bleed was then calculated by determining the combined weight increase of the filter papers, dividing that value by the original sample weight and multiplying the result by 100.

Example 1

The material of Example 1 includes eight parts LP 150 mineral oil to one part SEPTON 4055.

| 8:1 | Average | High Value |
| --- | --- | --- |
| Percent Elongation | 2375 | 2400 |
| PSI at Failure | 185 | 190 |

In comparison, the material of Chen's patents that has an oil to elastomer ratio of 4: 1, which should have higher strength than Applicant's 8:1 material of Example 1, instead exhibits much lower elongation and PSI at failure (i.e., tensile strength) values. The material of Example 1 elongates up to about 2,400%, which is 700% greater elongation than Chen's 4:1, which is capable of only 1700% elongation (See, e.g., '213 Patent, Table I, col. 6, lines 18–38). Likewise, the tensile strength at break of Chen's 4:1 gel is only about $4 \times 10^6$ dyne/cm$^2$, or 58 psi. Thus, the 8:1 material of Example 1 is at least three times as strong as Chen's 4:1. This is an unexpectedly good result since the conventional wisdom concerning gels is that more oil results in less strength. Applicant doubled the amount of oil used (8:1 compared to 4:1) but achieved more than three times the tensile strength of Chen's material.

Example 2

The material of Example 2 includes five parts LP 150 mineral oil to one part SEPTON 4055.

| 5:1 | Average | High Value |
| --- | --- | --- |
| Percent Elongation | 1975 | 2030 |
| PSI at Failure | 335 | 352 |

A comparison of the 5:1 material of Example 2 to the 4:1 material of Chen's patents shows that Chen's material exhibits much lower elongation and PSI at failure (i.e., tensile strength) values. The material of Example 2 elongates up to about 2,000%, which is about 300% more than Chen's 4:1, which is capable of only 1700% elongation (See, e.g., '213 Patent, Table I, col. 6, lines 18–38). Likewise, the tensile strength at break of Chen's 4:1 gel is only about $4 \times 10^6$ dyne/cm$^2$, which translates to only about 58 psi. Thus, the 5:1 material of Example 2, despite the presence of about 25% more oil than Chen's 4:1 material, is about five-and-a-half times as strong as Chen's 4:1.

Example 3

The material of Example 3 includes three parts LP 150 mineral oil to one part SEPTON 4055.

| 3:1 | Average | High Value |
| --- | --- | --- |
| Percent Elongation | 1555 | 1620 |
| PSI at Failure | 404 | 492 |

A consideration of both Example 2, a material having a 5:1 oil to elastomer ratio, and Example 3, a material having a 3:1 oil to elastomer ratio, indicates that a material with a 4:1 oil to elastomer ratio would compare very favorably to the gel disclosed in U.S. Pat. No. 5,508,334, which issued in the name of John Y. Chen. According to Table I in the '334 patent, Chen's 4:1 KRATON® G-1651-containing material had a breaking strength (i.e., tensile strength) value of $4 \times 10^6$ dyne/cm$^2$, which translates to only about 58 psi.

The elongation at break value was mysteriously omitted from Table I of the '334 patent and other Chen patents. However, reference to Table I of Chen's first two issued patents (the '284 and '213 patents) sets the percent elongation of Chen's 4:1 material at about 1700. Applicant suspects that Chen omitted this data in later patent applications because it was either inaccurate or Chen's improved materials failed to exhibit improved properties over his earlier materials.

In comparison, the percent elongation of a 4:1 material made according to the present invention would be at least about 1800, exceeding the elongation of Chen's 4:1 material by about 100% or more. Similarly, the tensile strength of a 4:1 material according to the present invention would be at least about 350 psi, and probably in the 370 to 375 psi range. Thus, a material of the present invention with an oil to elastomer ratio of about 4:1 would be about six times a strong as Chen's most preferred 4:1 gel.

The following Examples 4 through 11 have been included to demonstrate the usefulness of various plasticizing oils in the material of the present invention.

Example 4

The material of Example 4 included eight parts of a plasticizer mixture to one part SEPTON 4055. The eight parts plasticizer mixture included about 5.3 parts REGALREZ® 1018 and about 2.8 parts DUOPRIME® 90 mineral oil.

| 8:1 | Average | High Value |
| --- | --- | --- |
| Percent Elongation | 2480 | 2520 |
| PSI at Failure | 187 | 195 |

Example 5

The material of Example 5 included eight parts of EDELEX® 27 oil to one part SEPTON 4055. EDELEX® 27 has an aromatic content of about 1%, which would be expected to slightly decrease the tensile strength of the material.

| 8:1 | Average | High Value |
|---|---|---|
| Percent Elongation | 2105 | 2150 |
| PSI at Failure | 144 | 154 |
| Percent oil bleed | 0.34 | |

Example 6

The material of Example 6 included eight parts of DUOPRIME® 55 mineral oil to one part SEPTON 4055.

| 8:1 | Average | High Value |
|---|---|---|
| Percent Elongation | 1940 | 2055 |
| PSI at Failure | 280 | 298 |
| Percent oil bleed | 0.29 | |

Example 7

The material of Example 7 included eight parts of DUOPRIME® 70 mineral oil to one part SEPTON 4055.

| 8:1 | Average | High Value |
|---|---|---|
| Percent Elongation | 2000 | 2030 |
| PSI at Failure | 250 | 275 |
| Percent oil bleed | | |

Example 8

The material of Example 8 included eight parts of DUOPRIME® 90 mineral oil to one part SEPTON 4055.

| 8:1 | Average | High Value |
|---|---|---|
| Percent Elongation | 2090 | 2125 |
| PSI at Failure | 306 | 311 |
| Percent oil bleed | 0.35 | |

Example 9

The material of Example 9 included eight parts of DUOPRIME® 200 mineral oil to one part SEPTON 4055.

| 8:1 | Average | High Value |
|---|---|---|
| Percent Elongation | 1970 | 2040 |
| PSI at Failure | 200 | 228 |
| Percent oil bleed | 0.20 | |

Example 10

The material of Example 10 included eight parts of DUOPRIME® 350 mineral oil to one part SEPTON 4055.

| 8:1 | Average | High Value |
|---|---|---|
| Percent Elongation | 2065 | 2080 |
| PSI at Failure | 267 | 270 |
| Percent oil bleed | 0.21 | |

Example 11

The material of Example 11 included eight parts of DUOPRIME® 500 mineral oil to one part SEPTON 4055.

| 8:1 | Average | High Value |
|---|---|---|
| Percent Elongation | 1995 | 2075 |
| PSI at Failure | 194 | 223 |
| Percent oil bleed | 0.17 | |

Example 12

| Component | Generic Class | Amount (grams) |
|---|---|---|
| Septon 4055 | A-B-A copolymer | 227.0 |
| Duoprime 500 oil | Plasticizing oil | 2,722.0 |
| Irganox 1010 | Antioxidant | 4.5 |
| Irgafos 168 | Antioxidant | 4.5 |
| Safoam FP-40 | Foaming agent | 14.0 |
| Lamp Black | Colorant and Foam Bubble Nucleating Agent | 1.5 |

Applicant began foaming the material of the invention to reduce its specific gravity by heating it until the SAFOAM began to degenerate and create $CO_2$ gas. DUOPRIME 500 oil was selected for use in the example because of its high viscosity (i.e., it would help hold a bubble longer than a lower viscosity oil). The components were compounded in an injection molding machine according to one preferred melt blending embodiment of the present invention. The original mixture included 3.40 g SAFOAM. When half of the SAFOAM appeared to have been consumed, 3.40 g more was added. Another 7.20 g of SAFOAM was added when half of the SAFOAM again appeared to have been consumed. Temperatures along the injection molding screw ranged from about 280° F. at the point of insertion to about 240° F. at the nozzle. The material of Example 12 had closed cells of fairly consistent density.

Example 13

| Component | Generic Class | Amount (grams) |
|---|---|---|
| Septon 4055 | A-B-A copolymer | 227.0 |
| Duoprime 500 oil | Plasticizing oil | 2,722.0 |
| Irganox 1010 | Antioxidant | 1.5 |
| Irgafos 168 | Antioxidant | 1.5 |
| Expancell DE-80 | Microspheres | 500.0 |
| Orange | Colorant | 2.0 |

Example 14

Applicant has also used microspheres to reduce the specific gravity of the material of the invention. Acrylic microspheres were used in the material of Example 13. The components were premixed, then compounded in an injection molding machine screw. Temperatures along the injection molding screw ranged from about 260° F. at the point of insertion to about 220° F. at the nozzle. Surprisingly, the microspheres were not deformed by the high shear and high temperatures of the injection molding machine. The resulting material was very light, with microspheres consistently dispersed therethrough.

| Component | Generic Class | Amount (grams) |
| --- | --- | --- |
| Septon 4055 | A-B-A copolymer | 1114.0 |
| Kraton G-1701 | A-B copolymer | 5.8 |
| Regalrez 1018 | Plasticizing resin | 340.0 |
| Edeiex 45 | Plasticizing oil | 225.0 |
| Talc | Talc | 20.4 |
| Vestenamer 8012 | Tor nibber | 11.5 |
| Expancell DU-80 | Microspheres | 0.5 |
| Safoam FP-40 | Foaming agent | 10.0 |
| Irganox 1010 | Antioxidant | 3.0 |
| Irgafos 168 | Antioxidant | 3.0 |
| Boiled Linseed Oil | | 8.0 |
| Green | Colorant | 2.0 |

In the material of Example 14, Applicant used KRATON® G-1701, manufactured by Shell Chemical Co., to reduce oil bleed. REGALREZ® 1018 was used as a plasiticizer and to reduce oil bleed from the material. Talc was included in the material of Example 14 to act as a nucleating agent during foaming of the material. Since talc migrates to the surface of the material, it is also useful as a surface detackifier. Talc may also be used as a filler in the material of the invention. VESTENAMER 8012, sold by Huls America Inc. of Piscataway, N.J., is a transpolyoctylene (tor) rubber which is useful for reducing oil bleed and reducing melt viscosity of the material of the invention. Boiled linseed oil is believed to reduce the melt viscosity and tackiness of the material and to accelerate the migration of particulate matter to the material's surface. Applicant used both microspheres and foaming agents in the material of Example 14. Although acrylic microspheres reduce the specific gravity of the material according to the present invention, they increase the stiffness of the material, though not as much as glass, ceramic, or other rigid microspheres would.

The closed cell foaming and the microsphere dispersion of the material of Example 14 were consistent. The material was soft and light-weight. The components were well compounded. In addition, the material of Example 14 did not have an oily feel and exhibited no plasticizer bleedout at room temperature.

Additives such as colorants, flame retardants, detackifiers and other additives may be included in the material according to the invention. Various formulations of the material of the present invention may be tailored to achieve differing levels of softness, strength, tackiness and specific gravity as desired. Examples 1 through 11 illustrate the surprisingly high elongation and tensile strength of the material of the present invention. Many embodiments of the material of the invention, of which the preceding examples are representative, exhibit physical properties vastly superior to those of John Y. Chen's material, which Applicant believes to be the closest and best prior art. A chemical explanation for the superior results is provided below.

F. Nuclear Magnetic Resonance Data

Applicant believes the chemical structure of the preferred elastomers used in his material to be a primary reason that his material performs better than prior art plasticizer extended copolymer elastomers. In order to verify his belief that the midblocks of SEPTON 4055 (SEPTON 4033, 4045 and 4077 each have the same basic chemical structure as SEPTON 4055 but different molecular weights) and KRATON® G-1651 are chemically distinct, Applicant had independent third party consultants provide Nuclear Magnetic Resonance (NMR) spectroscopy analysis of each of the polymers. In addition, Applicant identified to the consultants the monomer types used in the midblocks of both SEPTON 4055 and KRATON® 1651 and had the consultants provide a chemical description of the possible polymerization products. The results of those analyses have been included herein to explain, in part, the physical differences between Applicant's elastomeric material and prior art materials, such as the materials of the patents issued in the name of John Y. Chen.

SEPTON 4055 has a midblock which is prepared from a combination of 1,3-butadiene and 2-methyl-1,3 butadiene (isoprene) monomers. The midblock produced by polymerization of those monomers has a carbon backbone which includes, on average, one double bond every four carbons. Following polymerization, the double bonds of the SEPTON 4055 midblock backbone are removed by hydrogenation. The midblock also has methyl side chains. Unless Kuraray uses a proprietary catalyst system, only methyl side chains are produced.

The methyl side chains of the SEPTON 4055 midblock are a result of the use of isoprene monomers in polymerization. Theoretically, a one 1,3-butadiene monomer to one isoprene monomer ratio produces an average of one side chain for every eight backbone carbon atoms. The relative number of side chains decreases with a decrease in the initial amount of isoprene. Similarly, the number of side chains increases as the initial amount of isoprene is increased relative to the initial amount of 1,3-butadiene.

In comparison, KRATON® G-1651 and all other SEBS elastomers preferred in the prior art have a midblock synthesized from the monomers ethylene and butylene (1-butene). During polymerization, a linear saturated (no double bonds) carbon backbone which has ethyl side chains is produced. Barring the use of some special, proprietary catalyst system, the only side chains on the carbon backbone are ethyl groups.

If the initial monomer ratio were one ethylene molecule to one butylene molecule, on average, the carbon backbone of the midblock would have one ethyl side chain for every four backbone carbon atoms. The ethyl side chain comes from the butylene monomer, thus the relative number of side chains decreases as the initial amount of butylene is decreased and increases by increasing the initial amount of butylene relative to the initial amount of ethylene.

The $^{13}C$ NMR chemical shifts were calculated for the methyl groups (—$CH_3$), which are located at the end of a hydrocarbon chain, for several different types and lengths of hydrocarbon branch chains, according to the emperical $^{13}C$ NMR chemical shift correlation of D. M. Grant (See also, J. B. Lambert, H. F. Survell, D. Lightner and R. G. Cooks, INTRODUCTION TO ORGANIC SPECTROSCOPY 57–58 (McMillan 1987)). Chemical shifts are measured in delta (δ) units, which appear along the horizontal axis of a NMR spectrograph. The expected $^{13}C$ NMR chemical shifts for several types of hydrocarbon branch chains follow:

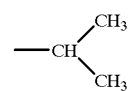

TABLE

Expected $^{13}$C NMR Branch Chemical Shifts

| Branch Type | Branch Chemical Structure | Calculated Chemical Shift ($\delta$) |
|---|---|---|
| Methyl | —CH$_3$ | 20.3 |
| Ethyl | —CH$_2$—CH$_3$ | 12.0 |
| Isopropyl |  | 10.9 |
| n-Propyl | —CH$_2$—CH$_2$—CH$_3$ | 14.5 |
| n-Butyl | —CH$_2$—CH$_2$—CH$_2$—CH$_3$ | 14.2 |
| n-Pentyl | —CH$_2$—CH$_2$—CH$_2$—CH$_2$—CH$_3$ | 14.1 |

"Integration", as defined herein, refers to the computation of the area under a NMR peak. The area under a NMR reveals the relative number of hydrogen atoms represented by that peak. Since peak position reveals information about the carbon atom, including the types of carbon-to-carbon bonds and the number of hydrogen atoms to which the carbon atom is bound, the area under a NMR peak also reveals the relative number of carbon atoms associated with a particular peak. Therefore, integration reveals information about the relative number of different types of carbon atoms.

Figure 10:
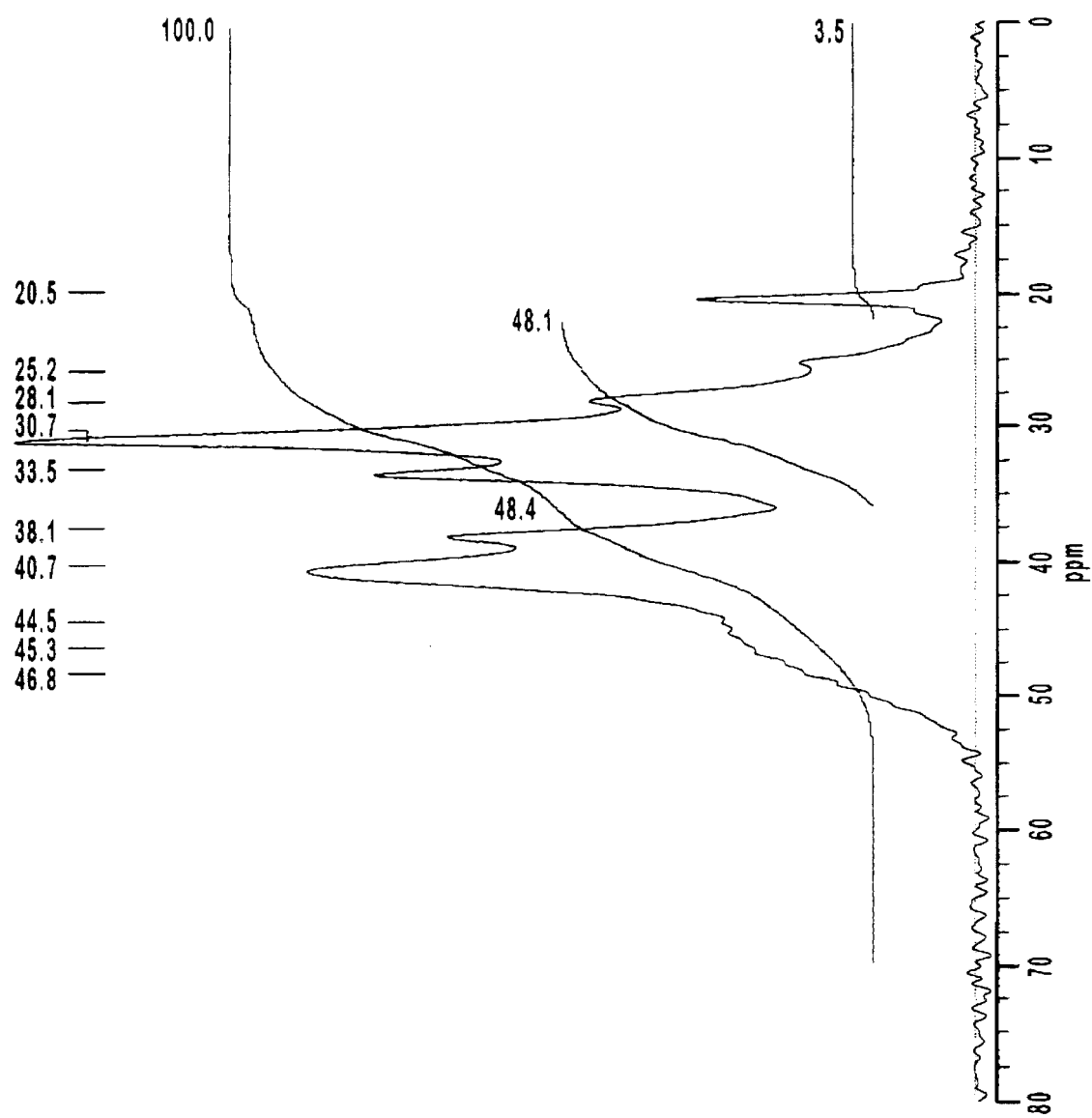
FIG. 10 is a nuclear magnetic resonance spectrograph of SEPTON 4055.

Referring to FIG. 10, which is a NMR spectrograph of SEPTON 4055, integration of the methyl peak, located at about $\delta$ 20.5, relative to the other aliphatic carbon atoms ($\delta$ 20 to 55) shows that branching exists 3.5% ±0.03–0.05% of the time.

The integrations also show that for every 896 carbon atoms located in an aryl group, there are 1000 aliphatic carbon atoms. Of those 1000 carbon atoms, 3.5% (or 0.035× 1000=35) are part of methyl branches. Because a styrene molecule has six carbon atoms in its aryl group and two aliphatic carbon atoms, 299 of the 1000 aliphatic carbon atoms are located within the polystyrene blocks (2/6×896= 299). The remaining 701 aliphatic carbon atoms are located in the polyisoprene/butadiene midblock. Therefore, the NMR spectrograph suggests that the proportion of aliphatic carbons in the midblock to aliphatic carbons in the polystyrene blocks is 2.3. However, since aromatic (i.e., aryl group) carbon atoms relax at a different rate than aliphatic carbon atoms, the integration ratio may be somewhat inaccurate. Thus, in the experience of the independent consultants, the ratio has an accuracy of about ±10%.

If all methyl branching revealed by NMR spectroscopy occurs along the polyisoprene/1,3-butadiene midblock, about five percent of the midblock carbons are located in a branch (35/701×100=5.0%). Since the consultants' testing did not indicate that the SEPTON 4055 midblock has any side chains that are more than one carbon long, a methyl side chain occurs, on average, on one out of about every nineteen backbone carbon atoms ((701-35)/35=19).

Figure 11:
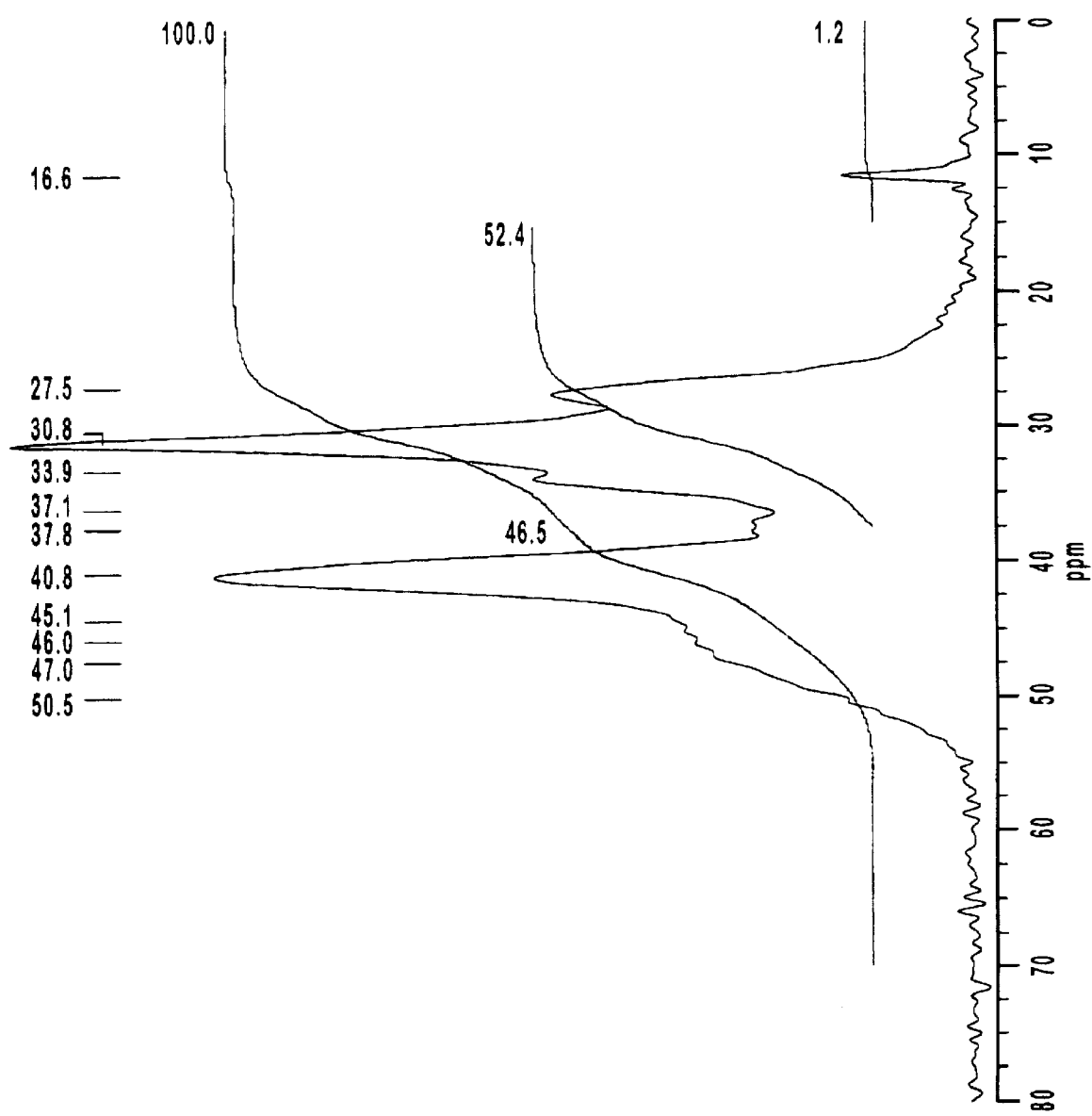
FIG. 11 is a nuclear magnetic resonance spectrograph of KRATON® G-1651.

FIG. 11 shows a NMR spectrograph of KRATON® G-1651 which the independent consultants relied upon to determine the existence and structure of branching from the midblock. The chemical shift of a methyl group at the end of an ethyl branch is expected to appear at $\delta$ 12.0, with a margin of error of about ±$\delta$ 0.9 at a 99% confidence level. The $^{13}$C NMR spectra for KRATON® G-1651 are most consistent with ethyl or isopropyl branches, randomly spaced. The chemical structure of each of the represented alkyl branches are shown above.

TABLE $^{13}$NMR $\delta$ Values for Terminal Methyl of Alkyl Branch

| Alkyl group | ethyl | isopropyl | n-propyl | n-butyl | n-pentyl |
|---|---|---|---|---|---|
| $\delta$ (calculated) | 12.0 | 10.9 | 14.5 | 14.2 | 14.1 |
| $\delta$ (measured) | 11.4 | 11.4 | 11.4 | 11.4 | 11.4 |
| difference | 0.6 | 0.5 | 3.1 | 2.8 | 2.7 |

Only ethyl and isopropyl groups are within the 99% confidence level margin of error. However, the independent consultants could not conceive of a way that isopropyl side chains could be produced from ethylene and butylene monomers during the midblock polymerization reaction. Therefore, since no isopropyl side chains are believed to exist along the backbone of the KRATON® G-1651 midblock, only ethyl side chains remain within the margin of error. $\delta$ values for terminal methyl carbon atom of n-propyl, n-butyl, and n-pentyl branches have larger deviations from the observed $\delta$ value, and are therefore much less likely to occur. Further, the consultants knew of no way that n-propyl, n-butyl, or n-pentyl branches could be produced from polymerization of ethylene and butylene monomers.

Integration of the methyl peak, at $\delta$ 11.6, relative to the other aliphatic carbon atoms ($\delta$ 20–55) shows that branching exists 1.2% ±0.03%–0.05% of the time. Integrations also show that for every 1000 benzene carbon atoms, there are 966 aliphatic carbon atoms. Of those 966 carbon atoms, 1.2% are the methyl groups on the end of an ethyl branch. Another 1.2% of the aliphatic carbon atoms are the remaining carbon of each ethyl branch. Thus, the integrations show that for every 966 aliphatic carbon atoms in KRATON® G-1651, there are about twelve ethyl branches (0.012×966= 11.6). Since a styrene molecule has six carbons in its aryl group, and only two aliphatic carbons, about 333 of every 966 aliphatic carbon atoms are located in the polystyrene endblocks of KRATON® G-1651 (2/6×1000=333). The remaining 633 aliphatic carbon atoms are located in the poly(ethylene/butylene) midblock. Therefore, for every one aliphatic carbon atom in the polystyrene blocks, there are about 1.9 aliphatic carbon atoms in the poly(ethylene/ butylene) midblock.

Assuming that the 11.6 ethyl branches per 966 aliphatic carbon atoms are found in the 633 atoms of the poly (ethylene/butylene) block, branching is 11.6/633×100= 1.8%. Equivalently, on average, a two carbon ethyl group branches from the backbone once about every 53 backbone carbon atoms ((633-2(11.6))/11.6=53).

The spectra were obtained using a 100 MHz instrument, in which the methyl peak is adequately separated from other carbon peaks. Applicant believes that more accurate data as to the structure of KRATON® G-1651 midblock side chains could be obtained with a more powerful NMR spectrometer. Most spectra are currently obtained with a 300 MHz or higher instrument, which yields about three times better signal to noise, resolution and integration. However, neither Applicant nor his independent consultants have yet been able to access such an instrument.

Applicant believes that the length of midblock side chains contribute significantly to the superior physical characteristics of plasticizer extended SEPTON 4055 (and similar triblock copolymers) over plasticizer extended KRATON® G-1651. The side chains of the SEPTON 4055 midblock are only half as long as the side chains of the KRATON® G-1651 midblock. The number of branches may also be partially responsible for the excellent physical characteristics of plasticizer extended SEPTON 4077. NMR spectrographs suggest that SEPTON 4055 has almost three times as many side chains as KRATON® G-1651.

G. Uses

The tailorability of physical properties of the materials of the present invention makes them useful in many different product applications. Thin layers of the materials may be used as padding or backing for carpets and rugs. In construction, the materials are useful for temporary roof repair, as an undercoating to prevent roof leakage and provide insulation, in paint masking applications, and as a thin shatter resistant layer between window panes.

Extremely thin layers are useful as films and related barrier-type products. For example, the material of the invention could be used as plastic wrap, in protective covering applications, in condoms, disposable gloves, balloons and the like.

The materials are also useful in a wide variety of cushioning applications. When a deforming force is applied to the composite material of the invention, the material readily deforms. When placed under a compression force, the material tends to exhibit a flowing or fluid-like movement away from the compression force. Deformation of the material of this invention causes it to conform to protrusions on the object being cushioned. This deformation occurs because of the flowing movement of the elastomeric substance. The deformability, flowing and conformability of the material of the invention act together to provide a supporting force against the object being cushioned which is roughly equalized across the irregularly shaped supporting surface of the cushion. In other words, when used in cushioning applications, the soft elastomeric material of the invention avoids placement of significantly high pressure on protrusions of the object being supported. After a deforming force has been removed from the preferred material of the present invention, the elastomeric material rebounds nearly instantaneously to substantially its original size and shape.

As an example of the use of the composites of the present invention as a cushion, in shoes, the material of the invention would be useful as shoe insoles and inserts. It could also be used in furniture cushions, mattresses, floor mat pads, car seat cushions, bicycle seat cushions, shoulder strap cushions, stadium cushions, wheelchair cushions, prosthesis pads, crutch pads, motor mount cushions, pads for vibration dampening of machines, computer mouse, keyboard and wrist pads, and padding in protective gear, to name only a few cushioning uses for the material.

The readily deformable visco-elastic material of the present invention is also useful in medical applications, including but not limited to use as wraps, bandages, and hot/cold packs. It could also be used for various purposes in toys, especially dolls, such as making toys that are durable, yet pleasant to touch and stretch. Many other applications not detailed herein can also make use of the properties of the material of the invention.

Tacky materials are desirable in some uses of the material of the present invention. Nevertheless, contact with such tacky materials may be undesirable. Thus, in some applications where tacky materials are preferred, a barrier or detackifying layer is needed to isolate the tack from unwanted contact with foreign objects. Examples of tack barriers which are useful for covering the materials of the present invention include stretchable fabrics such as that manufactured and sold by DuPont Corporation of Wilmington, Del. as LYCRA; stretchable fabrics coated with a thin layer of water and/or oil resistant material including but not limited to polyurethane, latex, neoprene and poly (vinylchloride), plastic films, non-tacky elastomeric layers (i.e., elastomeric materials which are less tacky than the elastomeric material of the invention); and adhesion of particulate or fibrous matter (such as microspheres, talc, silica, cotton threads or the like), including but not limited to discontinuous fibers, to the outer surface of the tacky material.

In some of the extremely soft, highly elastic embodiments of the material of the present invention (e.g., a 50:1 ratio of oil to SEPTON 4055), some oil bleed will occur. Thus, in those embodiments, a very thin oil resistant barrier such as plastic films, non-oily elastomeric layers, stretchable fabrics coated with a thin layer of oil resistant material including but not limited to polyurethane and neoprene, or others may be desirable.

The material of the present invention may be cast, extruded, pressure-molded, or otherwise formed into a variety of presently existing shapes, such as the shape of known bicycle seats or shoe components. Alternatively, the invented material may be custom shaped to maximize performance.

An advantage of the material of the present invention over many prior art cushioning media, such as many foams, viscous fluids, gels and lubricated microspheres, is that the material of the invention need not be contained in a bladder.

Another advantage of the material of the invention is lower cost. Current prices for SEPTON 4055 are at least 30 percent lower than the cost of the same amount of KRATON(® G-1651, the most preferred elastomer component of the closest and best prior art. Additionally, since less SEPTON 4055 is required in the material of the present invention in proportion to the much less expensive plasticizers compared to Chen's material, which requires more elastomer in proportion to plasticizing oil, the cost of materials is further reduced. Less SEPTON 4055 is required in the material because of the greatly increased tensile strength of the material over prior art gels, even at high plasticizer to elastomer ratios. Referring to Example 1 above, an 8:1 oil extended material according to the present invention had about three times the tensile strength of Chen's preferred 4:1 material, despite the fact that the oil content of the 8:1 material was significantly higher than that of Chen's 4:1.

Although the description contains many specificities, these should not be construed as limiting the scope of the invention, but as merely providing illustrations of some of the presently preferred embodiments of this invention. For example, the soft elastomeric material that is described includes plasticizers having certain properties. However, the use of other types of plasticizers is readily conceivable. Similarly, additives other than antioxidants, flame retardants or colorants may be used in the materials of the present invention. All of these additives and others will be considered to be within the scope of the inventive concept. Thus, the scope of the invention should be determined by the appended claims and their legal equivalents, rather than by the examples given.

What is claimed is:

1. An elastomeric material having
    a plasticizer and a triblock copolymer of the general configuration A-B-A;
    wherein A is selected from the group consisting of monoalkenylarene polymers;
    wherein B is a hydrogenated polymer including a plurality of isoprene monomers and a plurality of butadiene monomers;
    wherein said isoprene monomers comprise at least about 30 weight percent of said hydrogenated polymer B;

wherein said butadiene monomer comprise at least about 30 weight percent of said hydrogenated polymer B;

wherein a mixture including about 20 weight percent of said triblock copolymer and about 80 weight percent toluene, the weight percentages based on the total weight of the mixture, at from about 25 degrees Celsius to about 30 degrees Celsius, does not form a solution;

wherein said plasticizer associates with said hydrogenated polymer B;

wherein said triblock copolymer has a measurable percent elongation at break;

wherein said plasticizer tends to increase the percent elongation at break of said triblock copolymer;

wherein said triblock copolymer has a rigidity measurable on the Gram Bloom scale; and wherein said plasticizer tends to decrease the Gram Bloom rigidity of said triblock copolymer.

2. An elastomeric material as recited in claim 1, and further comprising a plurality of gas pockets.

3. An elastomeric material as recited in claim 2, wherein said gas pockets comprise at least about 40% of the material, by volume.

4. An elastomeric material as recited in claim 2, wherein said gas pockets comprise at least about 70% of the material, by volume.

5. An elastomeric material as recited in claim 1, and further comprising a plurality of hollow spherical objects embedded within the material and having a diameter of less than about 2000 microns.

6. An elastomeric material as recited in claim 5, wherein said spherical objects comprise at least about 30% of the material, by volume.

7. An elastomeric material as recited in claim 5, wherein said spherical objects comprise at least about 50% of the material, by volume.

8. An elastomeric material as recited in claim 1, and further comprising:
   a plurality of gas pockets and
   a plurality of microspheres;
   wherein said gas pockets comprise at least about 20% of the material, by volume; and
   wherein said microspheres comprise at least about 20% of the material, by volume.

9. An elastomeric material as recited in claim 1, wherein said plasticizer comprises a plurality of components;
   wherein at least one of said components is a hydrocarbon resin; and
   wherein at least one of said components is selected from the group consisting of naturally derived oils, synthetic oils, and liquid oligomers.

10. An elastomeric material as recited in claim 1, wherein said plasticizer increases said percent elongation at break of said triblock copolymer by at least about a factor of two.

11. An elastomeric material as recited in claim 1, wherein said plasticizer decreases said Gram Bloom rigidity of said triblock copolymer by at least about a factor of two.

12. An elastomeric material having
   a plasticizer and
   a triblock copolymer of the general configuration A-B-A;
   wherein A is a hygrogenated polymer including ethylene/propylene and ethylene/butylene;
   wherein the combined weights of said ethylene/propylene and said ethylene/butylene comprise more than about 50 weight percent of said hydrogenated polymer B;

wherein a mixture including about 20 weight percent of said triblock copolymer and about 80 weight percent toluene, the weight percentages base don the total weight of the mixture, at from about 25 degrees Celsius to about 30 degrees Celsius does not form a solution;

wherein said plasticizer associates with said hydrogenated polymer B;

wherein said triblock copolymer has a measurable percent elongation at break;

wherein said plasticizer tends to increase the percent elongation at break of said triblock copolymer;

wherein said triblock copolymer has a rigidity measurable on the Gram Bloom scale; and wherein said plasticizer tends to decrease the Gram Bloom rigidity of said triblock copolymer.

13. An elastomeric material as recited in claim 12, and further comprising a plurality of gas pockets.

14. An elastomeric material as recited in claim 13, wherein said gas pockets comprise at least about 40% of the material, by volume.

15. An elastomeric material as recited in claim 13, wherein said gas pockets comprise at least about 70% of the material, by volume.

16. An elastomeric material as recited in claim 12, wherein said triblock copolymer has a molecular weight of at least about 300,000, as determined by gel permeation chromatography.

17. An elastomeric material as recited in claim 12, and further comprising a plurality of hollow spherical objects embedded within the material and having a diameter of less than about 2000 microns.

18. An elastomeric material as recited in claim 17, wherein said spherical objects comprise at least about 30% of the material, by volume.

19. An elastomeric material as recited in claim 17, wherein said spherical objects comprise at least about 50% of the material, by volume.

20. An elastomeric material as recited in claim 12, and further comprising:
   a plurality of gas pockets and
   a plurality of microspheres;
   wherein said gas pockets comprise at least about 20% of the material, by volume; and
   wherein said microsphers comprise at least about 20% of the material, by volume.

21. An elastomeric material as recited in claim 12, wherein said plasticizer comprises a plurality of components;
   wherein at least one of said components is a hydrocarbon resin; and
   wherein at least one of said components is selected from the group consisting of naturally derived oils, synthetic oils, and liquid oligomers.

22. An elastomeric material as recited in claim 12, wherein said plasticizer increases said percent elongation at break of said triblock copolymer by at least about a factor of two.

23. An elastomeric material as recited in claim 12, wherein said plasticizer decreases said Gram Bloom rigidity of said triblock copolymer by at least about a factor of two.

24. An elastomeric material having
   a plasticizer and a triblock copolymer of the general configuration A-B-A;
   wherein said triblock copolymer has a weight average molecular weight of at least about 300,000 or more;

wherein A is selected from the group consisting of monoalkenylarene polymers;

wherein B is a hydrogenated polymer including a plurality of ethylene/propylene monomers and a plurality of ethylene/butylene monomers;

wherein the combined weights of said ethylene/propylene monomers and said ethylene/butylene monomers comprise at least about 50 weight percent of said hydrogenated polymer B;

wherein said plasticizer associates with said hydrogenated polymer B;

wherein said triblock copolymer has a measurable percent elongation at break;

wherein said plasticizer tends to increase the percent elongation at break of said triblock copolymer;

wherein said triblock copolymer has a rigidity measurable on the Gram Bloom scale; and wherein said plasticizer tends to decrease the Gram Bloom rigidity of said triblock copolymer.

25. An elastomeric material as recited in claim 24, and further comprising a plurality of gas pockets.

26. An elastomeric material as recited in claim 25, wherein said gas pockets comprise at least about 40% of the material, by volume.

27. An elastomeric material as recited in claim 25, wherein said gas pockets comprise at least about 70% of the material, by volume.

28. An elastomeric material as recited in claim 24, and further comprising a plurality of hollow spherical objects embedded within the material and having a diameter of less than about 2000 microns.

29. An elastomeric material as recited in claim 28, wherein said spherical objects comprise at least about 30% of the material, by volume.

30. An elastomeric material as recited in claim 28, wherein said spherical objects comprise at least about 50% of the material, by volume.

31. An elastomeric material as recited in claim 24, and further comprising:
a plurality of gas pockets and
a plurality of microspheres;
wherein said gas pockets comprise at least about 20% of the material, by volume; and
wherein said microsphers comprise at least about 20% of the material, by volume.

32. An elastomeric material as recited in claim 24, wherein said plasticizer comprises a plurality of components;
wherein at least one of said components is a hydrocarbon resin; and
wherein at least one of said components is selected from the group consisting of naturally derived oils, synthetic oils, and liquid oligomers.

33. An elastomeric material as recited in claim 24, wherein said plasticizer increases said percent elongation at break of said triblock copolymer by at least about a factor of two.

34. An elastomeric material as recited in claim 24, wherein said plasticizer decreases said Gram Bloom rigidity of said triblock copolymer by at least about a factor of two.

35. An elastomeric material as recited in claim 24, wherein a mixture including about 20 weight percent of said triblock copolymer and about 80 weight percent toluene, the weight percentages based on the total weight of the mixture, at from about 25° C. to about 30° C., has a solution viscosity of at least about 100,000 cps.

36. An elastomeric material as recited in claim 24, wherein a mixture including about 20 weight percent of said triblock copolymer and about 80 weight percent toluene, the weight percentages based on the total weight of the mixture, at from about 25° C. to about 30° C., does not form a solution.

37. A gelatinous elastomeric material comprising:
a plasticizer including a plurality of plasticizing polymer molecules,
an elastomer comprising a plurality of elastomeric triblock copolymers of the general configuration A-B-A, each of said triblock copolymers having:
two end blocks A and
one mid block B, and
a plurality of hollow spherical objects;
wherein each of said mid block B is covalently linked to one of said end blocks A;
wherein said end blocks A are non-elastomeric polymers;
wherein said mid block B is an elastomeric polymer,
wherein said mid block B of at least some of said triblock copolymers includes a plurality of backbone carbon molecules and a plurality of side chains;
wherein said elastomer has a weight average molecular weight of at least about 300,000 when determined by gel permeation chromatography;
wherein said plasticizing polymer molecules, upon placement of the material under a load, tend to facilitate disentanglement and elongation of said mid blocks B during elongation of the material;
wherein said plasticizing polymer molecules, upon release of the load from the material, tend to facilitate recontraction of the material;
wherein said plasticizing polymer molecules comprise at least about 60 weight percent of the material, based on the combined weights of said triblock copolymers and said plasticizing polymers;
wherein said elastomer has a measurable percent elongation at break;
wherein said plasticizer tends to increase the percent elongation at break of said elastomer;
wherein said elastomer has a rigidity measurable on the Gram Bloom scale, and
wherein said plasticizer tends to decrease the Gram Bloom rigidity of said elastomer.

38. A gelatinous elastomeric material as recited in claim 37
wherein said hollow spherical objects are elastic;
wherein said hollow spherical objects deform under a compression force; and
wherein said hollow spherical objects instantaneously rebound to substantially their original shape and size following cessation of a force which compresses said spherical objects to a thickness of from about 50% to less than about 100% of the original diameter of said spherical objects.

39. A gelatinous elastomeric material as recited in claim 37, wherein said plasticizer increases the percent elongation at break of said elastomer by at least about a factor of two.

40. A gelatinous elastomeric material as recited in claim 37, wherein said plasticizer decreases the Gram Bloom rigidity of said elastomer by at least about a factor of two.

41. A gelatinous elastomeric material comprising:
a triblock copolymer of the general configuration A-B-A;
a plasticizing agent; and
an additive;

wherein said triblock copolymer, said plasticizing agent, and said additive are mixed together to form the gelatinous elastomeric material;

wherein A is a polymer selected from the group consisting of monoalkenylarene polymers;

wherein B is a hydrogenated polymer comprising a plurality of covalently linked conjugated diene monomers;

wherein at least one of said conjugated diene monomers is isoprene;

wherein said triblock copolymer has a weight average molecular weight of about 300,000 or more;

wherein said plasticizer comprises at least about 60 weight percent of the material, based on the combined weights of said plasticizer and said triblock copolymer;

wherein said additive is selected from the group consitisting of detackifying layers, foaming facilitators, tack modifiers, plasticizer bleed modifiers, flame retardants, melt viscosity modifiers, melt temperature modifiers, tensile strength modifiers and shrinkage inhibitors;

wherein the gelatinous material has a rigidity measurable on the Gram Bloom scale;

wherein said plasticizer tends to reduce the Shore A rigidity of the gelatinous elastomeric material; and wherein the gelatinous elastomeric material has a durometer of about 15 Shore A or lower.

42. A gelatinous elastomeric material as recited in claim 41, wherein the additive is a melt temperture modifier selected from the group consisting of diblock copolymers of the general configuration A-B, triblock copolymers of the general configuration A-B-A, cross-linking agents, and hydrocarbon resins;

wherein A is a polymer comprising functionalized styrene monomers.

43. A gelatinous elastomeric material as recited in claim 41, wherein the additive is a tack modifier selected from the group consisting of surfactants, dispersants, and emulsifiers.

44. A gelatinous elastomeric material as recited in claim 41, wherein the additive is a tack modifier selected from the group consisting of hydrocarbon resins, polyisobutylene, and butyl rubber.

45. A gelatinous elastomeric material as recited in claim 41, wherein the additive is a foam facilitator selected from the group consisting of polyisobutylene, butyl rubber, surfactants, emulsifiers and dispersants.

46. A gelatinous elastomeric material as recited in claim 41, wherein the additive is a plasticizer bleed modifier selected from the group consisting of hydrocarbon resins, elastomeric diblock copolymers, polyisobutylene, butyl rubber, and transpolyoctenylene rubber.

47. A gelatinous elastomeric material as recited in claim 41, wherein the additive is a plasticizer bleed modifier selected from the group consisting of hydrocarbon resins, elastomeric diblock copolymers, polyisobutylene, butyl rubber, and transpolyoctenylene rubber.

48. A gelatinous elastomeric material as recited in claim 41, wherein the additive is a flame retardant selected from the group consisting of halogenated flame retardants, non-halogenated flame retardants, and volatile, non-oxygen gas forming chemicals.

49. A gelatinous elastomeric material as recited in claim 41, wherein said additive is a melt viscosity modifier selected from the group consisting of hydrocarbon resins, transpolyoctenylene rubber, castor oil, linseed oil, non-ultra high molecular weight thermoplastic rubbers, surfactants, dispersants, and emulsifiers; and wherein said additive reduces the melt viscosity of the gelatinous elastomeric material.

50. A gelatinous elastomeric material as recited in claim 41, wherein said additive is a melt viscosity modifier selected from the group consisting of hydrocarbon resins, butyl rubber, polyisobutylene, additional triblock copolymers having the general configuration A-B-A, particulate fillers, microspheres, butadiene rubber, ethylene/propylene rubber, and ethylene/butylene rubber;

wherein the weight average molecular weight of said additional triblock copolymers is greater than the weight average molecular weight of said triblock copolymer; and wherein said additive increases the melt viscosity of the gelatinous elastomeric material.

51. A gelatinous elastomeric material as recited in claim 41, wherein said additive is a tensile strength modifier selected from the group consisting of mid block B associating hydrocarbon resins, non-end block A solvating hydrocarbon resins, and particulate reinforcers;

wherein said additive increases the tensile strength of the gelatinous elastomeric material.

52. A gelatinous elastomeric material as recited in claim 41, wherein said additive is a shrinkage reducer selected from the group consisting of hydrocarbon resins, particulate fillers, microspheres, and transpolyoctenylene rubber.

53. A gelatinous elastomeric material comprising:

a triblock copolymer of the general configuration A-B-A;

a plasticizing agent; and an additive;

wherein said triblock copolymer, said plasticizing agent, and said additive are mixed together to form the gelatinous elastomeric material;

wherein A is a polymer selected from the group consisting of monoalkenylarene polymers;

wherein B is a hydrogenated polymer comprising a plurality of covalently linked conjugated diene monomers;

wherein said triblock copolymer is of the general configuration A-B-A and has a weight average molecular weight of at least about 300,000 or more;

wherein said triblock copolymer has a measurable solution viscosity at 5 weight percent solids in 95% toluene at 25 degrees Celsius and said triblock copolymer remains a solid at 20 weight percent solids in 80% toluene at 25 degrees Celsius;

wherein said plasticizer comprises at least about 60 weight percent of the material, based on the combined weights of said plasticizer and said triblock copolymer;

wherein said additive is selected from the group consisting of detackfying layers, foaming facilitators, tack modifiers, plasticizer bleed modifiers, flame retardants, melt viscosity modifiers, melt temperature modifiers, tensile strength modifiers, and shrinkage inhibitors;

wherein said gelatinous material has a rigidity measurable on the Gram Bloom scale;

wherein said plasticizer tends to reduce Shore A rigidity of the gelatinous elastomeric material; and wherein the gelatinous elastomeric material has a durometer of about 15 Shore A or lower.

54. A gelatinous elastomeric material as recited in claim 53, wherein the additive is a melt temperature modifier selected from the group consisting of diblock copolymers of the general configuration A-B, triblock copolymers of the general configuration A-B-A, cross-linking agents, and hydrocarbon resins;

wherein A is a polymer comprising functionalized styrene monomers.

55. A gelatinous elastomeric material as recited in claim 53, wherein the additive is a tack modifier selected from the group consisting of surfactants, dispersants, and emulsifiers.

56. A gelatinous elastomeric material as recited in claim 53, wherein the additive is a tack modifier selected from the group consisting of hydrocarbon resins, polyisobutylene, and butyl rubber.

57. A gelatinous elastomeric material as recited in claim 53, wherein the additive is a foam facilitator selected from the group consisting of polyisobutylene, butyl rubber, surfactants, emulsifiers and dispersants.

58. A gelatinous elastomeric material as recited in claim 53, wherein the additive is a plasticizer bleed modifier selected from the group consisting of hydrocarbon resins, elastomeric diblock copolymers, polyisobutylene, butyl rubber, and transpolyoctenylene rubber.

59. A gelatinous elastomeric material as recited in claim 53, wherein the additive is a plasticizer bleed modifier selected from the group consisting of hydrocarbon resins, elastomeric diblock copolymers, polyisobutylene, butyl rubber, and transpolyoctenylene rubber.

60. A gelatinous elastomeric material as recited in claim 53, wherein the additive is a flame retardant selected from the group consisting of halogenated flame retardants, non-halogenated flame retardants, and volatile, non-oxygen gas forming chemicals.

61. A gelatinous elastomeric material as recited in claim 53, wherein said additive is a melt viscosity modifier selected from the group consisting of hydrocarbon resins, transpolyoctenylene rubber, castor oil, linseed oil, non-ultra high molecular weight thermoplastic rubbers, surfactants, dispersants, and emulsifiers; and wherein said additive reduces the melt viscosity of the gelatinous elastomeric material.

62. A gelatinous elastomeric material as recited in claim 53, wherein said additive is a melt viscosity modifier selected from the group consisting of hydrocarbon resins, butyl rubber, polyisobutylene, additional tri block copolymers having the general configuration A-B-A, particulate fillers, microspheres, butadiene rubber, ethylene/propylene rubber, and ethylene/butylene rubber;

wherein the weight average molecular weight of said additional triblock copolymers is greater than the weight average molecular weight of said triblock copolymer; and wherein said additive increases the melt viscosity of the gelatinous elastomeric material.

63. A gelatinous elastomeric material as recited in claim 53, wherein said additive is a tensile strength modifier selected from the group consisting of mid block B associating hydrocarbon resins, non-end block A solvating hydrocarbon resins, and particulate reinforcers;

wherein said additive increases the tensile strength of the gelatinous elastomeric material.

64. A gelatinous elastomeric material as recited in claim 53, wherein said additive is a shrinkage reducer selected from the group consisting of hydrocarbon resins, particulate fillers, microspheres, and transpolyoctenylene rubber.

65. An elastomeric material comprising:

a triblock copolymer elastomer of the configuration A-B-A and having a weight average molecular weight of about 300,000 or above, block A being a non-elastomeric polymer and block B being an elastomeric polymer, said A-B-A triblock copolymer having no solution viscosity at 20% solids in 80% toluene at 25 degrees Celcius as it remains a solid under those conditions, and a plasticizer combined with said triblock copolymer elastomer to form a visco-elastic material, said plasticizer being compatible with said B block.

66. A material as recited in claim 65 wherein said A-B-A triblock copolymer has a solution viscosity of about 30040 to 5800 cps at 10% solids in 90% toluene at 25 degrees Celcius.

67. A material as recited in claim 65 wherein said "B" blocks of said A-B-A triblock copolymer have a plurality of side chains having a length of at least one carbon atom.

68. A material as recited in claim 67 wherein said side chains are found to typically occur on about one of every four backbone carbon atoms.

69. A material as recited in claim 67 wherein said elastomer and said plasticizer are found in a ratio of about 4:1 to 20:1.

70. A material as recited in claim 65 wherein said A-B-A triblock copolymer has a solution viscosity in the range of about 3040 to 5800 cps at 10% solids in 90% toluene at 25 degrees Celcius.

71. A material as recited in claim 65 wherein said A-B-A triblock copolymer has a solution viscosity of about 90 cps at 5% solids in 95% toluene at 25 degrees Celcius.

* * * * *

(12) EX PARTE REEXAMINATION CERTIFICATE (7404th)
United States Patent
Pearce

(10) Number: US 5,994,450 C1
(45) Certificate Issued: Mar. 16, 2010

(54) GELATINOUS ELASTOMER AND METHODS OF MAKING AND USING THE SAME AND ARTICLES MADE THEREFROM

(75) Inventor: Tony M. Pearce, Alpine, UT (US)

(73) Assignee: Edizone, LC, Pleasant Grove, UT (US)

Reexamination Request:
No. 90/007,657, Aug. 5, 2005

Reexamination Certificate for:
Patent No.: 5,994,450
Issued: Nov. 30, 1999
Appl. No.: 08/783,413
Filed: Jan. 10, 1997

Related U.S. Application Data

(60) Provisional application No. 60/021,019, filed on Jul. 1, 1996.

(51) Int. Cl.
*A43B 13/02* (2006.01)
*A43B 13/04* (2006.01)
*C08L 53/00* (2006.01)
*C08L 51/00* (2006.01)
*C08L 53/02* (2006.01)

(52) U.S. Cl. .............................. 524/505; 525/89; 525/98; 525/99

(58) Field of Classification Search ........................ None
See application file for complete search history.

(56) References Cited

U.S. PATENT DOCUMENTS

| | | | |
|---|---|---|---|
| 4,492,724 A | * | 1/1985 | Allbright et al. ............ 428/40.9 |
| 5,618,882 A | | 4/1997 | Hammond et al. |
| 5,633,286 A | | 5/1997 | Chen |
| 5,780,523 A | * | 7/1998 | Petit et al. .................... 521/137 |
| 5,994,450 A | | 11/1999 | Pearce |

FOREIGN PATENT DOCUMENTS

WO     WO 9323472 A1 * 11/1993

OTHER PUBLICATIONS

"Septon resin grades from Kuraray America, Inc" via the IDES website www.ides.com.*
Standard viscosity tables from (www.vp-scietific.com/Viscosity_Tables.htm).*
Affidavit of Septon Company of America, Oct. 11, 2006.
Kuraray Co., Ltd., Material Safety Data Sheet for Septon 4055, Aug. 14, 1991.
Kuraray co., Ltd., Material Safety Data Sheet for Septon 4055, Apr. 30, 2001.
Testimony of Tony M. Pierce, *Edizone, LC* v. *Cloud Nine, LLC, et al.*, U.S. District Court for the District of Utah, Case No. 1:04–cv–00117 TS, Mar. 18, 2005.
Bhowmick, Anil K. and Stephens, Howard L., *Handbook of Elastomers, New Developments and Technology*, Marcel Dekker, Inc., 1988, pp. 325–337.

* cited by examiner

*Primary Examiner*—Sharon L Turner

(57) ABSTRACT

The present invention relates to gelatinous elastomers, methods for making gelatinous elastomers, methods for using gelatinous elastomers, products made from gelatinous elastomers, and products which include gelatinous elastomers as a component or ingredient. More particular, the invention includes a gelatinous elastomer formed from a combination of a block copolymer of the general configuration A-B-A and a plasticizer. The preferred A-B-A copolymer of the invention is polysterene-hydrogenated poly (isoprene+butadiene)-polystyrene and the preferred plasticizer is either mineral oil or a combination of mineral oil and resin. Various other components may be included in the preferred recipes according to the invention.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–71 are cancelled.

* * * * *